US011445404B2

(12) United States Patent
Kim et al.

(10) Patent No.: US 11,445,404 B2
(45) Date of Patent: Sep. 13, 2022

(54) METHOD AND APPARATUS FOR WIRELESS COMMUNICATION IN WIRELESS COMMUNICATION SYSTEM

(71) Applicant: Samsung Electronics Co., Ltd., Suwon-si (KR)

(72) Inventors: Sangbum Kim, Suwon-si (KR); Donggun Kim, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/128,867

(22) Filed: Dec. 21, 2020

(65) Prior Publication Data

US 2021/0112452 A1    Apr. 15, 2021

Related U.S. Application Data

(63) Continuation of application No. 16/244,655, filed on Jan. 10, 2019, now Pat. No. 10,873,880.

(30) Foreign Application Priority Data

Jan. 10, 2018  (KR) .................. 10-2018-0003416
Jan. 23, 2018  (KR) .................. 10-2018-0008417

(51) Int. Cl.
  *H04W 28/06*     (2009.01)
  *H04L 69/04*     (2022.01)
  (Continued)

(52) U.S. Cl.
  CPC .......... *H04W 28/065* (2013.01); *H04L 67/60* (2022.05); *H04L 69/04* (2013.01); *H04L 69/22* (2013.01);
  (Continued)

(58) Field of Classification Search
  CPC ......... H04L 67/32; H04L 69/04; H04L 69/22; H04L 67/60; H04W 12/001;
  (Continued)

(56) References Cited

U.S. PATENT DOCUMENTS 8,335,197 B2   12/2012  Jeong et al.
8,625,506 B2    1/2014  Chin
(Continued)

FOREIGN PATENT DOCUMENTS

CN   102905388 A    1/2013
CN   106921996 A    7/2017
(Continued)

OTHER PUBLICATIONS

3GPP, 3GPP TS 38.323 V1.1.0, "3rd Generation Partnership Project; Technical Specification Group Radio Access Network; NR; Packet Data Convergence Protocol (PDCP) specification (Release 15)", Nov. 2017. (Year: 2017).*
(Continued)

*Primary Examiner* — Khoa Huynh
(74) *Attorney, Agent, or Firm* — Jefferson IP Law, LLP

(57) ABSTRACT

An operation method of a transmitting apparatus in a wireless communication system is provided. The operation method includes receiving a service data adaptation protocol (SDAP) header configuration and a header compression configuration through higher layer signaling and when an SDAP entity receives first data from an upper layer, generating an SDAP header and transmitting second data obtained by adding the generated SDAP header to the first data to a packet data convergence protocol (PDCP) entity, the generating and the transmitting being performed by the SDAP entity, performing, by the PDCP entity, header compression on an upper layer header of the second data, excluding the SDAP header, performing, by the PDCP entity, ciphering on
(Continued)

data of the second data, excluding the SDAP header and generating a PDCP header and transmitting third data obtained by adding the generated PDCP header to the ciphered data to a lower layer, the generating and the transmitting being performed by the PDCP entity.

12 Claims, 38 Drawing Sheets

(51) Int. Cl.
    *H04L 69/22*     (2022.01)
    *H04W 12/033*     (2021.01)
    *H04L 67/60*     (2022.01)

(52) U.S. Cl.
    CPC .......... *H04W 12/033* (2021.01); *H04W 28/06* (2013.01)

(58) Field of Classification Search
    CPC ............. H04W 12/0013; H04W 12/03; H04W 12/033; H04W 12/037; H04W 12/1006; H04W 12/106; H04W 28/06; H04W 28/065; H04W 72/04; H04W 80/02
    See application file for complete search history.

(56) References Cited

U.S. PATENT DOCUMENTS

| | | |
|---|---|---|
| 10,080,181 B2 | 9/2018 | Kim et al. |
| 10,149,196 B2 | 12/2018 | Kim et al. |
| 10,631,233 B2 | 4/2020 | Futaki |
| 2012/0040643 A1 | 2/2012 | Diachina et al. |
| 2013/0148490 A1 | 6/2013 | Yi et al. |
| 2013/0242859 A1* | 9/2013 | Celik .................... H04L 1/1841 370/328 |
| 2015/0036489 A1 | 2/2015 | Rajadurai et al. |
| 2015/0111520 A1 | 4/2015 | Hsu |
| 2015/0223146 A1 | 8/2015 | Pinheiro et al. |
| 2016/0014672 A1 | 1/2016 | Jang et al. |
| 2016/0219493 A1 | 7/2016 | Kim et al. |
| 2017/0064534 A1 | 3/2017 | Loehr et al. |
| 2017/0094525 A1 | 3/2017 | Salkini et al. |
| 2017/0318496 A1 | 11/2017 | Yi et al. |
| 2018/0020382 A1 | 1/2018 | Kim et al. |
| 2019/0097936 A1 | 3/2019 | Yang et al. |
| 2019/0116521 A1 | 4/2019 | Qiao et al. |
| 2019/0174392 A1 | 6/2019 | Chun et al. |
| 2019/0200273 A1* | 6/2019 | Pedersen ................. H04L 47/32 |
| 2020/0077299 A1 | 3/2020 | Wu et al. |
| 2020/0187092 A1 | 6/2020 | Lindheimer et al. |
| 2020/0413286 A1 | 12/2020 | Yi et al. |

FOREIGN PATENT DOCUMENTS

| | | |
|---|---|---|
| EP | 2 809 102 A1 | 12/2014 |
| KR | 10-2007-0073343 A | 7/2007 |
| KR | 10-2011-0104563 A | 9/2011 |
| KR | 10-2016-0130405 A | 11/2016 |
| KR | 10-2018-0007697 A | 1/2018 |
| KR | 10-1901843 B1 | 9/2018 |
| TW | 2017-03489 A | 1/2017 |
| WO | 2016/003140 A1 | 7/2016 |
| WO | 2016/190639 A1 | 12/2016 |
| WO | 2017/017890 A | 2/2017 |
| WO | 2018/142203 A1 | 8/2018 |

OTHER PUBLICATIONS

Nokia et al., "SDAP header", R2-1702644, 3GPP TSG-RAN WG2 Meeting #97bis, Apr. 3-7, 2017. (Year: 2017).*
Ericsson, "Access Control for NR", 3GPP Draft, R2-1702865 Access Control for NR, 3rd Generation Partnership Project (3GPP), vol. RAN WG2, Spokane, USA; Apr. 3, 2017-Apr. 7, 2017, Apr. 3, 2017, XP051244845.
Intel Corporation, "5G access control mechanism", mechanism, 3GPP Draft, R2-1707046, NR Access Control, 3rd Generation Partnership Project (3GPP), vol. RAN WG2, Qingdao, China, Jun. 27, 2017-Jun. 29, 2017, Jun. 17, 2017, XP051307295.
Qualcomm Incorporated, "Unified Access Control in different RRC Modes", 3GPP Draft, R2-1706890, NR Access Control, 3rd Generation Partnership Project (3GPP), ol. RAN WG2, Qingdao, China, Jun. 27, 2017-Jun. 29, 2017, Jun. 17, 2017, XP051307185.
LG Electronics Inc, "Access category based access barring for RRC_IDLE and RRC_INACTIVE", 3GPP Draft, RR-1707138, Category Based Access Barring in Idle and Inactive, 3rd Generation Partnership Project (3GPP), vol. RAN WG2, Qingdao, China; Jun. 27, 2017-Jun. 29, 2017, Jun. 26, 2017, XP051301631.
Mediatek Inc, "Discussion on Unified Access Control in 5GS", 3GPP Draft, C1-171579, Unified Access Control in 5GS, 3rd Generation Partnership Project (3GPP), vol. CT WGI, Spokane (WA), USA, Apr. 3, 2017-Apr. 7, 2017, Apr. 2, 2017, XP051241722.
Chinese Office Action dated Jan. 28, 2021, issued in Chinese Patent Application No. 201980007804.5.
Extended European Search Report dated Mar. 25, 2021, issued in European Patent Application No. 18842264.6.
Qualcomm Incorporated, "SDAP header excluded from PDCP ciphering", 3GPP Draft, R2-1710906, 3rd Generation Partnership Project (3GPP), vol. RAN WG2, Prague, Czech Republic, Oct. 9, 2017-Oct. 13, 2017, Sep. 28, 2017, XP051354400.
European Office Action dated Apr. 19, 2021, issued in European Patent Application No. 19738121.3.
Korean Office Action dated Jun. 15, 2021, issued in Korean Patent Application No. 10-2017-0098553.
Chinese Office Action dated Sep. 24, 2021, issued in Chinese Patent Application No. 201880050623.6.
Korean Office Action dated Nov. 10, 2021, issued in Korean Patent Application No. 10-2018-0008417.
International Search Report dated Apr. 19, 2019, issued in International Application No. PCT/KR2019/000395.
International Search Report dated Nov. 20, 2018, issued in International Application No. PCT/KR2018/008855.
3GPP; TSGRAN; NR; NR and NG-RAN Overall Description; Stage 2 (Release 15), ', 3GPP TS 38.300 V15.0.0, Jan. 4, 2018 See sections 6.4-6.6.
3GPP; TSGRAN; E-UTRA and NR; Service Data Adaptation Protocol (SDAP). specification (Release 15)', 3GPP TS37.324 V1.1.1, Nov. 16, 2017, See sections 4-6; and figure 4.2.2-1.
LG Electronics Inc., 'Configurability for the presence of SDAP header', R2-1713659, 3GPP TSG-RAN2 Meeting #100, Reno, USA, Nov. 17, 2017, See section 2.
LG Electronics Inc., 'Supporting IMS Emergency services in NR', R2-1707179, 3GPP TSG-RAN WG2 Meeting NR AH#2, Qingdao, China, Jun. 16, 2017, See section 2.
Asustek, 'Discussion on changing presence of SDAP header', R2-1712207, 3GPP TSG-RAN WG2 Meeting #100, Reno, USA, Nov. 16, 2017, See section 2.
U.S. Office Action dated Dec. 15, 2018, issued in U.S. Appl. No. 16/054,517.
U.S. Office Action dated May 16, 2019, issued in U.S. Appl. No. 16/054,517.
U.S. Non-Final Office Action dated Nov. 14, 2019, issued in U.S. Appl. No. 16/054,517.
3rd Generation Partnership Project; Technical Specification Group Services and System Aspects; Service requirements for the 5G system; Stage 1 (Release 15); 3GPP TS 22.261 v15.3.0 (Dec. 2017).
U.S. Final Office Action dated Apr. 6, 2020, issued in U.S. Appl. No. 16/054,517.
U.S. Non-final Office Action dated Sep. 25, 2020, issued in U.S. Appl. No. 16/054,517.
"3rd Generation Partnership Project; Technical Specification Group Radio Access Network; NR; Packet Data Convergence Protocol ( PDCP) specification (Release 15)", 3GPP Standard; Technical Specification 3GPP TS 38.323, 3rd Generation Partnership Project (3GPP), vol. RAN WG2, No. V1.1.0, Dec. 12, 2017, pp. 1-31, XP051450270.

(56) References Cited

OTHER PUBLICATIONS

Nokia Alcatel-Lucent Shanghai Bell, "SOAP header", 3GPP Draft; R2-1702644 SOAP Header, 3rd Generation Partnership Project (3GPP), vol. RAN WG2, Spokane, USA, Apr. 3, 2017-Apr. 7, 2017, Mar. 24, 2017, XP051253235.
Dualcomm Incorporated, "Sdap header hardware implications", 3GPP Draft; R2-1713727, 3RD Generation Partnership Project (3GPP), vol. Ran WG2, Reno, USA, 20171127 - 20171201, Nov. 17, 2017, XP051372385.
Mvo, "Discussion on the SOAP header format", 3GPP Draft; R2-1704594, Discussion On the Soap Header Format, 3RD Generation Partnership Project (3GPP), vol. Ran WG2, Hangzhou, China, 20170515 -20170519, May 14, 2017, XP051275149.
Extended European Search Report dated Oct. 1, 2020, issued in European Patent Application No. 19738121.3.
Korean Notice of Allowance dated May 12, 2022, issued in Korean Patent Application No. 10-2018-0008417.
Indian Office Action dated Apr. 6, 2022, issued in Indian Patent Application No. 202037025247.
Indian Office Action dated Mar. 1, 2022, issued in Indian Patent Application No. 202037004391.
CATT, Introduction of DEFLATE based UDC Solution, R2-1714278, 3GPP TSG-RAN2 Meeting #100, Dec. 1, 2017, Reno, USA,.
Chinese Office Action dated May 30, 2022, issued in Chinese Patent Application No. 201980007804.5.
European Decision to Refuse dated Jul. 21, 2022, issued in European Patent Application No. 19738121.3.

\* cited by examiner

FIG. 3E
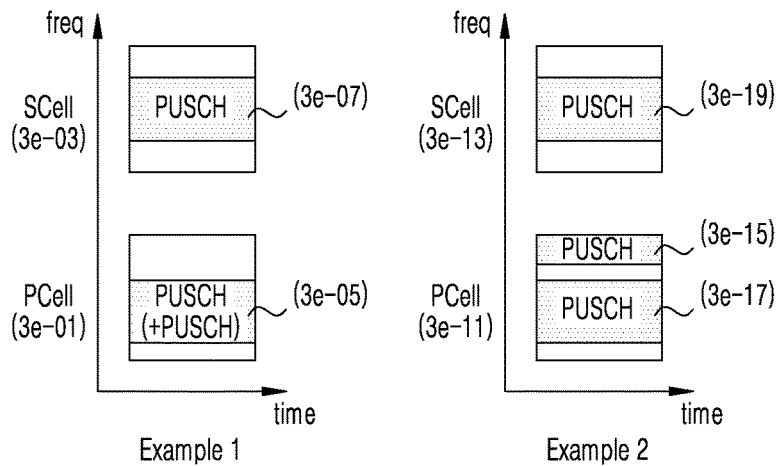
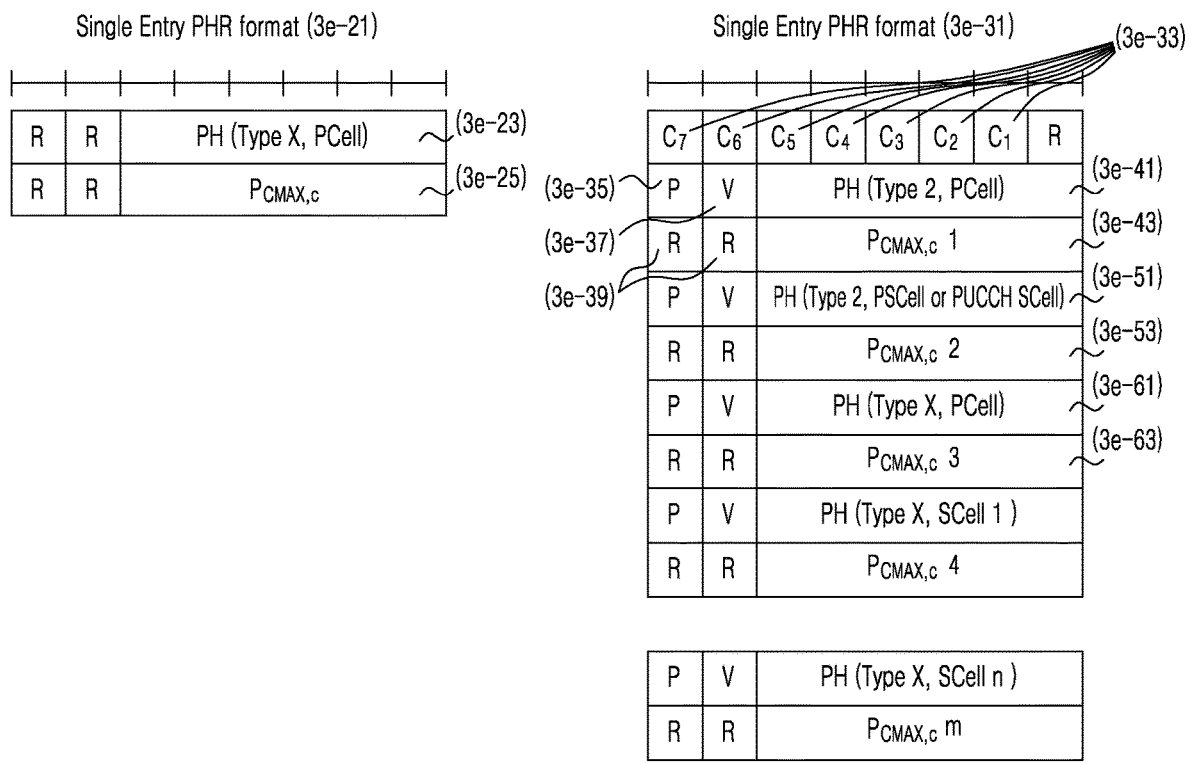

METHOD AND APPARATUS FOR WIRELESS COMMUNICATION IN WIRELESS COMMUNICATION SYSTEM

CROSS-REFERENCE TO RELATED APPLICATION(S)

This application is a continuation application of prior application Ser. No. 16/244,655, filed on Jan. 10, 2019, which has issued as U.S. Pat. No. 10,873,880 on Dec. 22, 2020 and is based on and claims priority under 35 U.S.C. § 119(a) of a Korean patent application numbers 10-2018-0003416, filed on Jan. 10, 2018 and 10-2018-0008417, filed on Jan. 23, 2018, in the Korean Intellectual Property Office, the disclosure of each of which is incorporated by reference herein in its entirety.

BACKGROUND

1. Field

The disclosure relates to a method and apparatus for wireless communication in a wireless communication system.

2. Description of Related Art

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post long-term evolution (LTE) systems.' In order to achieve a high data transmission rate, 5G communication systems are being developed to be implemented in a super-high frequency band (millimeter wave (mmWave)), e.g., a band of 60 GHz. In order to reduce the occurrence of stray electric waves in such a super-high frequency band and to increase a transmission distance of electric waves in 5G communication systems, various technologies are being studied, for example: beamforming, massive multiple input multiple output (MIMO), full dimensional MIMO (FD-MIMO), array antennas, analog beam-forming, and large scale antennas. In order to improve system networks for 5G communication systems, various technologies have been developed, e.g., evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is being newly provided, in which technology related to the IoT is combined with, for example, technology for processing big data through connection with a cloud server. In order to implement the IoT, various technical components are required, such as, a sensing technique, wired/wireless communication and network infrastructures, a service interfacing technique, a security technique, etc. In recent years, techniques including a sensor network for connecting objects, machine to machine (M2M) communication, machine type communication (MTC), etc. have been studied. In the IoT environment, intelligent Internet Technology (IT) services may be provided to collect and analyze data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are implemented by using 5G communication technology including beam-forming, MIMO, array antenna, etc. The application of the cloud RAN as a big data processing technique described above may be an example of convergence of the 5G communication technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of efficiently providing communication in a wireless communication system.

Additional aspects will be set forth in part in the description which follows and, in part, will be apparent from the description, or may be learned by practice of the presented embodiments of the disclosure.

In accordance with an aspect of the disclosure, an operation method of a transmitting apparatus in a wireless communication system is provided. The operation method includes receiving a Service data adaptation protocol (SDAP) header configuration and a header compression configuration through higher layer signaling and when an SDAP entity receives first data from an upper layer, generating an SDAP header and transmitting second data obtained by adding the generated SDAP header to the first data to a packet data convergence protocol (PDCP) entity, the generating and the transmitting being performed by the SDAP entity, performing, by the PDCP entity, header compression on an upper layer header of the second data, excluding the SDAP header, performing, by the PDCP entity, ciphering on data of the second data, excluding the SDAP header and generating a PDCP header and transmitting third data obtained by adding the generated PDCP header to the ciphered data to a lower layer, the generating and the transmitting being performed by the PDCP entity.

In accordance with another aspect of the disclosure, an operation method of a receiving apparatus in a wireless communication system is provided. The operation method includes receiving a SDAP header configuration and a header compression configuration through higher layer signaling when a PDCP entity receives first data from an lower layer, reading and removing, by the PDCP entity, a PDCP header and an SDAP header from the first data, performing, by the PDCP entity, deciphering on data obtained by removing the PDCP header and the SDAP header from the first data, transmitting, by the PDCP entity, second data obtained by performing header decompression on the deciphered data to an upper layer.

In accordance with another aspect of the disclosure, a transmitting apparatus in a wireless communication system is provided. The apparatus includes a transceiver configured to receive a SDAP header configuration and a header compression configuration through higher layer signaling and a controller configured to control an SDAP entity to generate an SDAP header and to transmit second data obtained by adding the generated SDAP header to first data to a PDCP entity when the SDAP entity receives the first data from an upper layer, and control the PDCP entity to perform header compression on an upper layer header of the second data, excluding the SDAP header, to perform ciphering on data of the second data, excluding the SDAP header, to generate a PDCP header and to transmit third data obtained by adding the generated PDCP header to the ciphered data to a lower layer.

In accordance with another aspect of the disclosure, a receiving apparatus in a wireless communication system is provided. The apparatus includes a transceiver configured to receive a SDAP header configuration and a header compression configuration through higher layer signaling and a controller configured to control a PDCP entity to read and remove a PDCP header and an SDAP header from first data when the PDCP entity receives the first data from an lower layer, perform deciphering on data obtained by removing the PDCP header and the SDAP header from the first data, and transmit second data obtained by performing header decompression on the deciphered data to an upper layer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2O illustrates a procedure in which a SDAP entity generates a SDAP header with respect to data received from an upper layer, and a PDCP entity performs header compression (i.e., ROHC), applies integrity protection to the SDAP header, and does not perform ciphering on the SDAP header, according to an embodiment of the disclosure;

FIG. 2AA illustrates a configuration of a UE according to an embodiment of the disclosure;

FIG. 2AB illustrates a configuration of a base station according to an embodiment of the disclosure;

FIG. 3E illustrates a method of transmitting an uplink according to a configuration and a type of the uplink, according to an embodiment of the disclosure;

Throughout the drawings, like reference numerals will be understood to refer to like parts, components, and structures.

DETAILED DESCRIPTION

Figure 1A:
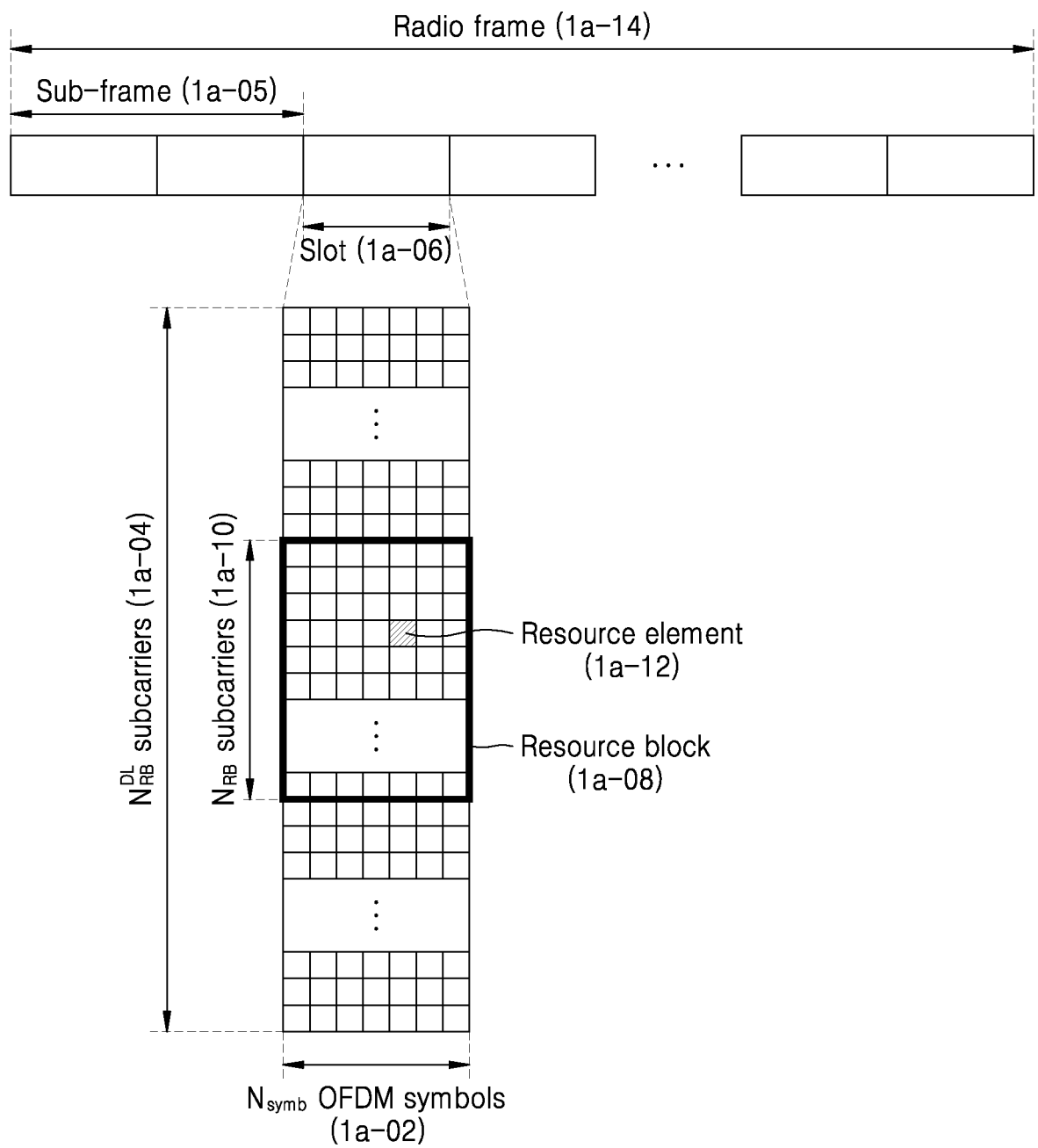
FIG. 1A is a diagram of a transmission structure of a time-frequency domain that is a downlink (DL) wireless resource region of a long-term evolution (LTE) system, an LTE-advanced (LTE-A) system, or a similar system according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

While describing the embodiments of the disclosure, technical content that is well-known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of" when preceding a list of elements, modify the entire list of elements and do not modify the individual elements of the list.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the embodiments of the disclosure to one of ordinary skill in the art, and the disclosure will only be defined by the appended claims.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

In the following descriptions, a term used for identifying an access node, a term referring to a network entity, a term referring to messages, a term indicating an interface between network entities, a term indicating various pieces of identification information, or the like are provided for convenience of description. Therefore, the disclosure is not limited to the following terms, and other terms referring to objects having equivalent technical meanings may be used.

For convenience of descriptions, the disclosure uses terms and names defined in the $3^{rd}$ generation partnership project long term evolution (3GPP LTE) standard or uses modified terms and names based on the terms and names. However, the disclosure is not limited to the terms and the names and may be equally applied to systems conforming to other standards.

FIG. 1A is a diagram of a transmission structure of a time-frequency domain that is a DL wireless resource region of an LTE system or a similar system according to an embodiment of the disclosure.

Referring to FIG. 1A, a horizontal axis represents a time domain and a vertical axis represents a frequency domain in a wireless resource region. In the time domain, the minimum transmission unit is an OFDM symbol, and $N_{symb}$ OFDM symbols 1a-02 are gathered to constitute one slot 1a-06, and two slots are gathered to constitute one sub-frame 1aa-05. The length of the slot is 0.5 ms, and the length of the sub-frame is 0.1 ms. A radio frame 1a-14 is a time domain interval composed of 10 sub-frames. The minimum transmission unit in the frequency domain is a subcarrier, and the transmission bandwidth of the whole system is composed of $N_{RB}^{DL}$ subcarriers 1a-04 in total. However, such specific numerical values may vary according to a system.

In the time-frequency domain, a basic unit of a resource is a resource element (RE) 1a-12, and may be indicated as an OFDM symbol index and a subcarrier index. A resource block (RB) 1a-08 or a PRB is defined as $N_{symb}$ successive OFDM symbols 1a-02 in the time domain and $N_{RB}$ successive subcarriers 1a-10 in the frequency domain. Accordingly, one RB 1a-08 is composed of $N_{symb} \times N_{RB}$ REs 1a-12 in one slot.

In general, the minimum transmission unit of data is RB, and in the LTE system, it is general that $N_{symb}$ is 7 and $N_{RB}$ is 2, and $N_{BW}$ and $N_{RB}$ are in proportion to the system transmission bandwidth. However, a system other than the LTE system may use a different value. A data rate is increased in proportion to the number of RBs being scheduled.

In the LTE system, 6 transmission bandwidths may be defined and operated. In the case of an FDD system that divides and operates a DL and a UL through a frequency, the transmission bandwidth of the DL and the transmission bandwidth of the UL may differ from each other. A channel bandwidth indicates a radio frequency (RF) bandwidth that corresponds to the system transmission bandwidth. Table 1 presents a corresponding relationship between the system transmission bandwidth defined in the LTE system and the channel bandwidth. For example, in the LTE system having the channel bandwidth of 10 MHz, the transmission bandwidth is composed of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

DL control information may be transmitted within first N OFDM symbols in a sub-frame. N={1, 2, 3} in general. Accordingly, in accordance with the amount of control information to be transmitted in a current sub-frame, the value N may be varied for each sub-frame. The control information may include a control channel transmission interval indicator indicating how many OFDM symbols the control information is transmitted through, scheduling information on DL data or UL data, and a HARQ ACK/NACK signal.

In the LTE system, the scheduling information on the DL data or the UL data is transferred from a BS to a terminal through downlink control information (DCI). The DCI is defined in various formats, and may indicate, according to each format, whether the scheduling information is UL data scheduling information (UL grant) or DL data scheduling information (DL grant), whether the DCI is compact DCI having a small size of control information, whether spatial multiplexing using multiple antennas is applied, or whether the DCI is DCI for controlling power. For example, DCI format 1 that is the scheduling control information (DL grant) of the DL data may include at least the following control information:

Resource allocation type 0/1 flag: Indicates whether a resource allocation type is type 0 or type 1. The type 0 allocates resources in units of resource block groups (RBGs) through applying of a bitmap type. In the LTE system, a basic unit of scheduling is RB that is expressed as a time and frequency domain resource, and the RBG is composed of a plurality of RBs to be considered as the basic unit of scheduling in the type 0. The type 1 allocates a specific RB in the RBG.

RB assignment: Indicates RB that is allocated for data transmission. An expressed resource is determined in accordance with a system bandwidth and a resource allocation method.

Modulation and coding scheme (MCS): indicates a modulation method used for data transmission and the size of a TB that is data to be transmitted.

HARQ process number: Indicates a process number of HARQ.

New data indicator: Indicates whether HARQ transmission is initial transmission or retransmission.

Redundancy version: Indicates a redundancy version of HARQ.

Transmit power control (TPC) command for physical uplink control channel (PUCCH): Indicates a transmission power control command for a PUCCH that is a UL control channel.

The DCI may be transmitted through a physical downlink control channel (PDCCH) (or control information, hereinafter, mixedly used) that is a DL physical control channel or an enhanced PDCCH (EPDCCH) (or enhanced control information, hereinafter, mixedly used) after passing through a channel coding and modulation process.

In general, the DCI is scrambled by a specific radio network temporary identifier (RNTI) or terminal identifier independently with respect to each terminal, is added with a cyclic redundancy check (CRC), is channel-coded, and then is configured as an independent PDCCH to be transmitted. In the time domain, the PDCCH is mapped and transmitted for the control channel transmission interval. A mapping location of the PDCCH in the frequency domain is determined by the identifier (ID) of each terminal, and the PDCCH may be transmitted through the transmission band of the whole system.

The DL data may be transmitted through a physical downlink shared channel (PDSCH) that is a physical channel for transmitting the DL data. The PDSCH may be transmitted after the control channel transmission interval, and scheduling information, such as a concrete mapping location or a modulation method in the frequency domain, may be included in the DCI to be transmitted through the PDCCH.

The BS notifies the terminal of a modulation method applied to the PDSCH to be transmitted and a transport block size (TBS) to be transmitted, by using an MCS among the control information constituting the DCI. The MCS may be composed of 5 bits, or may be composed of another number of bits. The TBS corresponds to the size before channel coding for error correction is applied to the TB to be transmitted by the BS.

According to an embodiment a TB may include a MAC header, a MAC CE, at least one MAC service data unit (SDU), and padding bits. Also, a TB may indicate a unit of data or MAC protocol data unit (PDU) transmitted from a MAC layer to a physical layer.

The modulation method supported in the LTE system is quadrature phase shift keying (QPSK), 16 quadrature amplitude modulation (16 QAM), or 64 QAM, and respective modulation orders ($Q_m$) correspond to 2, 4, and 6. In the case of the QPSK modulation, 2 bits per symbol may be transmitted, in the case of the 16Q QAM modulation, 4 bits per symbol may be transmitted, and in the case of the 64 QAM modulation, 6 bits per symbol may be transmitted. Also, a modulation method of 256 QAM or more may be used according to system modification.

Figure 1B:
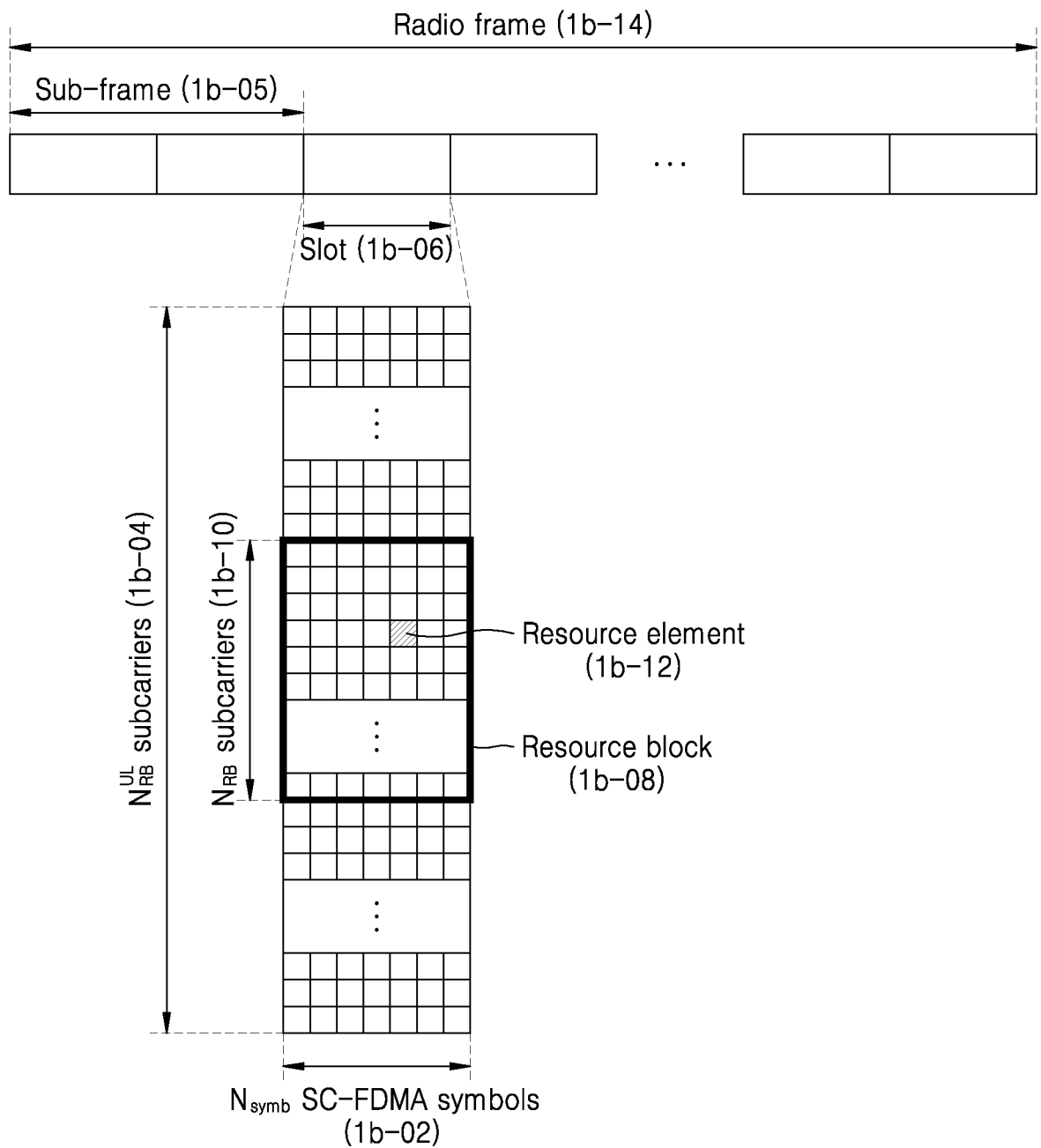
FIG. 1B is a diagram of a transmission structure of a time-frequency domain that is an uplink (UL) wireless resource region of an LTE system, an LTE-A system, or a similar system according to an embodiment of the disclosure.

FIG. 1B is a diagram of a transmission structure of a time-frequency domain that is a UL wireless resource region of an LTE system or a similar system according to an embodiment of the disclosure.

Referring to FIG. 1B, a horizontal axis represents a time domain and a vertical axis represents a frequency domain in a wireless resource region. A radio frame 1b-14 is a time domain interval. In the time domain, the minimum transmission unit in a time domain is a SC-FDMA symbol 1b-02, and $N_{symbUL}$ SC-FDMA symbols are gathered to constitute one slot 1b-06. Two slots are gathered to constitute one sub-frame 1b-05. The minimum transmission unit in the frequency domain is a subcarrier, and a transmission bandwidth of the whole system is composed of $N_{RB}^{UL}$ subcarriers 1b-04 in total. RE may have a value in proportion to a system transmission bandwidth.

In the time-frequency domain, a basic unit of a resource is a RE 1b-12, and may be defined as an SC-FDMA symbol index and a subcarrier index. An RB pair 1b-08 is defined as $N_{symb}$ successive SC-FDMA symbols in the time domain and $N_{RB}$ successive subcarriers 1b-10 in the frequency domain. Accordingly, one RB is composed of $N_{symb} \times N_{RB}$ REs. In general, the minimum transmission unit of data or control information is an RB unit. A PUCCH may be mapped on the frequency domain corresponding to 1 RB, and transmitted for one sub-frame.

In the LTE system, the timing relationship between a PDSCH that is a physical channel for transmitting DL data or a PDCCH/EPDCCH including a semi-persistent scheduling (SPS) release and a UL physical channel (PUCCH or PUSCH) through which a corresponding HARQ ACK/NACK is transmitted may be defined. As an example, in the LTE system that operates as a FDD, the HARQ ACK/NACK corresponding to the PDSCH transmitted in the (n−4)-th sub-frame or the PDCCH/EPDCCH including the SPS release is transmitted by the PUCCH or PUSCH in the n-th sub-frame.

In the LTE system, a DL HARQ adapts an asynchronous HARQ method in which data re-transmission time is not fixed. When the HARQ NACK is fed back from the terminal with respect to the initially transmitted data transmitted by the BS, the BS freely determines the transmission time of re-transmitted data through the scheduling operation. The terminal buffers the data that is determined as an error as the result of decoding the received data for the HARQ operation, and then performs combining with the next re-transmitted data.

When PDSCH including DL data transmitted from the BS in a sub-frame n is received, the terminal transmits UL control information including HARQ ACK or NACK of the DL data to the BS through PUCCH or PUSCH in a sub-frame n+k. k may be differently defined in accordance with FDD or time division duplex (TDD) of the LTE system and a sub-frame configuration. As an example, in an FDD LTE system, k is fixed to 4. On the other hand, in a TDD LTE system, k may be changed in accordance with the sub-frame configuration and a sub-frame number. During data transmission through a plurality of carriers, the value of k may be differently applied in accordance with a TDD configuration of each carrier.

In the LTE system, in contrast to DL HARQ, UL HARQ adapts a synchronous HARQ method in which data transmission time is fixed. A UL/DL timing relationship among a physical uplink shared channel (PUSCH) that is a physical channel for transmitting the UL data, a PDCCH that is a preceding DL control channel, and a physical hybrid indicator channel (PHICH) that is a physical channel through which the DL HARQ ACK/NACK corresponding to the PUSCH is transmitted may be fixed by a following rule.

When the PDCCH including UL scheduling control information transmitted from the BS in the sub-frame n or the PHICH through which the DL HARQ ACK/NACK is transmitted is received, the terminal transmits the UL data corresponding to the control information through the PUSCH in the sub-frame n+k. k may be differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number.

In the FDD LTE system, when the BS transmits a UL scheduling approval or a DL control signal and data to the terminal in the sub-frame n, the terminal receives the UL scheduling approval or the DL control signal and data in the sub-frame n. First, when the UL scheduling approval is received in the sub-frame n, the terminal transmits the UL data in a sub-frame n+4. When the DL control signal and data are received in the sub-frame n, the terminal transmits HARQ ACK or NACK with respect to the DL data in the sub-frame n+4. Accordingly, a preparation time for the terminal to receive the UL scheduling approval and transmit the UL data or to receive the DL data and transmit the HARQ ACK or NACK is 3 ms corresponding to three sub-frames. Also, when the terminal receives the PHICH that carries the DL HARQ ACK/NACK from the BS in a sub-frame i, the PHICH corresponds to the PUSCH transmitted by the terminal in a sub-frame i-k. k is differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number. During data transmission through a plurality of carriers, the k value may be differently applied in accordance with the TDD configuration of each carrier.

A wireless communication system has been described above with reference to an LTE system, but an embodiment is not applied only to the LTE system, but may also be applied to various wireless communication systems, such as NR and 5G systems. When an embodiment is applied to another wireless communication system, the value of k may be changed even in a system using a modulation method corresponding to FDD.

In a 5G or NR access technology system that is a new communication system, various services are designed to be freely multiplexed in time and frequency resources, and accordingly, waveforms, numerology, reference signals, etc. may be dynamically or freely assigned as required by a corresponding service. In order to provide an optimal service to a terminal in wireless communication, data transmission optimized via the quality of a channel and measurement of interference is important, and thus, it is essential to accurately measure a channel state. However, unlike 4G communication in which channel and interference characteristics are not largely changed according to frequency resources, channel and interference characteristics may be largely changed according to a service in a 5G or NR system, and thus support of a subset in terms of a frequency resource group (FRG) is required such that the channel and interference characteristics are divided and measured. Meanwhile, types of services supported in the 5G or NR system may be divided into categories of eMBB, mMTC, and URLLC. Here, eMBB may be a service targeting high speed transmission of high capacity data, mMTC may be a service targeting terminal power consumption minimization and access of a plurality of terminals, and URLLC may be a service targeting high reliability and low latency. Different requirements may be applied based on a type of service applied to a terminal.

As such, a plurality of services may be provided to a user in a communication system, and methods and apparatuses for providing the plurality of services in the same time section are required so as to provide the plurality of services to the user.

Figure 2A:
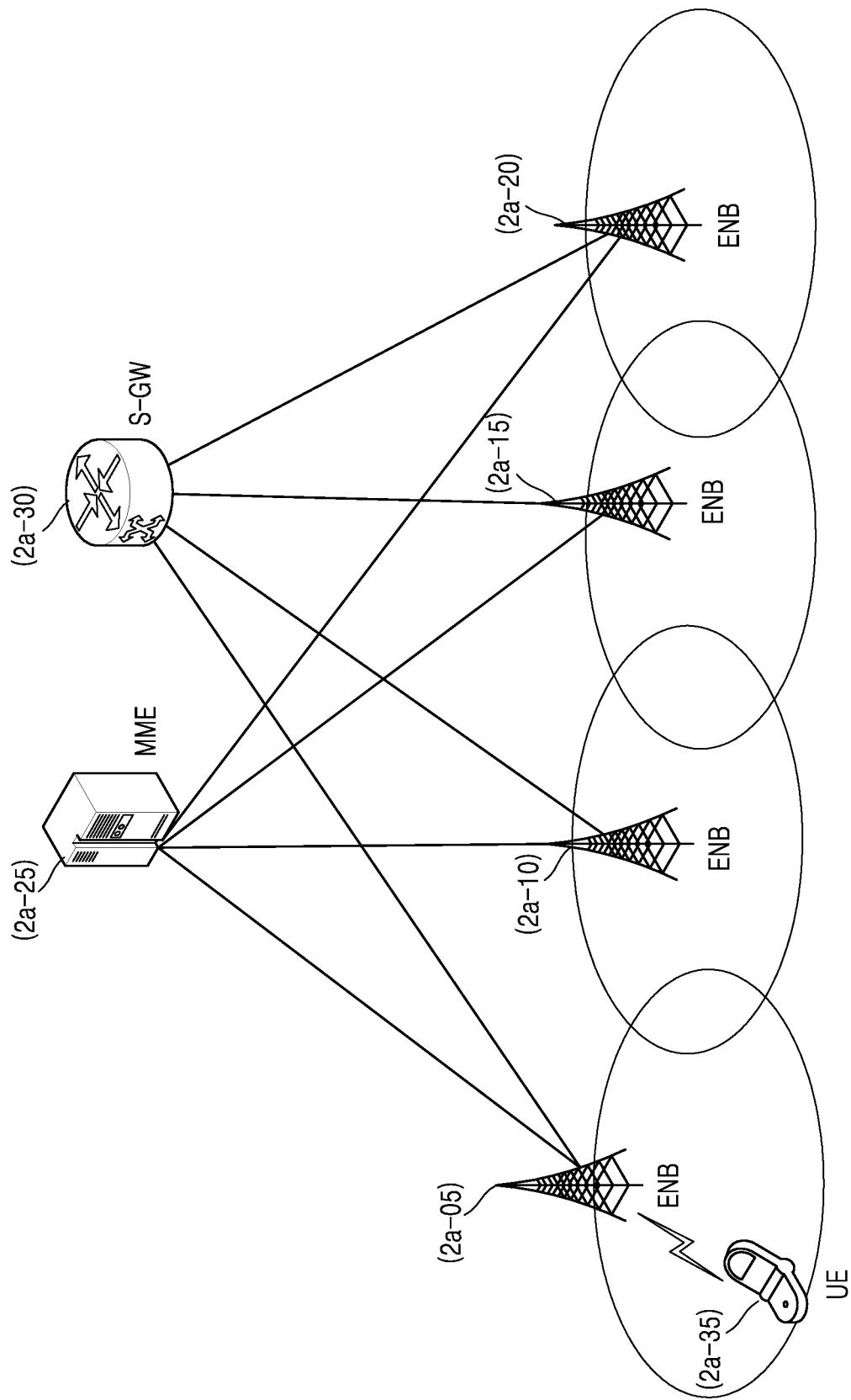
FIG. 2A is a diagram illustrating a configuration of a long-term evolution (LTE) system according to an embodiment of the disclosure.

FIG. 2A is a diagram illustrating a configuration of an LTE system according to an embodiment of the disclosure.

Referring to FIG. 2A, a wireless access network of the LTE system is configured of a plurality of evolved node B (hereinafter, an eNB, a Node B, or a base station) 2a-05, 2a-10, 2a-15, and 2a-20, a mobility management entity (MME) 2a-25, and a serving-gateway (S-GW) 2a-30. A user equipment (hereinafter, a UE or a terminal) 2a-35 accesses an external network via the eNBs 2a-05, 2a-10, 2a-15, and 2a-20 and the S-GW 2a-30.

In FIG. 2A, the eNBs 2a-05, 2a-10, 2a-15, and 2a-20 each correspond to a node B of a Universal Mobile Telecommunication System (UMTS) system. The eNBs 2a-05, 2a-10, 2a-15, and 2a-20 are each connected to the UE 2a-35, and performs complicated functions, compared to the node B. In the LTE system, all user traffic including a real-time service such as a voice over internet protocol (VoIP) based on an internet protocol is serviced through a shared channel, and thus, a device to obtain and schedule a plurality of pieces of state information including buffer states, available transmission power states, channel states, or the like of UEs is required, and the eNBs 2a-05, 2a-10, 2a-15, and 2a-20 each correspond to the device. In general, one eNB controls a plurality of cells. For example, to implement transmission speed of 100 Mbps, the LTE system uses, as a wireless access technology, orthogonal frequency division multiplexing (OFDM) at a bandwidth of 20 MHz. Also, the LTE system uses an AMC technique of determining a modulation scheme and a channel coding rate according to a channel state of UE. The S-GW 2a-30 is a device configured to provide a data bearer, and generates or removes the data bearer, in response to a control of the MME 2a-25. The MME 2a-25 performs not only a mobility management function but also performs various control functions with respect to the UE, and is connected to a plurality of eNBs.

Figure 2B:
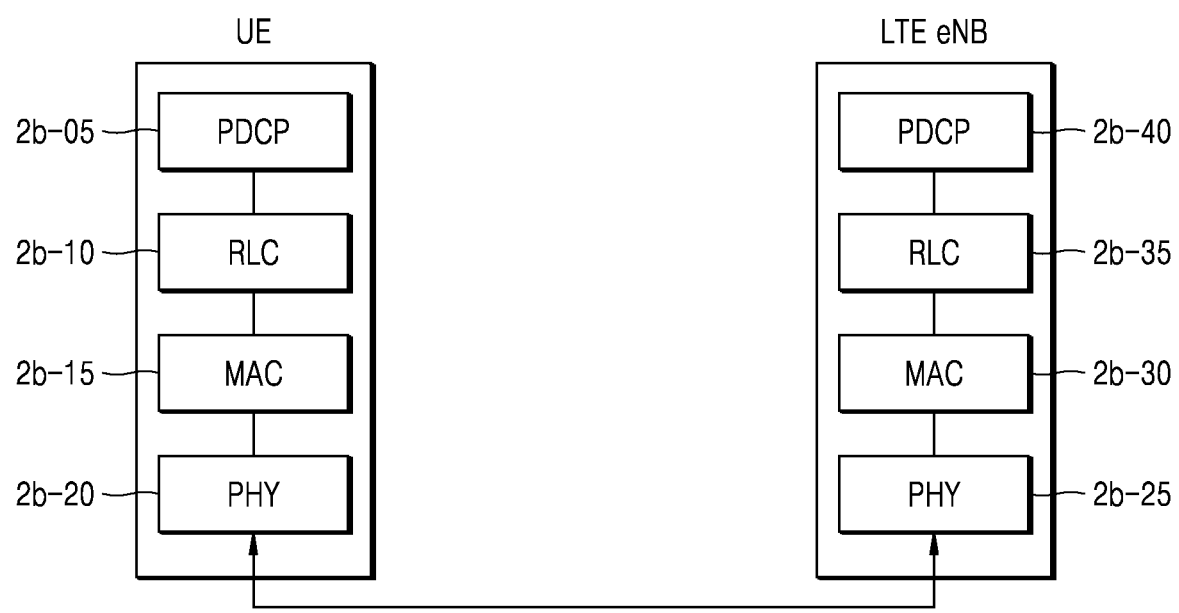
FIG. 2B is a diagram illustrating a radio protocol architecture in the LTE system according to an embodiment of the disclosure.

FIG. 2B is a diagram illustrating a radio protocol architecture in the LTE system according to an embodiment of the disclosure.

Referring to FIG. 2B, a radio protocol of the LTE system may be configured of Packet Data Convergence Protocols (PDCPs) 2b-05 and 2b-40, radio link controls (RLCs) 2b-10 and 2b-35, medium access controls (MACs) 2b-15 and 2b-30, and physical layers (PHYs) 2b-20 and 2b-25, respectively in a UE and an LTE eNB. The PDCPs 2b-05 and 2b-40 may perform operations such as IP header compression/decompression. The main functions of the PDCPs 2b-05 and 2b-40 are summarized as follows.

Header compression and decompression (ROHC only).
Transfer of user data.
In-sequence delivery of upper layer packet data units (PDUs) at PDCP re-establishment procedure for RLC AM.
For split bearers in DC (RLC AM): PDCP PDU routing for transmission and PDCP PDU reordering for reception.
Duplicate detection of lower layer service data units (SDUs) at PDCP re-establishment procedure for RLC AM.
Retransmission function PDCP SDUs at handover and for split bearers in DC, PDCP PDUs at PDCP data-recovery procedure, for RLC AM.
Ciphering and deciphering function.
Timer-based SDU discard in uplink.

The RLCs 2b-10 and 2b-35 reconfigure a PDCP PDU to an appropriate size to perform an automatic repeat request (ARQ) operation or the like. The main functions of the RLCs 2b-10 and 2b-35 are summarized below.

Transfer of upper layer PDUs.
Error correction through ARQ (only for acknowledged mode (AM) data transfer).
Concatenation, segmentation and reassembly of RLC SDUs (only for unacknowledged mode (UM) and AM data transfer).
Re-segmentation of RLC data PDUs (only for AM data transfer).
Reordering of RLC data PDUs (only for UM and AM data transfer).
Duplicate detection (only for UM and AM data transfer).
Protocol Error detection (only for AM data transfer).
RLC SDU discard (only for UM and AM data transfer).
RLC re-establishment.

The MACs 2b-15 and 2b-30 are connected to a plurality of RLC entities configured in one UE, and perform operations of multiplexing RLC PDUs into MAC PDUs and demultiplexing RLC PDUs from MAC PDUs. The main functions of the MACs 2b-15 and 2b-30 are summarized below.

Mapping between logical channels and transport channels.
Multiplexing/demultiplexing of MAC SDUs belonging to one or different logical channels into/from transport blocks (TB) delivered to/from the physical layer on transport channels.
Scheduling information reporting.
Error correction through HARQ.
Priority handling between logical channels of one UE.
Priority handling between UEs by means of dynamic scheduling.
MBMS service identification.
Transport format selection.
Padding.

The PHYs 2b-20 and 2b-25 perform operations of channel-encoding and modulating upper layer data and transmitting OFDM symbols through a wireless channel by converting the upper layer data to the OFDM symbols or operations of demodulating and channel-decoding OFDM symbols received through the wireless channel, and transmitting decoded data to an upper layer.

Figure 2C:
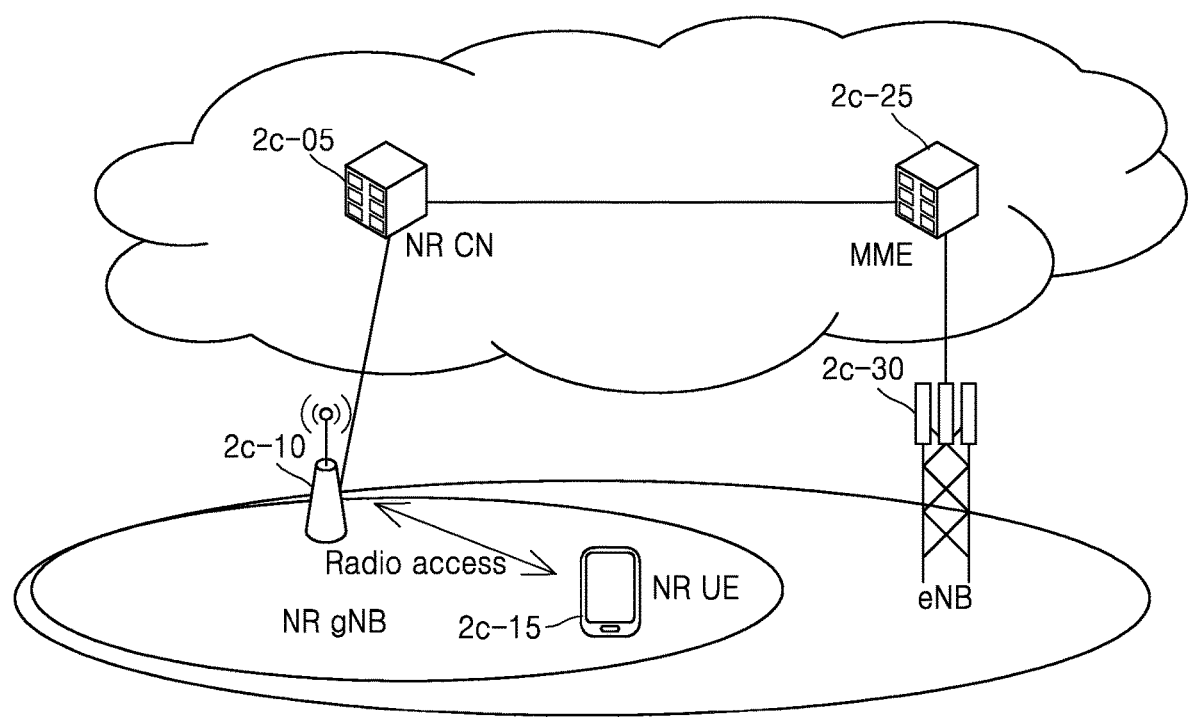
FIG. 2C is a diagram illustrating a configuration of a new mobile communication system according to an embodiment of the disclosure.

FIG. 2C is a diagram illustrating a configuration of a new mobile communication system according to an embodiment of the disclosure.

Referring to FIG. 2C, a wireless access network of the new mobile communication system (hereinafter, new radio (NR) or $5^{th}$ generation (5G)) is configured of a new radio node B (hereinafter, NR gNB or NR base station) 2c-10 and a new radio core network (hereinafter, NR CN) 2c-05. A new radio user equipment (hereinafter, a NR UE or a terminal) 2c-15 accesses an external network through the NR gNB 2c-10 and the NR CN 2c-05.

In FIG. 2C, the NR gNB 2c-10 corresponds to an evolved node B (eNB) of LTE system. The NR gNB 2c-10 is connected to the NR UE 2c-15 through a wireless channel and may provide an excellent service, compared to the eNB according to the related art. In the NR, all user traffic is serviced through a shared channel, and thus, a device to obtain and schedule a plurality of pieces of state information including buffer states, available transmission power states, channel states, or the like of UEs is required, and the NR gNB 2c-10 corresponds to the device. In general, one NR gNB 2c-10 controls a plurality of cells. A bandwidth greater than the maximum bandwidth of existing LTE may be given to achieve high speed data transmission, compared to the existing LTE system, and beamforming technology may be added to wireless access technology such as OFDM.

Also, the NR uses an AMC technique of determining a modulation scheme and a channel coding rate according to a channel state of a UE. The NR CN 2c-05 performs functions of supporting mobility, configuring a bearer, configuring a quality of service (QoS), or the like. The NR CN 2c-05 is a device configured to perform not only a mobility management function but also perform various control functions with respect to the UE, and is connected to a plurality of NBs. In addition, the NR may interoperate with the LTE system, and the NR CN 2c-05 is connected to an MME 2c-25 via a network interface. The MME 2c-25 is connected to an eNB 2c-30 that is an existing base station.

Figure 2D:
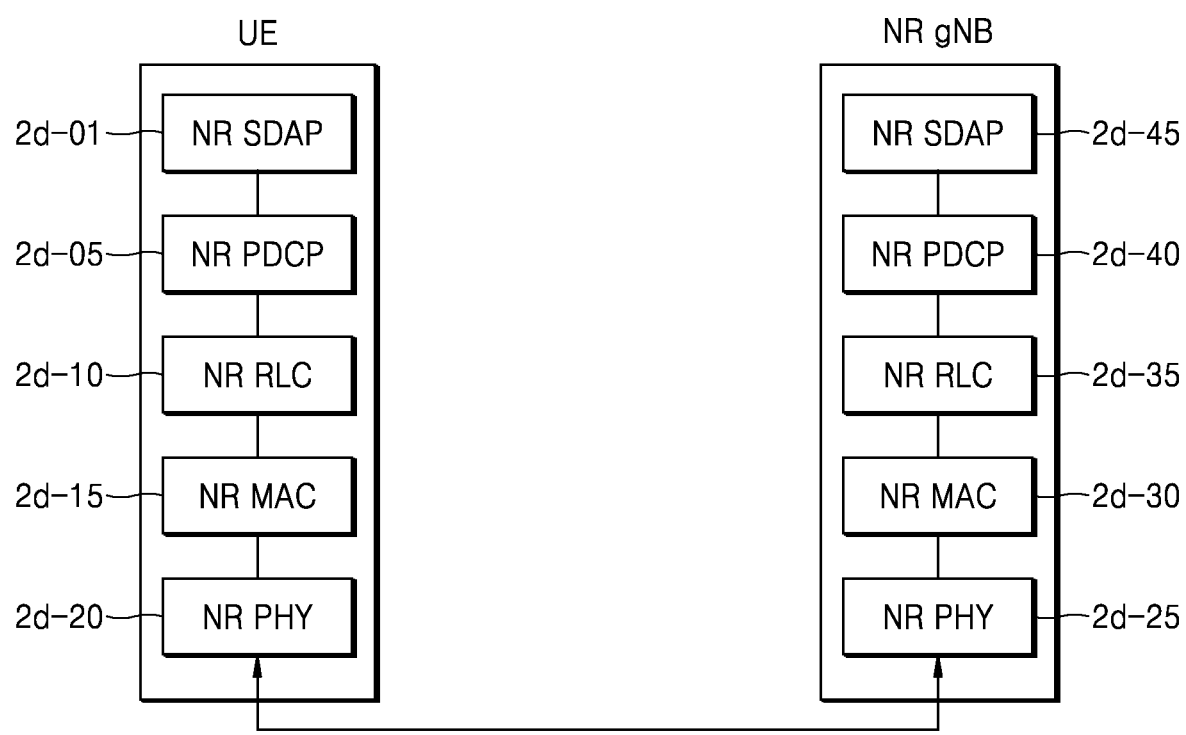
FIG. 2D is a diagram illustrating a radio protocol architecture of the new mobile communication system according to an embodiment of the disclosure.

FIG. 2D is a diagram illustrating a radio protocol architecture of the new mobile communication system according to an embodiment of the disclosure.

Referring to FIG. 2D, a radio protocol of the new mobile communication system is configured of NR service data access protocol (SDAP) 2d-01 and 2d-45, NR PDCPs 2d-05 and 2d-40, NR RLCs 2d-10 and 2d-35, and NR MACs 2d-15 and 2d-30.

The main functions of the NR SDAP 2*d*-01 and 2*d*-45 may include some of the following functions.

Transfer of user plane data.

Mapping between a quality of service (QoS) flow and a data bearer for both downlink and uplink.

Marking QoS flow identification (ID) in both downlink and uplink packets.

Reflective QoS flow to data bearer mapping for the uplink SDAP PDUs.

With respect to a SDAP entity, a UE may be configured, through a radio resource control (RRC) message, about whether to use a header of the SDAP entity according to each PDCP entity, each bearer, or each logical channel, or to use a function of the SDAP entity. When a SDAP header is configured, the SDAP header may instruct the UE to update or reconfigure mapping information about the QoS flow and the data bearer for both an uplink and downlink, by using a 1-bit indicator of non-access stratum (NAS) reflective QoS configuration and a 1-bit indicator of access stratum (AS) reflective QoS configuration. The SDAP header may include QoS flow ID information indicating a QoS. QoS information may be used as a data processing priority order, scheduling information, or the like to be used in supporting a smooth service.

The main functions of the NR PDCPs 2*d*-05 and 2*d*-40 may include some of the following functions.

Header compression and decompression (ROHC only).
Transfer of user data.
In-sequence delivery of upper layer PDUs.
Out-of-sequence delivery of upper layer PDUs.
PDCP PDU reordering for reception.
Duplicate detection of lower layer SDUs.
Retransmission of PDCP SDUs.
Ciphering and deciphering function.
Timer-based SDU discard in uplink.

In the above, reordering for reception of the NR PDCPs 2*d*-05 and 2*d*-40 may refer to a function of sequentially reordering of PDCP PDUs received from a lower layer, based on PDCP sequence numbers (SNs), and may include a function of transferring data to an upper layer in the reordered order or a function of directly transferring data without consideration of an order, a function of reordering the order and recording missing PDCP PDUs, a function of transmitting a state report about the missing PDCP PDUs to a transmitter, and a function of requesting retransmission of the missing PDCP PDUs.

The main functions of the NR RLCs 2*d*-10 and 2*d*-35 may include at least some of the following functions.

Transfer of upper layer PDU.
In-sequence delivery of upper layer PDUs.
Out-of-sequence delivery of upper layer PDUs.
Error Correction through ARQ.
Concatenation, segmentation and reassembly of RLC SDUs.
Re-segmentation of RLC data PDUs.
Reordering of RLC data PDUs.
Duplicate detection function.
Protocol error detection.
RLC SDU discard.
RLC re-establishment.

In this regard, the in-sequence delivery of the NR RLCs 2*d*-10 and 2*d*-35 may refer to a function of sequentially transferring RLC service data units (SDUs) received from a lower layer to an upper layer, and may include a function of reassembling and delivering a plurality of RLC SDUs when one RLC SDU which has been segmented into the plurality of RLC SDUs is received, a function of reordering the received RLC PDUs according to RLC sequence numbers (SNs) or PDCP SNs, a function of reordering the order and recording missing RLC PDUs, a function of transmitting a state report about the missing RLC PDUs to a transmitter, and a function of requesting retransmission of the missing RLC PDUs. When there is a missing RLC SDU, the in-sequence delivery may include a function of sequentially transferring only the RLC SDUs before the missing RLC SDU to the upper layer, and even when there is the missing RLC SDU, when a preset timer has expired, may include a function of sequentially transferring, to the upper layer, all RLC SDUs received before the preset timer started, or may include a function of sequentially transferring all RLC SDUs received up to now to the upper layer even when there is the missing RLC SDU, when the timer has expired. Also, the NR RLCs 2*d*-10 and 2*d*-35 may process the RLC PDUs in the order of reception (in the order of arrival irrespective of the order of sequence numbers), and may transfer the RLC PDUs to the NR PDCPs 2*d*-05 and 2*d*-40, regardless of the order (out-of-sequence delivery), and in a case of a segment, the NR RLCs 2*d*-10 and 2*d*-35 may receive segments stored in a buffer or to be received at a later time, may reconstruct the segments into one RLC PDU, and then may process and transfer the RLC PDU to the NR PDCPs 2*d*-05 and 2*d*-40. The NR RLCs 2*d*-10 and 2*d*-35 may not include a concatenation function. The concatenation function may be performed by the NR MACs 2*d*-15 and 2*d*-30 or may be replaced by a multiplexing function of the NR MACs 2*d*-15 and 2*d*-30.

The out-of-sequence delivery of the NR RLCs 2*d*-10 and 2*d*-35 may refer to a function of transferring the RLC SDUs received from the lower layer directly to the upper layer, regardless of the order. When one RLC SDU which has been segmented into a plurality of RLC SDUs is received, the out-of-sequence delivery may include a function of reassembling and transferring the plurality of RLC SDUs. Also, the out-of-sequence delivery may include a function of storing RLC SN or PDCP SN of the received RLC PDUs and ordering thereof, and recording of missing RLC PDUs.

The NR MACs 2*d*-15 and 2*d*-30 may be connected to a plurality of NR RLC entities configured in one UE, and the main function of the NR MACs 2*d*-15 and 2*d*-30 may include some of the following functions.

Mapping between logical channels and transport channels.
Multiplexing/demultiplexing of MAC SDUs.
Scheduling information reporting function.
Error correction through HARQ.
Priority handling between logical channels of one UE.
Priority handling between UEs by means of dynamic scheduling.
MBMS service identification.
Transport format selection.
Padding.

The NR PHYs 2*d*-20 and 2*d*-25 perform operations of channel-encoding and modulating upper layer data and transmitting OFDM symbols through a wireless channel by converting the upper layer data to the OFDM symbols, or operations of demodulating and channel-decoding OFDM symbols received through the wireless channel, and transmitting decoded data to an upper layer.

In the new mobile communication system, a data bearer that transmits data may perform integrity protection and verification. A PDCP layer that processes data transmitted/received to/by the data bearer performs ciphering and deciphering having high complexity, and a process of the integrity protection and verification also requires high complexity. Therefore, to decrease data processing complexity, there is a need for an efficient process of integrity protection and verification.

The disclosure provides a method of decreasing, in a wireless communication system, data processing complexity with respect to a signaling radio bearer or a data radio bearer (DRB) in which integrity protection and integrity verification are configured.

Figure 2E:
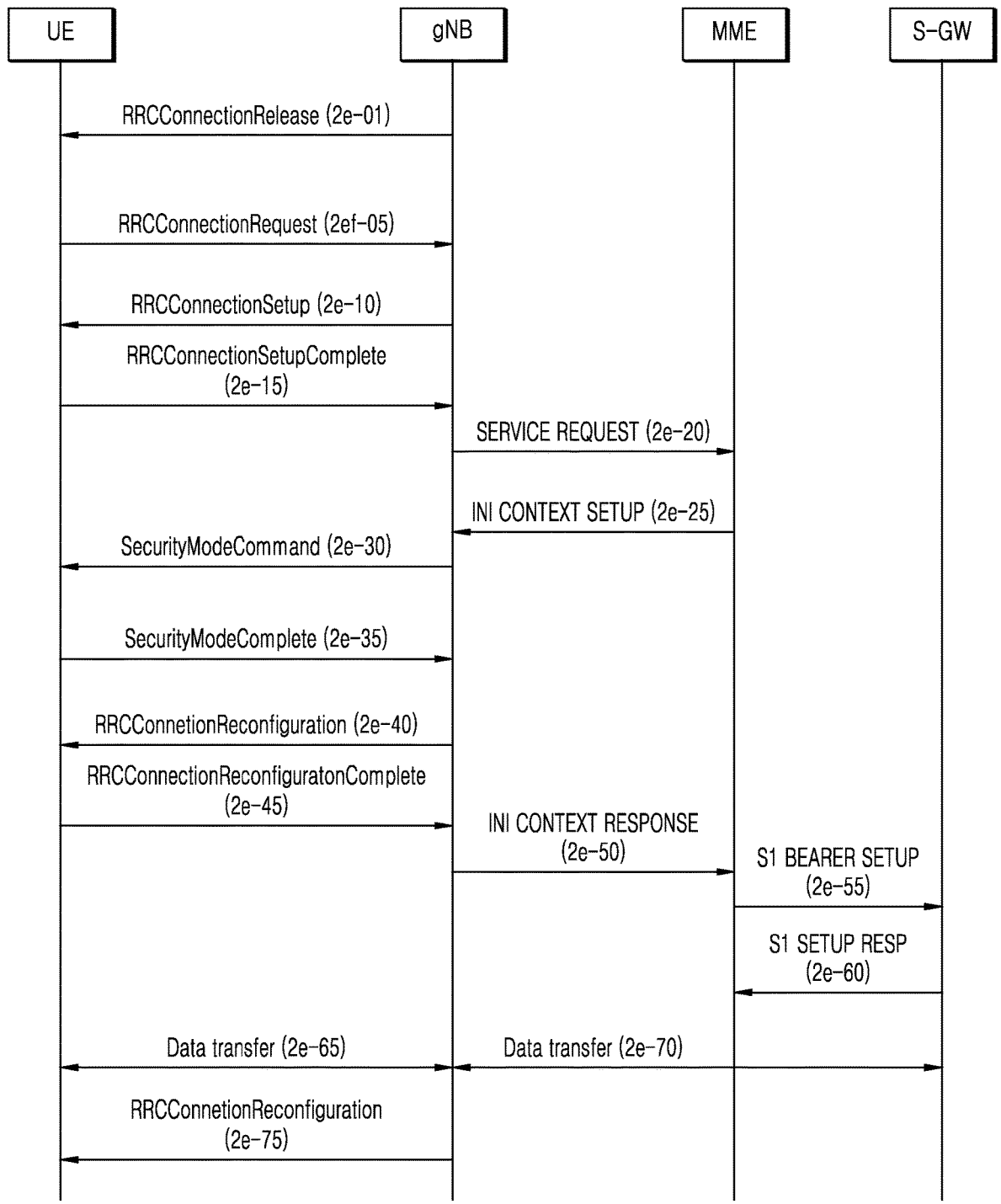
FIG. 2E is a diagram illustrating a procedure, performed by a base station, for instructing whether to perform uplink data compression (UDC), when a terminal establishes connection to a network, according to an embodiment of the disclosure.

FIG. 2E is a diagram illustrating a procedure, performed by a gNB, for instructing whether to perform uplink data compression (UDC), when a UE establishes connection to a network, according to an embodiment of the disclosure.

FIG. 2E illustrates a procedure in which a base station (gNB) requests UDC when a UE in an RRC idle mode or an RRC inactive (or lightly-connected) mode is switched to an RRC connected mode and establishes connection to a network.

Referring to FIG. 2E, when the UE that transceives data in the RRC connected mode does not transceive data for a certain reason or for a certain time, the gNB transmits an RRCConnectionRelease message to the UE to switch to the RRC idle mode (operation 2e-01). Afterward, when the UE that has not established a connection with the base station (hereinafter, the idle mode UE) has data to be transmitted, the idle mode UE performs an RRC connection establishment procedure with the gNB. The idle mode UE establishes reverse transmission synchronization with the gNB through a random access procedure, and transmits an RRCConnectionRequest message to the gNB (operation 2e-05). The RRCConnectionRequest message may include an identifier of the idle mode UE, establishment cause, or the like. The gNB transmits an RRCConnectionSetup message such that the idle mode UE establishes RRC connection (operation 2e-10). The RRCConnectionSetup message may include information indicating whether to use UDC for each logical channel (LogicalChannelConfig), each bearer, or each PDCP layer (PDCP-Config). In more detail, for each logical channel, each bearer, or each PDCP layer (or each Service Data Access Protocol (SDAP) layer), the RRCConnectionSetup message may indicate for which IP flow or QoS flow a UDC method is to be used (the RRCConnectionSetup message may configure information to the SDAP layer, the information being about IP flow or QoS flow in which the UDC method is to be used or not to be used, and then the SDAP layer may instruct the PDCP layer whether to use the UDC method with respect to each QoS flow. Alternatively, the PDCP layer may autonomously check each QoS flow and then may determine whether to apply the UDC method thereto). In this regard, when it is instructed to use the UDC method, an identifier of a predefined library or dictionary which is to be used in the UDC method or a size of a buffer to be used in the UDC method may be indicated. Also, the RRCConnectionSetup message may include an uplink data decompression setup or release command. In this regard, when configured to use UDC, the UE may always be configured with an RLC AM bearer (a lossless mode due to an ARQ function or a retransmission function) and may not be configured with a header compression protocol (e.g., a robust header compression (ROHC) protocol). Also, the RRCConnectionSetup message may include information indicating whether to use a function of the SDAP entity or whether to use the SDAP header for each logical channel (LogicalChannelConfig), each bearer, or each PDCP apparatus (PDCP-Config). The RRCConnectionSetup message may include information that indicates whether to apply ROHC (IP packet header compression) to each logical channel (LogicalChannelConfig), each bearer, or each PDCP apparatus (PDCP-Config), and configures, by using respective indicators, whether to apply ROHC to respective uplink and downlink. However, ROHC and UDC cannot be simultaneously configured in one PDCP entity, one logical channel, or one bearer, and UDC may be configured in no more than two bearers. Also, the RRCConnectionSetup message may include information indicating whether to apply integrity protection and integrity verification to each logical channel (LogicalChannelConfig), each bearer, or each PDCP apparatus (PDCP-Config), and integrity protection and integrity verification may be configured in consideration of a maximum date transmission rate of a corresponding PDCP entity, a corresponding bearer, or a corresponding logical channel. When UDC, header compression (ROHC) or integrity protection is configured in each logical channel, each bearer, or each PDCP apparatus, use thereof may be configured for each of the uplink and downlink. That is, it is possible to configure that the uplink uses it whereas the downlink does not use it or that the uplink does not use it whereas the downlink uses it. Also, the RRCConnectionSetup message may include RRC connection configuration information. RRC connection may refer to a signaling radio bearer (SRB) and may be used in transceiving an RRC message that is a control message between the UE and the gNB. The UE establishes the RRC connection and then transmits an RRCConnetionSetupComplete message to the gNB (operation 2e-15). In a case where the gNB does not know of or desires to check capability of the currently connected UE, the gNB may transmit a UE capability inquiry message. The UE may transmit a UE capability report message. The UE capability report message may include an indicator indicating whether the UE is capable of using the UDC method, ROHC, or integrity protection. The RRCConnetionSetupComplete message may include a control message such as a SERVICE REQUEST message for requesting an MME to configure a bearer for a certain service by the UE.

The gNB transmits the SERVICE REQUEST message included in the RRCConnetionSetupComplete message to the MME (operation 2e-20), and the MME determines whether to provide the service requested by the UE. As a result of the determination, when the MME decides to provide the service requested by the UE, the MME transmits an INITIAL CONTEXT SETUP REQUEST message to the gNB (operation 2e-25). The INITIAL CONTEXT SETUP REQUEST message includes QoS information to be applied in configuring a data radio bearer (DRB), security information (e.g., a security key, a security algorithm, or the like) to be applied to the DRB, or the like.

The gNB exchanges a SecurityModeCommand message 2e-30 and a SecurityModeComplete message 2e-35 with the UE to configure a security mode. After the security mode is completely configured, the gNB transmits an RRCConnectionReconfiguration message to the UE (operation 2e-40). The RRCConnectionReconfiguration message may include information indicating whether to use a UDC method for each logical channel (LogicalChannelConfig), each bearer, or each PDCP layer (PDCP-Config). In more detail, for each logical channel, each bearer, or each PDCP layer (or each SDAP layer), the RRCConnectionReconfiguration message may indicate for which IP flow or QoS flow the UDC method is to be used (the RRCConnectionReconfiguration message may configure information for the SDAP layer, the information being about IP flow or QoS flow in which the UDC method is to be used or not to be used, and then the SDAP layer may instruct the PDCP layer whether to use the UDC method with respect to each QoS flow. Alternatively, the PDCP layer may autonomously check each QoS flow and then may determine whether to apply the UDC method thereto). In this regard, when it is instructed to use the UDC method, an identifier of a predefined library or dictionary which is to be used in the UDC method or a size of a buffer to be used in the UDC method may be indicated. Also, the RRCConnectionReconfiguration message may include an uplink data decompression setup or release command. In this regard, when configured to use UDC, the UE may always be configured with an RLC AM bearer (a lossless mode due to an ARQ function or a retransmission function) and may not be configured with a header compression protocol (e.g., a ROHC protocol). Also, the RRCConnectionReconfiguration message may include information indicating whether to use a function of the SDAP entity or whether to use the SDAP header for each logical channel (LogicalChannelConfig), each bearer, or each PDCP apparatus (PDCP-Config). The RRCConnectionReconfiguration message may include information that indicates whether to apply ROHC (IP packet header compression) to each logical channel (LogicalChannelConfig), each bearer, or each PDCP apparatus (PDCP-Config), and configures, by using respective indicators, whether to apply ROHC to respective uplink and downlink. However, ROHC and UDC cannot be simultaneously configured in one PDCP entity, one logical channel, or one bearer, and UDC may be configured in no more than two bearers. Also, the RRCConnectionReconfiguration message may include information indicating whether to apply integrity protection and integrity verification to each logical channel (LogicalChannelConfig), each bearer, or each PDCP apparatus (PDCP-Config), and integrity protection and integrity verification may be configured in consideration of a maximum date transmission rate of a corresponding PDCP entity, a corresponding bearer, or a corresponding logical channel. When UDC, header compression (ROHC) or integrity protection is configured in each logical channel, each bearer, or each PDCP apparatus, use thereof may be configured for each of the uplink and downlink. That is, it is possible to configure that the uplink uses it whereas the downlink does not use it or that the uplink does not use it whereas the downlink uses it. Also, the RRCConnectionReconfiguration message may include setting information about the DRB to process user data, and the UE sets the DRB by using the setting information and transmits an RRCConnectionReconfigurationComplete message to the gNB (operation 2e-45).

The gNB completes the DRB setting with the UE and then transmits an INITIAL CONTEXT SETUP COMPLETE message to the MME (operation 2e-50), and the MME receives the message and then exchanges a Si BEARER SETUP message 2e-55 and a Si BEARER SETUP RESPONSE message 2e-60 with a S-GW so as to set a Si bearer. The Si bearer indicates data transmission connection that is set up between the S-GW and the gNB, and corresponds to the DRB in a one-to-one manner. When the aforementioned procedure is completed, the UE and the gNB transfer and receive data via the S-GW (operations 2e-65 and 2e-70). The aforementioned general data transfer procedure includes three steps that are RRC connection setting, security setting, and DRB setting. The gNB may transmit an RRCConnectionReconfiguration message to the UE so as to newly perform, add, or change configuration of the UE (operation 2e-75). The RRCConnectionReconfiguration message may include information indicating whether to use a UDC method for each logical channel (LogicalChannelConfig), each bearer, or each PDCP layer (PDCP-Config). In more detail, for each logical channel, each bearer, or each PDCP layer (or each SDAP layer), the RRCConnectionReconfiguration message may indicate for which IP flow or QoS flow the UDC method is to be used (the RRCConnectionReconfiguration message may configure information to the SDAP layer, the information being about IP flow or QoS flow in which the UDC method is to be used or not to be used, and then the SDAP layer may instruct the PDCP layer whether to use the UDC method with respect to each QoS flow. Alternatively, the PDCP layer may autonomously check each QoS flow and then may determine whether to apply the UDC method thereto). In this regard, when it is instructed to use the UDC method, an identifier of a predefined library or dictionary which is to be used in the UDC method or a size of a buffer to be used in the UDC method may be indicated. Also, the RRCConnectionReconfiguration message may include an uplink data decompression setup or release command. In this regard, when configured to use UDC, it may always be configured with an RLC AM bearer (a lossless mode due to an ARQ function or a retransmission function) and may not be configured with a header compression protocol (e.g., a ROHC protocol). Also, the RCConnectionReconfiguration message may include information indicating whether to use a function of the SDAP entity or whether to use the SDAP header for each logical channel (LogicalChannelConfig), each bearer, or each PDCP apparatus (PDCP-Config). The RCConnectionReconfiguration message may include information that indicates whether to apply ROHC (IP packet header compression) to each logical channel (LogicalChannelConfig), each bearer, or each PDCP apparatus (PDCP-Config), and configures, by using respective indicators, whether to apply ROHC to respective uplink and downlink. However, ROHC and UDC cannot be simultaneously configured in one PDCP entity, one logical channel, or one bearer, and UDC may be configured in no more than two bearers. Also, the RCConnectionReconfiguration message may include information indicating whether to apply integrity protection and integrity verification to each logical channel (LogicalChannelConfig), each bearer, or each PDCP apparatus (PDCP-Config), and integrity protection and integrity verification may be configured in consideration of a maximum date transmission rate of a corresponding PDCP entity, a corresponding bearer, or a corresponding logical channel. When UDC, header compression (ROHC) or integrity protection is configured in each logical channel, each bearer, or each PDCP apparatus, use thereof may be configured for each of the uplink and downlink. That is, it is possible to configure that the uplink uses it whereas the downlink does not use it or that the uplink does not use it whereas the downlink uses it.

Figure 2F:
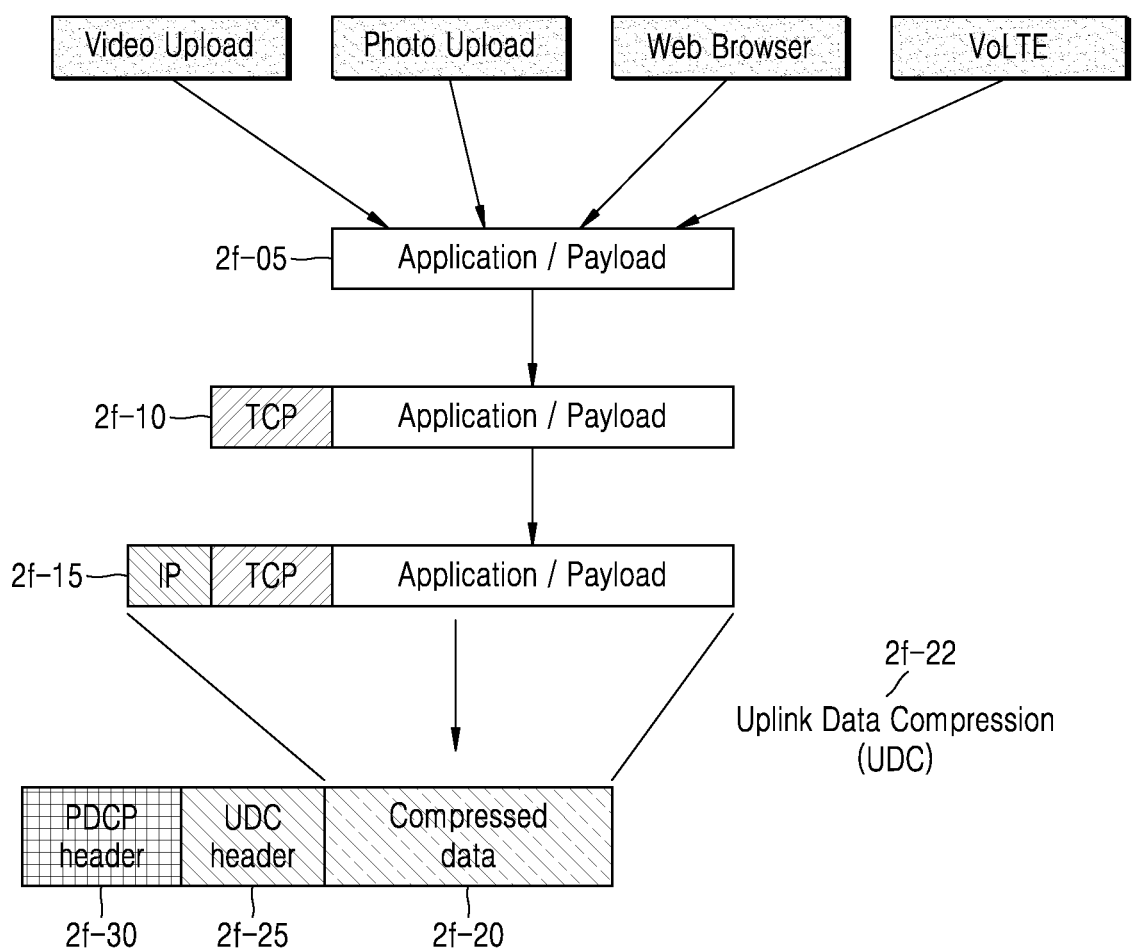
FIG. 2F is a diagram illustrating a procedure and a data structure for performing UDC, according to an embodiment of the disclosure.

FIG. 2F is a diagram illustrating a procedure and a data structure for performing UDC, according to an embodiment of the disclosure.

In FIG. 2F, uplink data 2f-05 may be generated as data corresponding to services including video transmission, photo transmission, web browsing, Voice over long-term evolution (VoLTE), or the like. A plurality of items of data generated in an application layer may be processed through a network data transmission layer such as a transmission control protocol and internet protocol (TCP/IP) or a user datagram Protocol (UDP) to configure each of headers 2f-10 and 2f-15, and may be transferred to a PDCP layer. When the PDCP layer receives data (a PDCP SDU) from an upper layer, the PDCP layer may perform a procedure as described below.

In FIG. 2E, when the RRC message 2e-10, 2e-40, or 2e-75 indicates to use UDC in the PDCP layer, the PDCP layer performs UDC 2f-22 on the PDCP SDU as indicated by 2f-20 to compress uplink data, may configure a UDC header (a header for the compressed uplink data) 2f-25, may perform integrity protection when it is configured to perform integrity protection, may perform ciphering, and may configure a PDCP header 2f-30, thereby generating PDCP SDUs. A PDCP entity, which includes an apparatus for processing UDC (UDC compressor/UDC decompressor), determines whether to perform a UDC 2f-22 procedure on each data according to a configuration of an RRC message, and uses the UDC compressor/UDC decompressor. A transmitting end performs data compression 2f-22 by using the UDC compressor in a PDCP layer of the transmitting end, and a receiving end performs data decompression by using the UDC decompressor in a PDCP layer of the receiving end.

The procedure of FIG. 2F may be applied not only to compression of uplink data but also applied to compression of downlink data, the compressions being performed by the UE. Also, the descriptions of the uplink data may be equally applied to the downlink data.

Figure 2G:
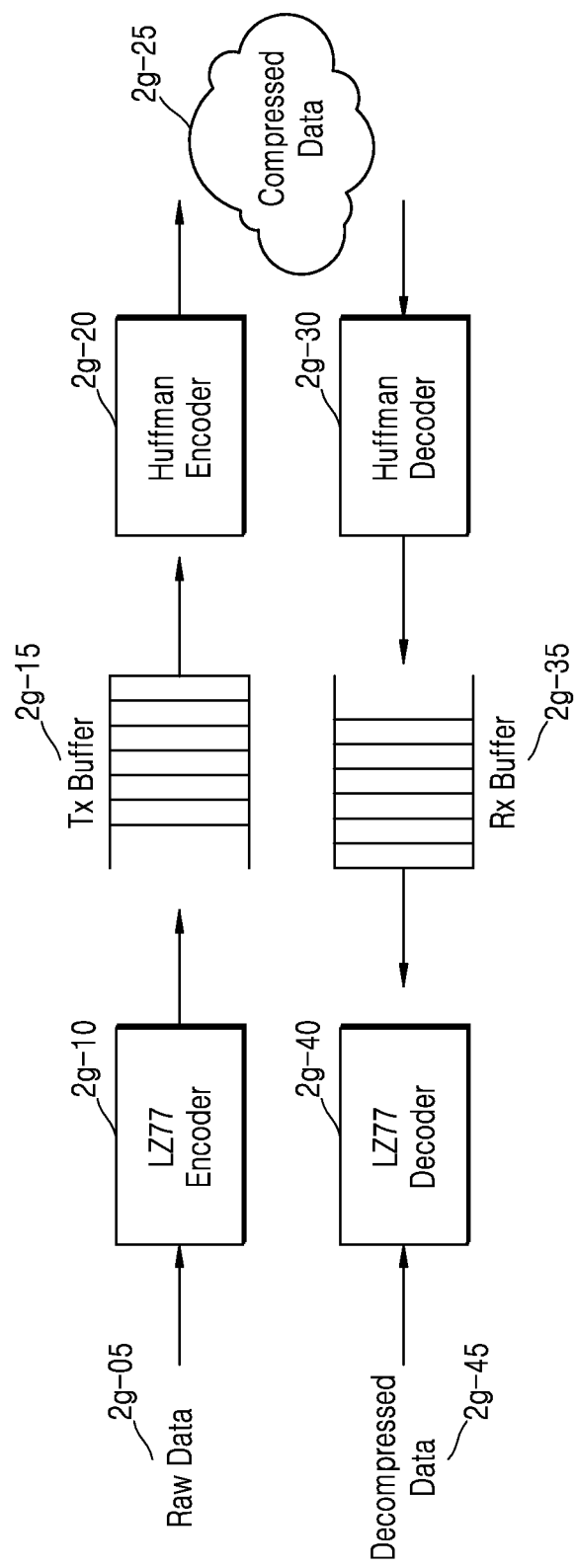
FIG. 2G is a diagram for describing a UDC method according to an embodiment of the disclosure.

FIG. 2G is a diagram for describing UDC according to an embodiment of the disclosure.

FIG. 2G illustrates a DEFLATE-based UDC algorithm which is a lossless compression algorithm. According to the DEFLATE-based UDC algorithm, basically, uplink data may be compressed using a combination of an LZ77 algorithm and a Huffman coding algorithm.

According to the LZ77 algorithm, an operation of finding repeated occurrences of data within a sliding window is performed, and when the repeated occurrences within the sliding window are found, data compression is performed by expressing the repeated data within the sliding window as a location and length thereof. The sliding window is called a buffer in the UDC method and may be set to 8 kilobytes or 32 kilobytes. That is, the sliding window or the buffer may record 8,192 or 32,768 characters, find repeated occurrences of data, and perform data compression by expressing the repeated data as a location and length thereof. Therefore, because the LZ77 algorithm is a sliding window scheme, that is, because subsequent data is coded immediately after previously coded data is updated in a buffer, successive data may have correlations therebetween. Thus, the subsequent data may be normally decoded only when the previously coded data is normally decoded. In this regard, the codes compressed and expressed as the location and length by using the LZ77 algorithm is compressed once again by using the Huffman coding algorithm. According to the Huffman coding algorithm, repeated characters may be found and data compression may be performed once again by assigning the shortest code to the most frequent character and assigning the longest code to the least frequent character. The Huffman coding algorithm is a prefix coding algorithm and is an optimal coding scheme by which all codes are uniquely decodable.

As described above, a transmitting end may encode raw data 2g-05 by using the LZ77 algorithm (2g-10), update a buffer 2g-15, and configure a UDC header by generating checksum bits for the content (or data) of the buffer. The checksum bits may be used by a receiving end to determine validity of a buffer state. The transmitting end may compress the codes encoded using the LZ77 algorithm, by using the Huffman coding algorithm (2g-20), and may transmit the compressed data as uplink data (2g-25). The receiving end may perform a decompression procedure on the compressed data received from the transmitting end, in an inverse manner to that of the transmitting end. That is, the receiving end may perform Huffman decoding (2g-30), may update a buffer (2g-35), and may check validity of the updated buffer, based on the checksum bits of the UDC header. Upon determining that the checksum bits have no error, the receiving end may decompress the data by performing decoding using the LZ77 algorithm (2g-40) to reconstruct the raw data and deliver the decompressed data to an upper layer (2g-45).

As described above, because the LZ77 algorithm is a sliding window scheme, that is, because subsequent data is coded immediately after previously coded data is updated in a buffer, successive data may have correlations therebetween. Thus, the subsequent data may be normally decoded only when the previously coded data is normally decoded. Therefore, a PDCP layer of the receiving end may check PDCP sequence numbers of a PDCP header, may check a UDC header (check an indicator indicating whether data compression is or is not performed), and may perform a data decompression procedure on compressed UDC data in ascending order of the PDCP sequence numbers.

Figure 2H:
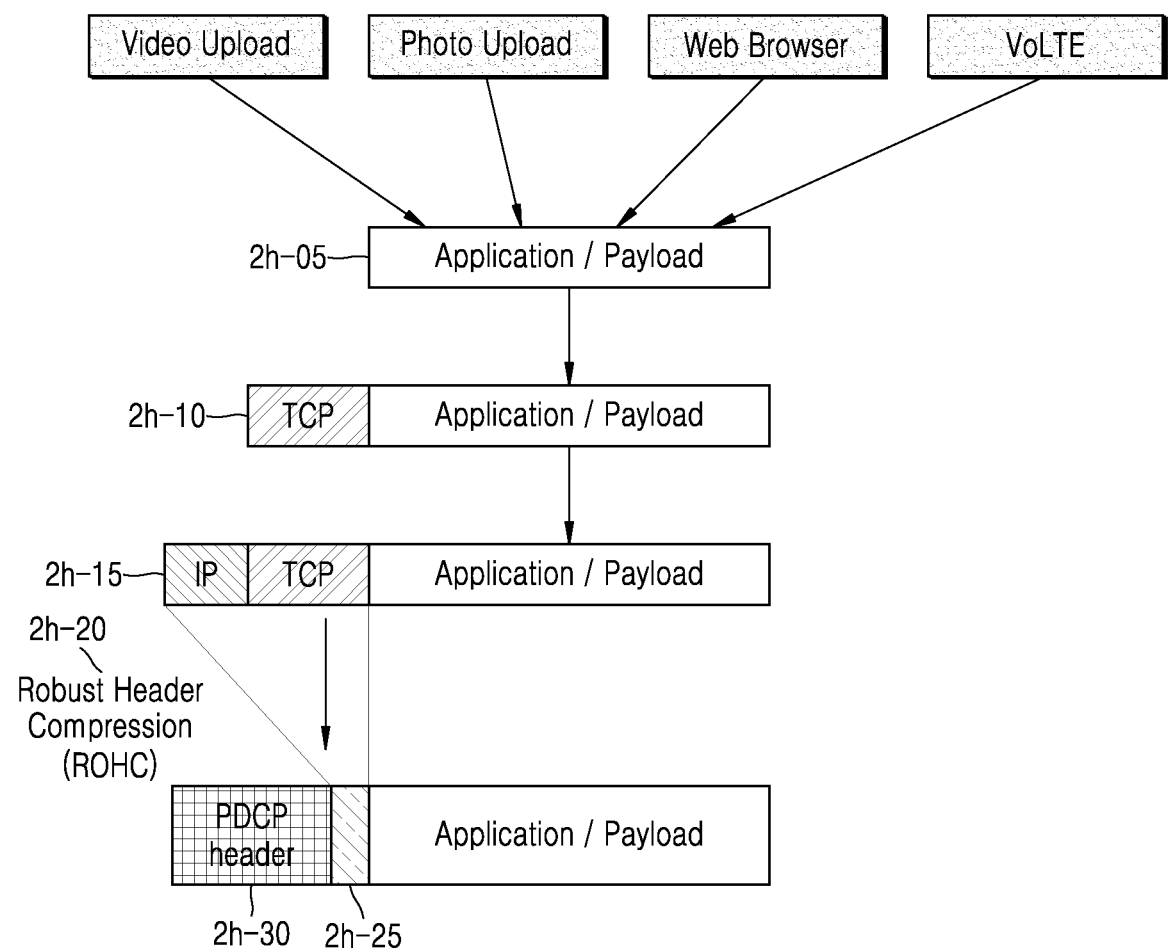
FIG. 2H illustrates a procedure and a data structure for performing robust header compression (ROHC), according to an embodiment of the disclosure.

FIG. 2H illustrates a procedure and a data structure for performing ROHC, according to an embodiment of the disclosure.

In FIG. 2F, uplink data 2h-05 may be generated as data corresponding to services including video transmission, photo transmission, web browsing, VoLTE, or the like. A plurality of items of data generated in an application entity may be processed through a network data transmission layer such as a TCP/IP or a UDP to configure each of headers 2h-10 and 2h-15, and may be transferred to a PDCP layer. When the PDCP layer receives data (a PDCP SDU) from an upper layer, the PDCP layer may perform a procedure as described below.

In FIG. 2E, when the RRC message 2e-10, 2e-40, or 2e-75 indicates to use ROHC in the PDCP layer, the PDCP layer performs ROHC on the PDCP SDU as indicated by 2h-20 to compress a header 2h-15 of the received data of the upper layer and generate a compressed header 2h-25, may perform integrity protection when it is configured to perform integrity verification, may perform ciphering, and may configure a PDCP header 2h-30, thereby generating a PDCP PDU. A PDCP entity, which includes a header compressor/a header decompressor, determines whether to perform header compression on each data according to a configuration of an RRC message, and uses the header compressor/the header decompressor. In a transmitting end, a PDCP entity of the transmitting end performs data compression by using the header compressor, and in a receiving end, a PDCP entity of the receiving end performs data decompression by using the header decompressor.

The procedure of FIG. 2H may be applied not only to compression of a header of uplink data but also applied to compression of a header of downlink data, the compressions being performed by the UE. Also, the descriptions of the uplink data may be equally applied to the downlink data.

Figure 2I:
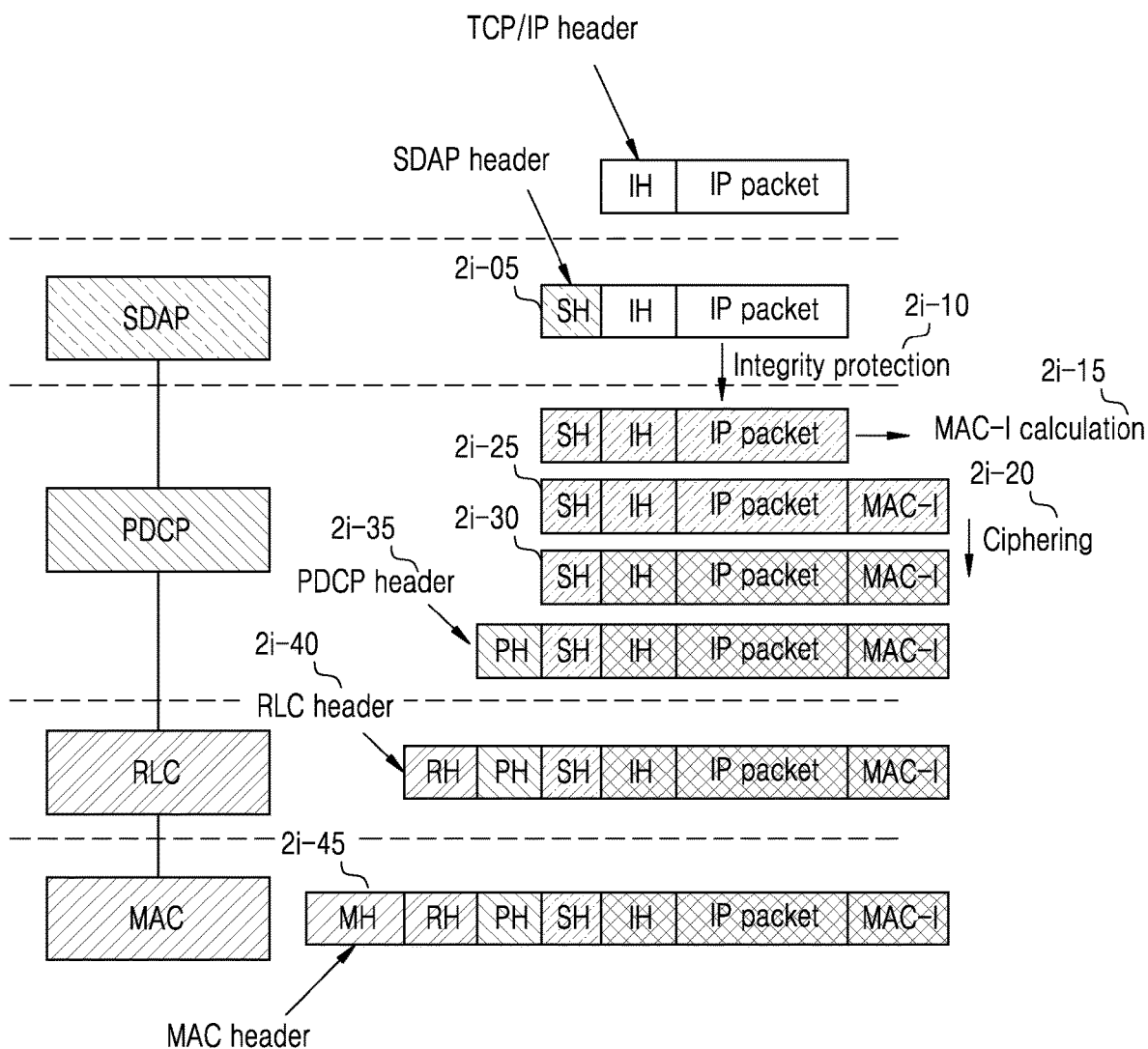
FIG. 2I illustrates a procedure in which a Service Data Access Protocol (SDAP) entity generates a SDAP header with respect to data received from an upper layer, and a packet data convergence protocol (PDCP) entity applies integrity protection to the SDAP header and does not perform ciphering, according to an embodiment of the disclosure.

FIG. 2I illustrates a procedure in which a SDAP entity generates a SDAP header with respect to data received from an upper layer, and a PDCP entity applies integrity protection to the SDAP header and does not perform ciphering, according to an embodiment of the disclosure.

In FIG. 2I, in a case where it is configured, in an RRC message, to use a function of the SDAP entity or to use a SDAP header, and it is configured, in the RRC message, to perform integrity protection and integrity verification, the RRC message as shown in FIG. 2E (see 2e-10, 2e-40, or 2e-75), when the SDAP entity receives data from the upper layer, the SDAP entity may generate and configure a SDAP header as in 2*i*-05, and may transfer the SDAP header to the PDCP entity. When integrity protection is configured, the PDCP entity may perform the integrity protection 2*i*-10 on a PDCP SDU (the SDAP header and IP packet 2*i*-05) received from the upper SDAP entity, and may calculate a message authentication code for integrity (MAC-I). When the MAC-I is calculated 2*i*-15, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2*i*-25. The MAC-I may have a certain size, e.g., a size of 4 bytes. The PDCP entity may perform ciphering 2*i*-20 on 2*i*-25 to which the MAC-I is concatenated, except for the SDAP header (2*i*-30), may generate, configure, and concatenate a PDCP header to the ciphered data to which the SDAP header has been concatenated (2*i*-35), and may transfer the data to a lower layer. Then, an RLC entity and a MAC entity may perform data processing (2*i*-40 and 2*i*-45).

A receiving end removes a MAC header and an RLC header and transfers the data to a PDCP layer, and a PDCP entity of the receiving end reads and then removes the PDCP header, and performs deciphering on the data part, except for the SDAP header. Afterward, the PDCP entity of the receiving end performs integrity verification on the SDAP header, an upper layer header (a TCP/IP header), and the data part, and calculates a computed MAC-I (X-MAC). When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer).

Figure 2J:
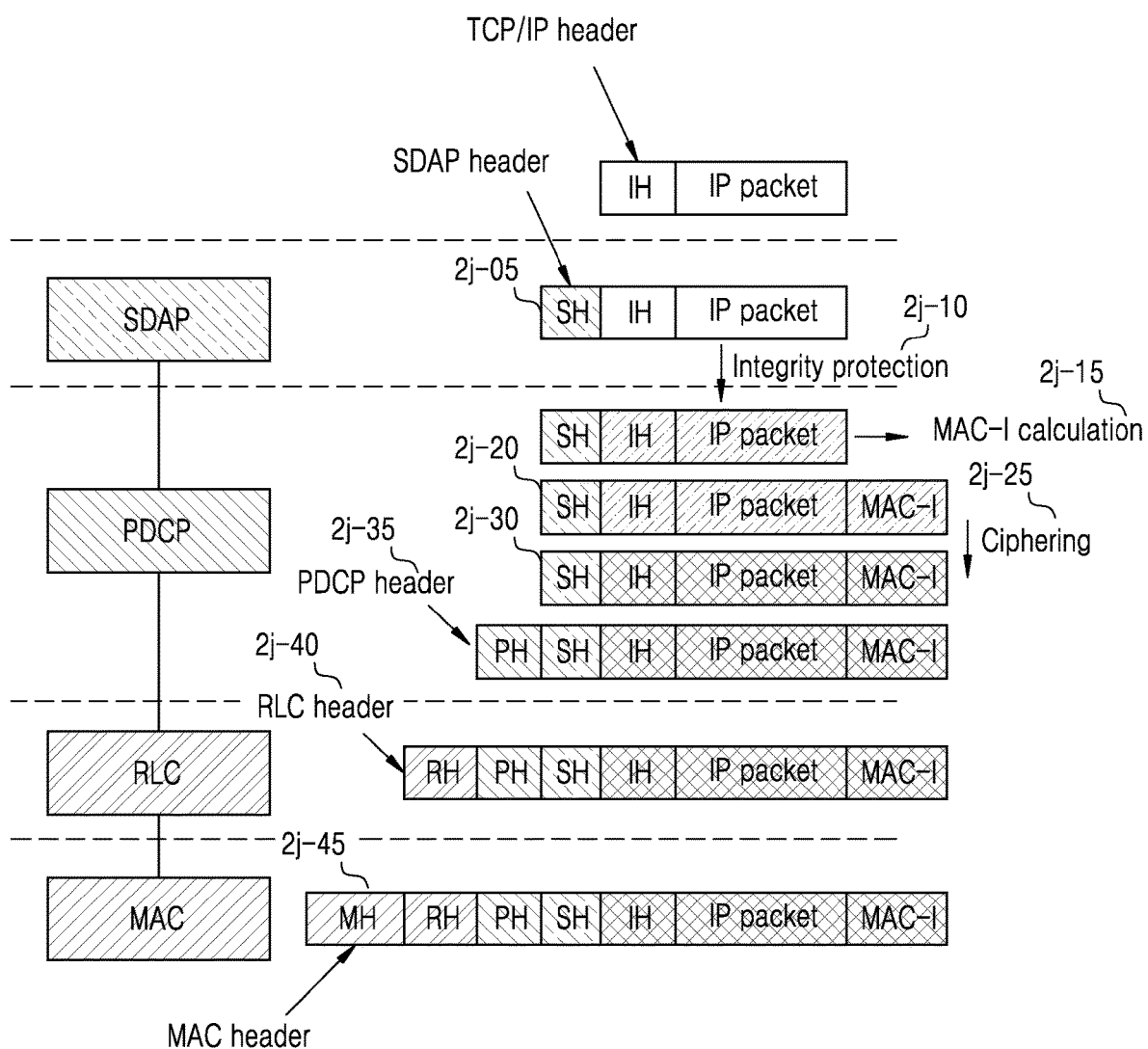
FIG. 2J illustrates a procedure in which a SDAP entity generates a SDAP header with respect to data received from an upper layer, and a PDCP entity does not perform integrity protection and ciphering on the SDAP header, according to an embodiment of the disclosure.

FIG. 2J illustrates a procedure in which a SDAP entity generates a SDAP header with respect to data received from an upper layer, and a PDCP entity does not perform integrity protection and ciphering on the SDAP header, according to an embodiment of the disclosure.

In FIG. 2J, in a case where it is configured, in a RRC message, to use a function of the SDAP entity or to use a SDAP header, and it is configured, in the RRC message, to perform integrity protection and integrity verification, the RRC message as shown in FIG. 2E (see 2*e*-10, 2*e*-40, or 2*e*-75), when the SDAP entity receives data from the upper layer, the SDAP entity may generate and configure a SDAP header as in 2*j*-05, and may transfer the SDAP header to the PDCP entity. When integrity protection is configured, the PDCP entity may perform the integrity protection 2*j*-10 only on data (an IP packet) of a PDCP SDU (the SDAP header and IP packet 2*j*-05), except for the SDAP header, the PDCP SDU being received from the upper SDAP entity, and may calculate a MAC-I 2*j*-15. When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2*j*-20. The MAC-I may have a certain size, e.g., a size of 4 bytes. The PDCP entity may perform ciphering 2*j*-25 on 2*j*-20 to which the MAC-I is concatenated, except for the SDAP header (2*i*-30), may generate, configure, and concatenate a PDCP header to the data (2*j*-35), and may transfer the data to a lower layer. Then, an RLC entity and a MAC entity may perform data processing (2*j*-40 and 2*j*-45). The embodiment of the disclosure is characterized in that the MAC-I is also ciphered.

A receiving end removes a MAC header and an RLC header and transfers the data to a PDCP layer, and a PDCP entity of the receiving end reads and then removes the PDCP header and the SDAP header, and performs deciphering on the data part, except for the SDAP header. In this regard, the MAC-I is also deciphered. Afterward, the PDCP entity of the receiving end performs integrity verification on an upper layer header (a TCP/IP header) and the data part, except for the SDAP header, and calculates a computed MAC-I (X-MAC). When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer).

In this manner, when ciphering or integrity protection is not performed on the SDAP header, a configuration of an implementation of a base station may be simplified, and in particular, in a central unit (CU)-distributed unit (DU) structure split structure, when a CU does not cipher a SDAP header, a DU may check QoS information by reading the SDAP header and may apply the QoS information to scheduling, and thus it may be advantageous to match and adjust QoS. Also, the aforementioned feature may have an advantage in a data processing aspect in a configuration of a UE and a base station.

Figure 2K:
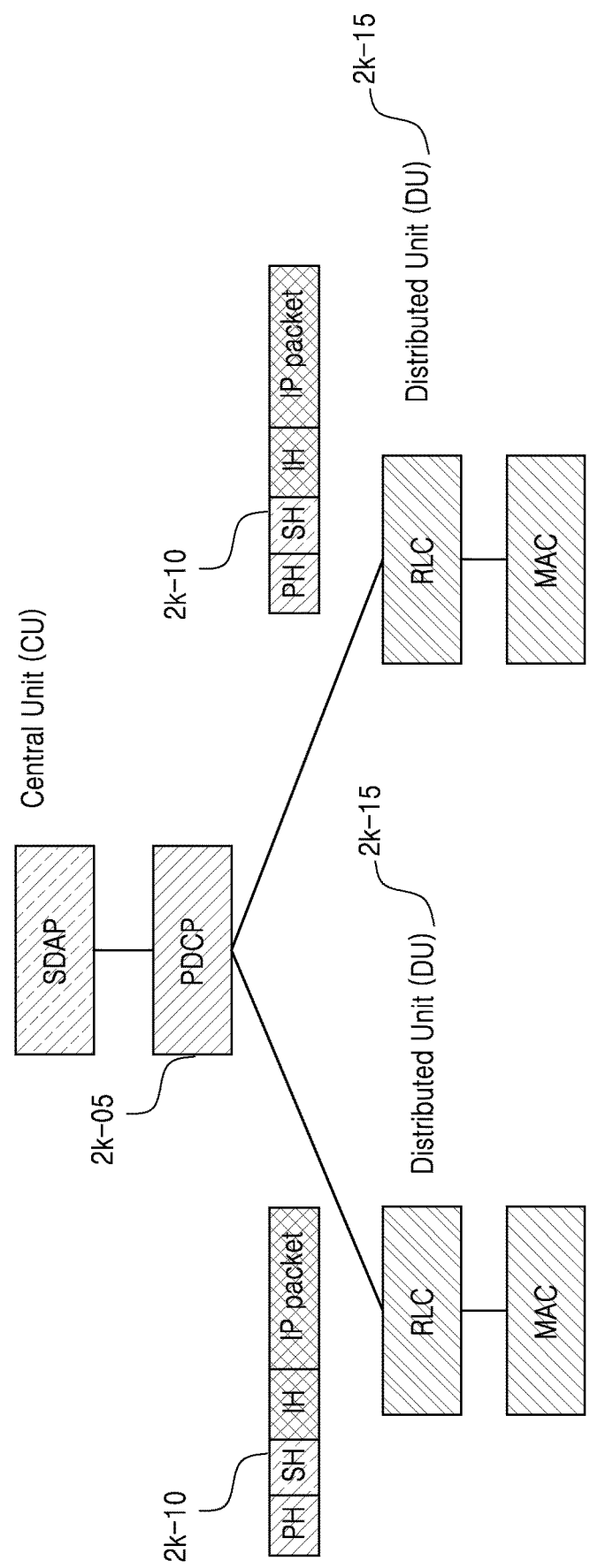
FIG. 2K illustrates an advantage in a structure of a base station implemented by applying a SDAP header on which ciphering or integrity protection is not performed, according to an embodiment of the disclosure.

FIG. 2K illustrates an advantage in a structure of a base station implemented by applying a SDAP header on which ciphering or integrity protection is not performed, according to an embodiment of the disclosure.

When the base station is implemented as in FIG. 2K, to reduce initial facility costs and maintenance costs, upper entities (e.g., a PDCP entity and upper entities of the PDCP entity) may be implemented in a CU, and lower entities (e.g., an RLC entity and lower entities of the RLC entity) may be implemented in a plurality of DUs connected to the CU. In such a CU-DU split structure, when a SDAP header on which ciphering or integrity protection is not performed by a PDCP entity 2*k*-05 is applied as described with reference to FIG. 2J of the disclosure, a plurality of DUs 2*k*-15 may read a SDAP header 2*k*-10 because ciphering or integrity protection is not performed on the SDAP header 2*k*-10, and thus may check and apply QoS information to scheduling of the DUs 2*k*-15. Therefore, because each of the DUs 2*k*-15 may use the QoS information of the SDAP header 2*k*-10 so as to allocate a transmission resource and perform scheduling, it may be advantageous to match and adjust QoS of each service.

Figure 2L:
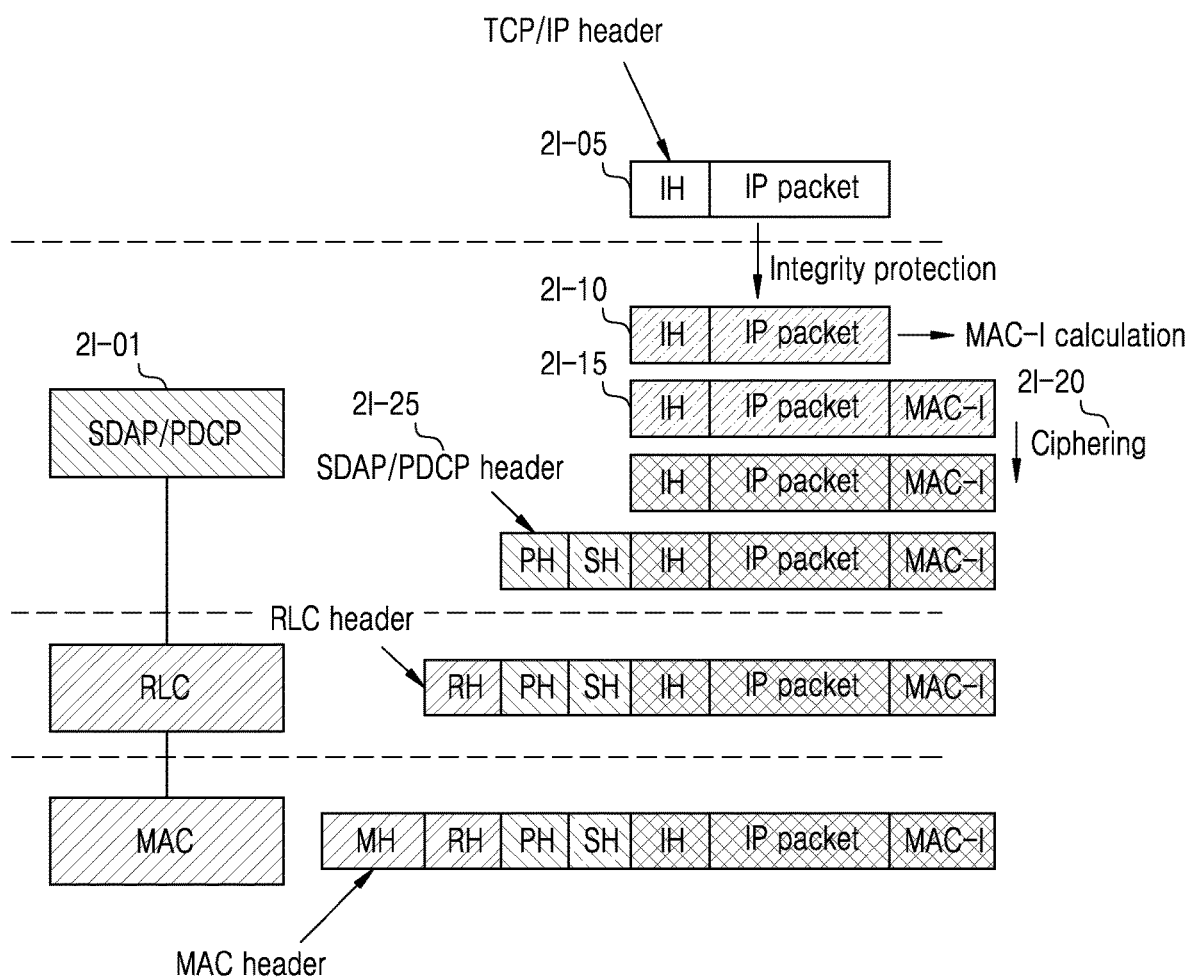
FIG. 2L illustrates an advantage in processing which may be obtained from a base station and a user equipment (UE) which are implemented by applying a SDAP header on which ciphering and integrity protection are not performed, according to an embodiment of the disclosure.

FIG. 2L illustrates an advantage in processing which may be obtained from a base station and a UE which are implemented by applying a SDAP header on which ciphering and integrity protection are not performed, according to an embodiment of the disclosure.

In FIG. 2L, when the UE and the base station are implemented, a SDAP entity and a PDCP entity may be unified to one entity (2*l*-01). Because, logically, the SDAP entity is an upper entity of the PDCP entity, when data 2*l*-05 is received from an upper application layer, in a case where it is configured, in a RRC message, to use a function of the SDAP entity or to use a SDAP header, and integrity protection is configured in the RRC message as shown in FIG. 2E (see 2*e*-10, 2*e*-40, or 2*e*-75), when the SDAP entity receives data from the upper layer, the SDAP entity has to generate and configure a SDAP header as in 2*j*-05 of FIG. 2J. However, a ciphering procedure or an integrity protection procedure is an operation requiring high complexity in implementation of the UE and the base station, the operation may be performed by applying a hardware (HW) accelerator thereto. The HW accelerator obtains a high advantage in processing from a repetitive and continuous procedure. However, when the SDAP entity configures a SDAP header and is configured to perform integrity protection whenever the SDAP entity receives data from the upper entity, when a process of performing an integrity protection procedure and a ciphering procedure on a data part other than a SDAP header, generating a PDCP header, and concatenating the PDCP header to the SDAP header is performed, interruption to the HW accelerator may occur due to an operation of generating the SDAP header before the integrity protection procedure and the ciphering procedure are performed in the process.

Therefore, the disclosure describes a method of implementing a SDAP header on which integrity protection and ciphering are not performed and one entity by unifying a SDAP entity and a PDCP entity. That is, when data is received from an upper application layer, whenever data is received, an integrity protection procedure may be continuously and repeatedly performed (2*l*-10), MAC-I may be calculated and then may be concatenated to an end of the data (2*l*-15), a ciphering procedure may be performed on the MAC-I and the data to which integrity protection is applied (2*l*-20), a PDCP header and a SDAP header may be simultaneously generated (2*l*-25) and then may be concatenated to the data on which integrity protection and ciphering are performed, and the data may be transferred to a lower layer. The generation of the PDCP header and the SDAP header may be processed in parallel with the integrity protection procedure or the ciphering procedure. In this regard, when headers are generated in a parallel manner, the SDAP header, the PDCP header or an RLC header or a MAC header may be generated together, and the headers may be concatenated at one time to the front of data that has completely undergone data processing and may be prepared for transmission (a configuration of a MAC PDU may be prepared). Also, a receiving end may separate the SDAP header, the PDCP header or the RLC header or the MAC header at one time from the data and read them, may recognize information corresponding to each layer, and may process data in inverse order of data processing performed by a transmitting end. Thus, the HW accelerator may be continuously and repeatedly applied, and because interruption such as generation of a SDAP header does not occur in between, efficiency of data processing may be increased. Also, when integrity protection is configured, before a ciphering procedure is performed, the HW accelerator may be applied to the integrity protection as described with respect to the ciphering procedure, and thus the integrity protection may be repeatedly performed. That is, the integrity protection may be performed and then the ciphering procedure may be performed.

A PDCP entity of the receiving end may use a method of implementing one entity by unifying a SDAP entity and a PDCP entity as in 2*l*-01. That is, when data is received from a lower layer (a RLC layer), in a case where it is configured, in a RRC message, to use a function of the SDAP entity or to use a SDAP header, the RRC message as shown in FIG. 2E (see 2*e*-10, 2*e*-40, or 2*e*-75), the one entity of the SDAP and PDAP entities may read and remove a PDCP header and a SDAP header at one time, and may repeatedly apply a decrypting or deciphering procedure on the data. Also, when integrity protection is configured, after a deciphering procedure is performed, the HW accelerator may be applied to integrity verification as described with respect to the deciphering procedure, and thus the integrity verification may be repeatedly performed. That is, the deciphering procedure may be performed and then the integrity verification may be performed.

Figure 2M:
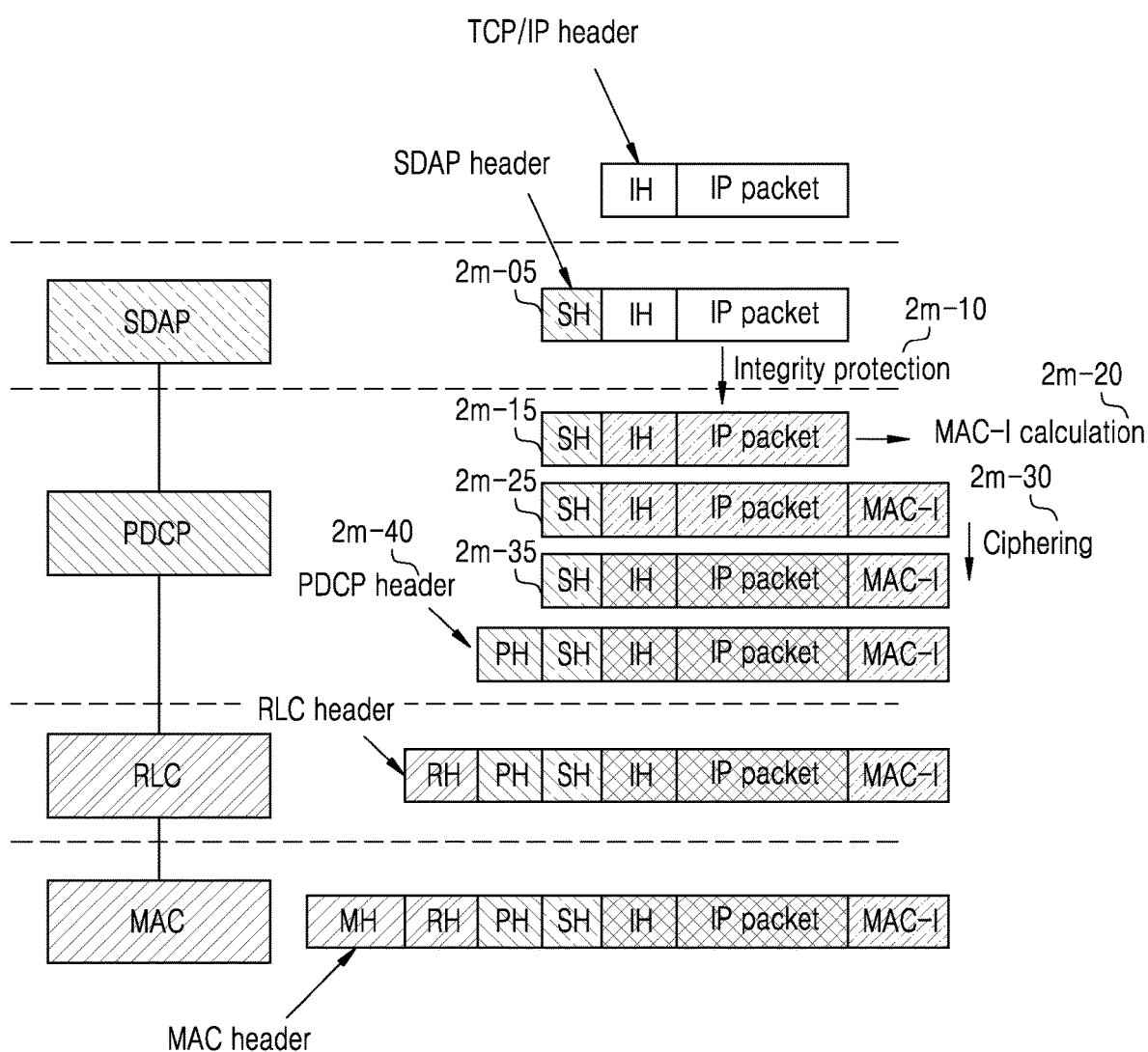
FIG. 2M illustrates a procedure in which a SDAP entity generates a SDAP header with respect to data received from an upper layer, and a PDCP entity does not perform integrity protection and ciphering on the SDAP header and does not perform ciphering on a message authentication code for integrity (MAC-I), according to an embodiment of the disclosure.

FIG. 2M illustrates a procedure in which a SDAP entity generates a SDAP header with respect to data received from an upper layer, and a PDCP entity does not perform integrity protection and ciphering on the SDAP header and does not perform ciphering on a MAC-I, according to an embodiment of the disclosure.

In FIG. 2M, in a case where it is configured, in a RRC message, to use a function of the SDAP entity or to use a SDAP header, and it is configured, in the RRC message, to perform integrity protection and integrity verification, the RRC message as shown in FIG. 2E (see 2*e*-10, 2*e*-40, or 2*e*-75), when the SDAP entity receives data from the upper layer, the SDAP entity may generate and configure a SDAP header as in 2*m*-05, and may transfer the SDAP header to the PDCP entity. When integrity protection is configured, the PDCP entity may perform the integrity protection 2*m*-10 only on data (an IP packet) of a PDCP SDU (the SDAP header and IP packet 2*m*-15), except for the SDAP header, the PDCP SDU being received from the upper SDAP entity, and may calculate a MAC-I. When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2*m*-20. The MAC-I may have a certain size, e.g., a size of 4 bytes. The PDCP entity may perform ciphering on 2*m*-25 to which the MAC-I is concatenated, except for the SDAP header and the MAC-I (2*m*-30 and 2*m*-35), may generate, configure, and concatenate a PDCP header to the data (2*m*-40), and may transfer the data to a lower layer. Then, an RLC entity and a MAC entity may perform data processing (2*j*-40 and 2*j*-45). The embodiment of the disclosure is characterized in that the MAC-I is not ciphered. When the MAC-I is not ciphered, an advantage in data processing may be further obtained as will be described below.

A receiving end removes a MAC header and an RLC header and transfers the data to a PDCP layer, and a PDCP entity of the receiving end reads and then removes the PDCP header and the SDAP header, and performs deciphering on the data part, except for the SDAP header and the MAC-I at the end. In this regard, the MAC-I is not deciphered. Afterward, the PDCP entity of the receiving end performs integrity verification on an upper layer header (a TCP/IP header) and the data part, except for the SDAP header, and calculates a computed MAC-I (X-MAC). When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer).

In this manner, when ciphering or integrity protection is not performed on the SDAP header, a configuration of an implementation of a base station may be simplified, and in particular, in a CU-DU structure split structure, when a CU does not cipher a SDAP header, a DU may check QoS information by reading the SDAP header and may apply the QoS information to scheduling, and thus it may be advantageous to match and adjust QoS. Also, the aforementioned feature may have an advantage in a data processing aspect in a configuration of a UE and a base station. In addition, when the MAC-I is not ciphered, an advantage in data processing may be further obtained as will be described below.

Figure 2N:
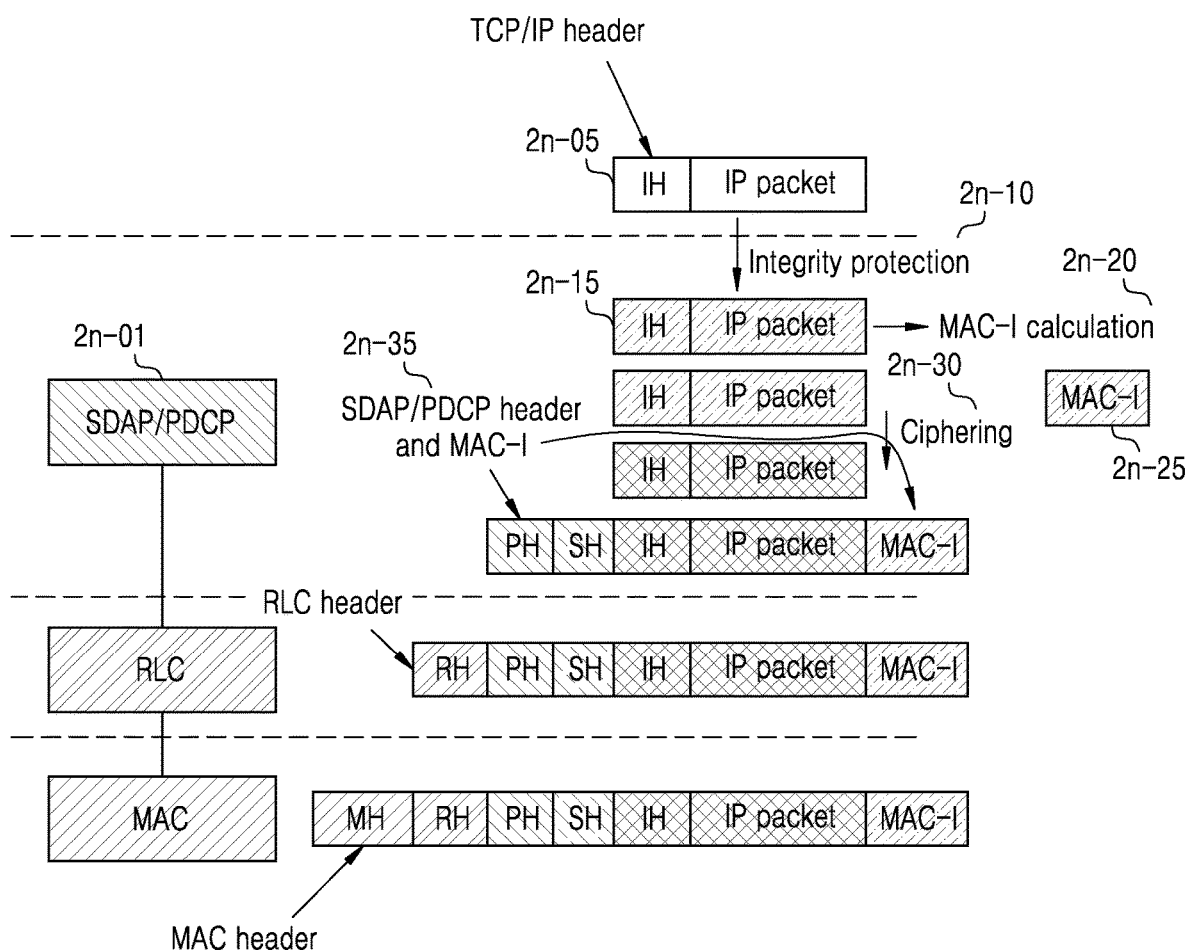
FIG. 2N illustrates an advantage in processing which may be obtained from a base station and a UE which are implemented by applying a SDAP header on which ciphering and integrity protection are not performed, and by not ciphering a MAC-I, according to an embodiment of the disclosure.
Figure 20:
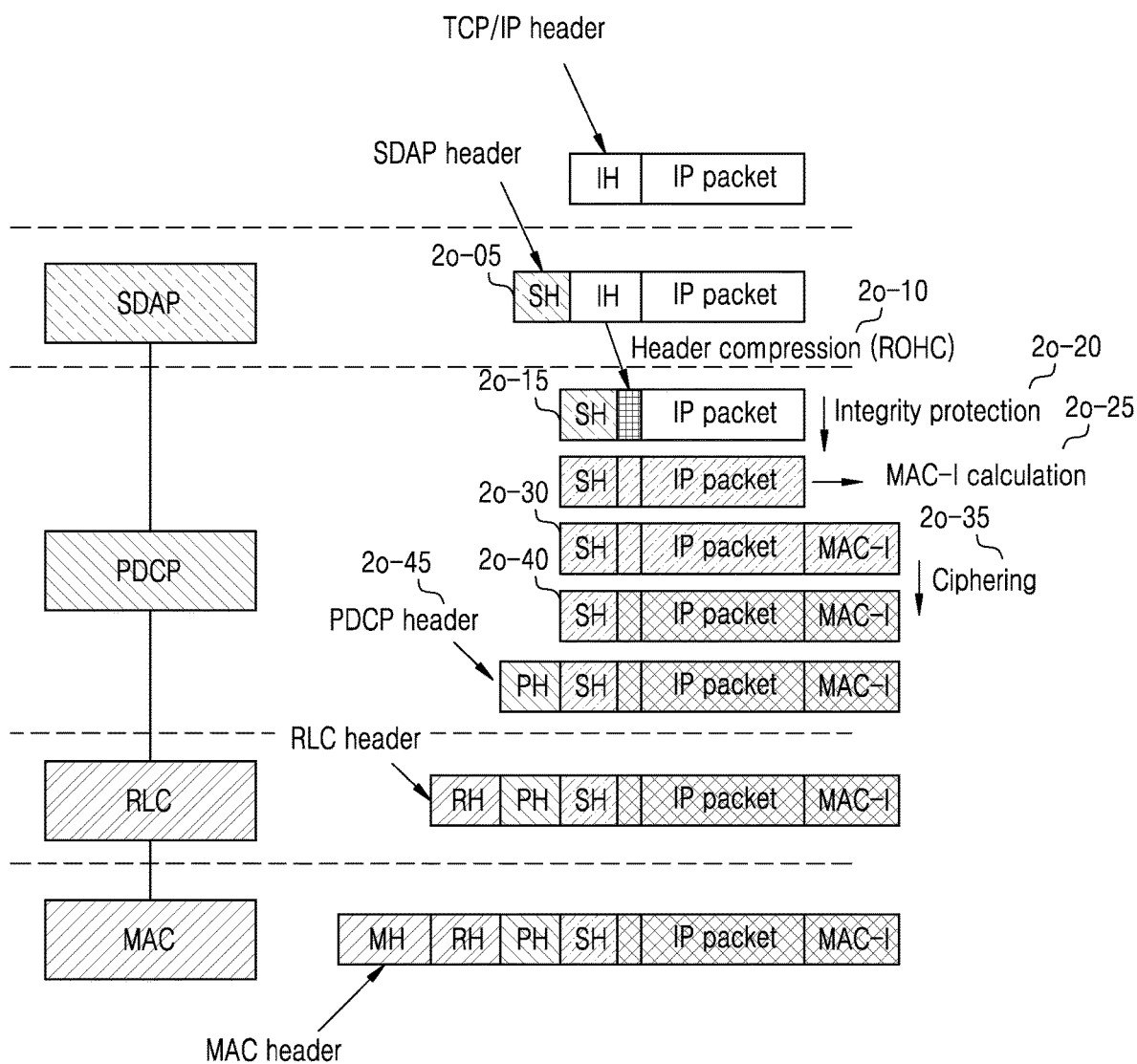

FIG. 2N illustrates an advantage in processing which may be obtained from a base station and a UE which are implemented by applying a SDAP header on which ciphering and integrity protection are not performed, and by not ciphering a MAC-I, according to an embodiment of the disclosure.

In FIG. 2N, when the UE and the base station are implemented, a SDAP entity and a PDCP entity may be unified to one entity (2n-01). Because, logically, the SDAP entity is an upper entity of the PDCP entity, when data 2n-05 is received from an upper application layer, in a case where it is configured, in a RRC message, to use a function of the SDAP entity or to use a SDAP header, and integrity protection is configured in the RRC message as shown in FIG. 2E (see 2e-10, 2e-40, or 2e-75), when the SDAP entity receives data from the upper layer, the SDAP entity has to generate and configure a SDAP header as in 2j-05 of FIG. 2J. However, a ciphering procedure or an integrity protection procedure is an operation requiring high complexity in implementation of the UE and the base station, the operation may be performed by applying a hardware (HW) accelerator thereto. The HW accelerator obtains a high advantage in processing from a repetitive and continuous procedure. However, when the SDAP entity configures a SDAP header and is configured to perform integrity protection whenever the SDAP entity receives data from the upper entity, when a process of performing an integrity protection procedure and a ciphering procedure on a data part other than a SDAP header, generating a PDCP header, and concatenating the PDCP header to the SDAP header is performed, interruption to the HW accelerator may occur due to an operation of generating the SDAP header before the integrity protection procedure and the ciphering procedure are performed.

Therefore, the disclosure describes a method of implementing a SDAP header on which integrity protection and ciphering are not performed and a not-ciphered MAC-I, and one entity by unifying a SDAP entity and a PDCP entity. That is, when data is received from an upper application layer, whenever data is received, an integrity protection procedure may be continuously and repeatedly performed (2n-10), a MAC-I may be calculated (2n-20 and 2n-25), a ciphering procedure may be performed on the data to which integrity protection is applied (2n-30), a PDCP header, a SDAP header, and the MAC-I may be simultaneously generated and then may be concatenated to the data on which integrity protection and ciphering are performed, and the data may be transferred to a lower layer (2n-35). That is, the generated headers may be concatenated to the front of the data, and the MAC-I may be concatenated to an end of the data. The generation of the PDCP header, the SDAP header, and the MAC-I may be processed in parallel with the integrity protection procedure or the ciphering procedure. In this regard, when headers are generated in a parallel manner, the SDAP header, the PDCP header or an RLC header or a MAC header may be generated together, and the headers may be concatenated at one time to the front of the data that has completely undergone data processing and may be prepared for transmission (a configuration of a MAC PDU may be prepared). The MAC-I may be concatenated to the end of the data that has completely undergone data processing. Also, a receiving end may separate the SDAP header, the PDCP header or the RLC header or the MAC header at one time from the data and read them, may recognize information corresponding to each layer, and may process data in inverse order of data processing performed by a transmitting end. Thus, the HW accelerator may be continuously and repeatedly applied, and because interruption such as generation of a SDAP header does not occur in between, efficiency of data processing may be increased. Also, when integrity protection is configured, before a ciphering procedure is performed, the HW accelerator may be applied to the integrity protection as described with respect to the ciphering procedure, and thus the integrity protection may be repeatedly performed. That is, the integrity protection may be performed and then the ciphering procedure may be performed.

A PDCP entity of the receiving end may use a method of implementing one entity by unifying a SDAP entity and a PDCP entity as in 2l-01. That is, when data is received from a lower layer (a RLC layer), in a case where it is configured, in a RRC message, to use a function of the SDAP entity or to use a SDAP header, the RRC message as shown in FIG. 2E (see 2e-10, 2e-40, or 2e-75), the one entity of the SDAP and PDAP entities may read and remove a PDCP header and a SDAP header at one time, and may repeatedly apply a non-ciphering or deciphering procedure on the data. Also, when integrity protection is configured, after a deciphering procedure is performed, the HW accelerator may be applied to integrity verification as described with respect to the deciphering procedure, and thus the integrity verification may be repeatedly performed. That is, the deciphering procedure may be performed and then the integrity verification may be performed.

FIG. 2O illustrates a procedure in which a SDAP entity generates a SDAP header with respect to data received from an upper layer, and a PDCP entity performs header compression (i.e., ROHC), applies integrity protection to the SDAP header, and does not perform ciphering on the SDAP header, according to an embodiment of the disclosure.

In FIG. 2O, in a case where it is configured, in a RRC message, to use a function of the SDAP entity or to use a SDAP header, it is configured, in the RRC message, to perform integrity protection and integrity verification, it is configured, in the RRC message, to perform ROHC on an uplink or a downlink, the RRC message as shown in FIG. 2E (see 2e-10, 2e-40, or 2e-75), when the SDAP entity receives data from the upper layer, the SDAP entity may generate and configure a SDAP header as in 2o-05, and may transfer the SDAP header to the PDCP entity. The PDCP entity performs ROHC on an upper layer head part (e.g., an IP packet header) of a received PDCP SDU (2o-10). When integrity protection is configured, the PDCP entity may perform the integrity protection 2o-20 on the PDCP SDU (the SDAP header and IP packet 2o-15) which is received from the upper SDAP entity and to which ROHC is applied, and may calculate a MAC-I (2o-25). When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2o-30. The MAC-I may have a certain size, e.g., a size of 4 bytes. The PDCP entity may perform ciphering 2o-35 on 2o-30 to which the MAC-I is concatenated, except for the SDAP header (2o-40), may generate, configure, and concatenate a PDCP header to the data (2o-45), and may transfer the data to a lower layer. Then, an RLC entity and a MAC entity may perform data processing.

A receiving end removes a MAC header and an RLC header and transfers the data to a PDCP layer, and a PDCP entity of the receiving end reads and then removes the PDCP header, and performs deciphering on the data part, except for the SDAP header. Afterward, the PDCP entity of the receiving end performs integrity verification on the SDAP header, an upper layer header (a TCP/IP header) and the data part, and calculates an X-MAC. When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer). When integrity verification is completed, a ROHC decompression procedure may be performed on the upper layer header (e.g., the IP packet header), and reconstructed upper layer data may be transferred to an upper layer.

Figure 2P:
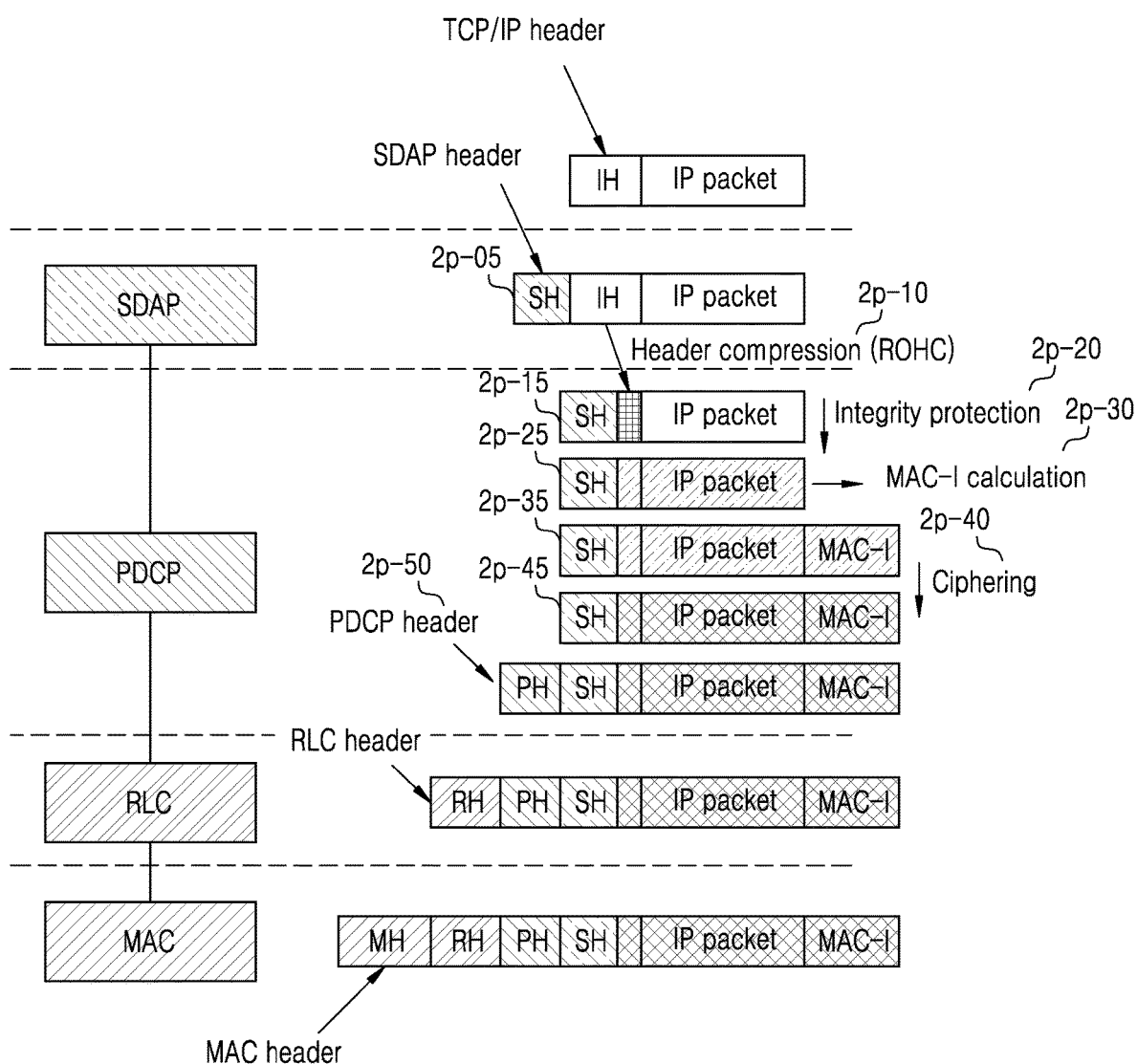
FIG. 2P illustrates a procedure in which a SDAP entity generates a SDAP header with respect to data received from an upper layer, and a PDCP entity performs header compression (i.e., ROHC), and does not perform integrity protection and ciphering on the SDAP header, according to an embodiment of the disclosure.

FIG. 2P illustrates a procedure in which a SDAP entity generates a SDAP header with respect to data received from an upper layer, and a PDCP entity performs header compression (i.e., ROHC), and does not perform integrity protection and ciphering on the SDAP header, according to an embodiment of the disclosure.

In FIG. 2P, in a case where it is configured, in a RRC message, to use a function of the SDAP entity or to use a SDAP header, it is configured, in the RRC message, to perform integrity protection and integrity verification, it is configured, in the RRC message, to perform ROHC on an uplink or a downlink, the RRC message being as shown in FIG. 2E (see 2e-10, 2e-40, or 2e-75), when the SDAP entity receives data from an upper layer, the SDAP entity may generate and configure a SDAP header as in 2p-05, and may transfer the SDAP header to the PDCP entity. The PDCP entity performs ROHC 2p-10 on an upper layer head part (e.g., an IP packet header) of a received PDCP SDU (2p-15). When integrity protection is configured, the PDCP entity may perform the integrity protection 2p-20 only on data (an IP packet) of a PDCP SDU (the SDAP header and IP packet 2p-25), except for the SDAP header, the PDCP SDU being received from the upper SDAP entity and the ROHC being applied to the data, and may calculate a MAC-I (2p-30). When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2p-35. The MAC-I may have a certain size, e.g., a size of 4 bytes. The PDCP entity may perform ciphering 2p-40 on 2p-35 to which the MAC-I is concatenated, except for the SDAP header (2p-45), may generate, configure, and concatenate a PDCP header to the data (2p-50), and may transfer the data to a lower layer. Then, an RLC entity and a MAC entity may perform data processing. The embodiment of the disclosure is characterized in that the MAC-I is also ciphered.

As described above, the PDCP entity may apply the ROHC only to the upper layer header (e.g., the IP packet header) of the SDAP entity, except for the SDAP header of the PDCP SDU received from the upper layer. The PDCP SDU may include the SDAP header, the upper layer header (e.g., the IP packet header) of the SDAP entity, and upper layer data (IP packet data) of the SDAP entity. In this manner, because the ROHC is not applied to the SDAP header, a degree-of-freedom in implementing a base station may be increased, and processing complexity of a UE may be decreased.

A receiving end removes a MAC header and an RLC header and transfers the data to a PDCP layer, and a PDCP entity of the receiving end reads and then removes the PDCP header and the SDAP header, and performs deciphering on the data part, except for the SDAP header. In this regard, the MAC-I is also deciphered. Afterward, the PDCP entity of the receiving end performs integrity verification on an upper layer header (a TCP/IP header) and the data part, except for the SDAP header, and calculates a computed MAC-I (X-MAC). When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification has succeeded, but when the values of the X-MAC and MAC-I are not equal, integrity verification has failed and therefore, the PDCP entity of the receiving end discards the data and has to report the failure of the integrity verification to an upper layer (e.g., an RRC layer). When integrity verification is completed, a ROHC decompression procedure may be performed on the upper layer header (e.g., the IP packet header), and reconstructed upper layer data may be transferred to the upper layer.

In this manner, when ciphering or integrity protection is not performed on the SDAP header, a configuration of an implementation of a base station may be simplified, and in particular, in a CU-DU split structure, when a CU does not cipher a SDAP header, a DU may check QoS information by reading the SDAP header and may apply the QoS information to scheduling, and thus it may be advantageous to match and adjust QoS. Also, the aforementioned feature may have an advantage in a data processing aspect in a configuration of a UE and a base station.

Also, as described above, when ROHC is not performed on the SDAP header, a configuration of an implementation of a base station may be simplified, and in particular, in a CU-DU split structure, when a CU does not cipher a SDAP header, a DU may check QoS information by reading the SDAP header and may apply the QoS information to scheduling, and thus it may be advantageous to match and adjust QoS. Also, the aforementioned feature may have an advantage in a data processing aspect in a configuration of a UE and a base station.

Figure 2Q:
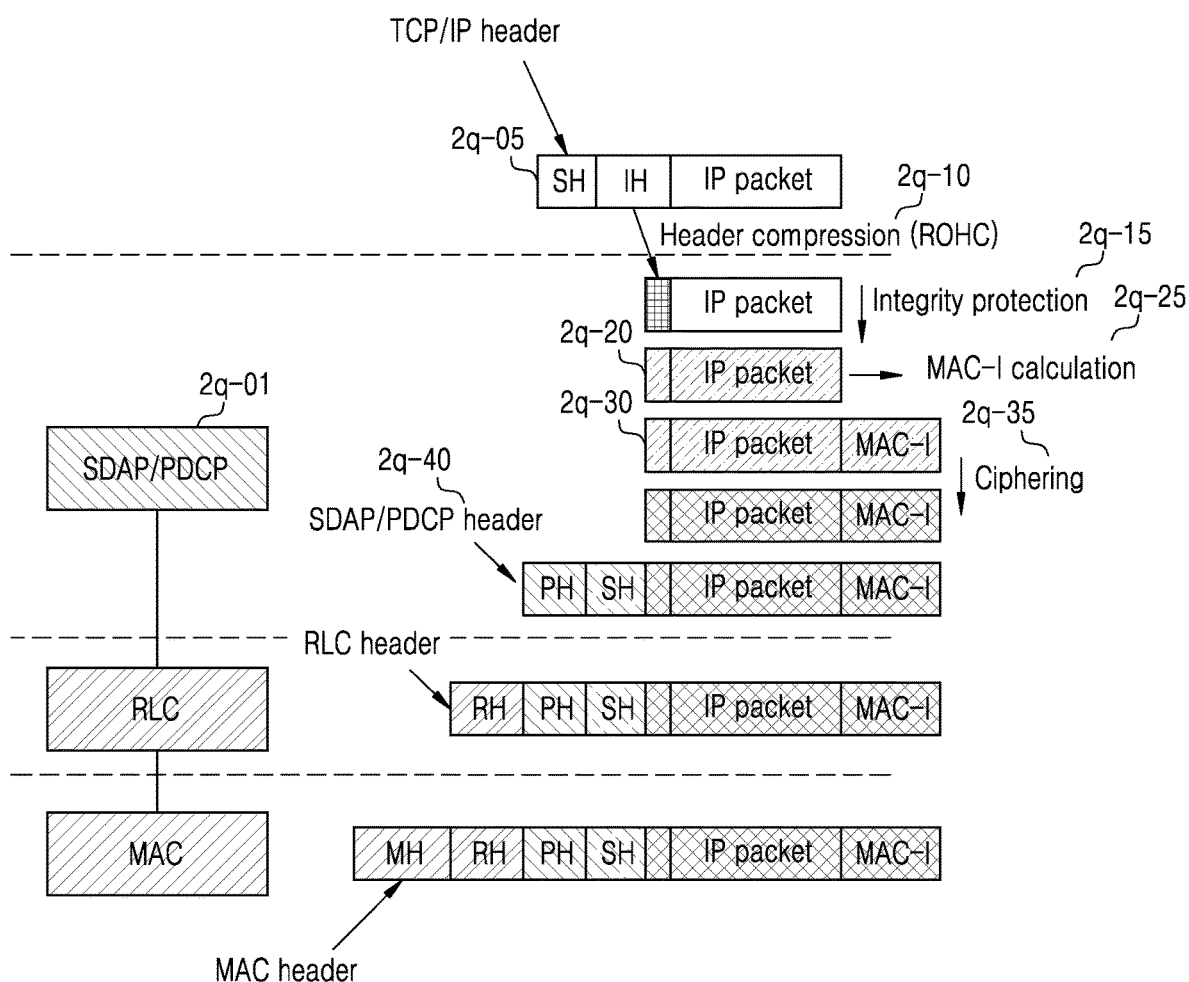
FIG. 2Q illustrates an advantage in processing which may be obtained from a base station and a UE which are implemented by applying a SDAP header on which ciphering and integrity protection are not performed, according to an embodiment of the disclosure.

FIG. 2Q illustrates an advantage in processing which may be obtained from a base station and a UE which are implemented by applying a SDAP header on which ciphering and integrity protection are not performed, according to an embodiment of the disclosure.

In FIG. 2Q, when the UE and the base station are implemented, a SDAP entity and a PDCP entity may be unified to one entity (2q-01). Because, logically, the SDAP entity is an upper entity of the PDCP entity, when data 2q-05 is received from an upper application layer, in a case where it is configured, in a RRC message, to use a function of the SDAP entity or to use a SDAP header, and integrity protection is configured in the RRC message as shown in FIG. 2E (see 2e-10, 2e-40, or 2e-75), when the SDAP entity receives data from the upper layer, the SDAP entity has to generate and configure a SDAP header as in 2j-05 of FIG. 2J. However, a ciphering procedure or an integrity protection procedure is an operation requiring high complexity in implementation of the UE and the base station, the operation may be performed by applying a HW accelerator thereto. The HW accelerator obtains a high advantage from a repetitive and continuous procedure. However, when the SDAP entity configures a SDAP header and is configured to perform integrity protection whenever the SDAP entity receives data from the upper entity, when a process of performing an integrity protection procedure and a ciphering procedure on a data part other than a SDAP header, generating a PDCP header, and concatenating the PDCP header to the SDAP header is performed, interruption to the HW accelerator may occur due to an operation of generating the SDAP header before the integrity protection procedure and the ciphering procedure are performed.

Therefore, the disclosure describes a method of implementing a SDAP header on which integrity protection and ciphering are not performed and one entity by unifying a SDAP entity and a PDCP entity. That is, when data is received from an upper application layer, whenever data is received, ROHC 2q-10 is continuously and repeatedly performed on an upper layer header part (e.g., an IP packet header) of a received PDCP SDU. Then, as shown in 2q-20, an integrity protection procedure may be performed (2q-15) on the PDCP SDU to which header compression is applied, MAC-I may be calculated 2q-25 and then may be concatenated to an end of the data (2q-30), a ciphering procedure may be performed on the MAC-I and the data to which integrity protection is applied (2q-35), a PDCP header and a SDAP header may be simultaneously generated (2q-40) and then may be concatenated to the data on which integrity protection and ciphering are performed, and the data may be transferred to a lower layer. The generation of the PDCP header and the SDAP header may be processed in parallel with the integrity protection procedure or the ciphering procedure. In this regard, when headers are generated in a parallel manner, the SDAP header, the PDCP header or an RLC header or a MAC header may be generated together, and the headers may be concatenated at one time to the front of data that has completely undergone data processing and may be prepared for transmission (a configuration of a MAC PDU may be prepared). Also, a receiving end may separate the SDAP header, the PDCP header or the RLC header or the MAC header at one time from the data and read them, may recognize information corresponding to each layer, and may process data in inverse order of data processing performed by a transmitting end. Thus, the HW accelerator may be continuously and repeatedly applied, and because interruption such as generation of a SDAP header does not occur in between, efficiency of data processing may be increased. Also, when integrity protection is configured, before a ciphering procedure is performed, the HW accelerator may be applied to the integrity protection as described with respect to the ciphering procedure, and thus the integrity protection may be repeatedly performed. That is, the integrity protection may be performed and then the ciphering procedure may be performed.

A PDCP entity of the receiving end may use a method of implementing one entity by unifying a SDAP entity and a PDCP entity as in 2q-01. That is, when data is received from a lower layer (a RLC layer), in a case where it is configured, in a RRC message, to use a function of the SDAP entity or to use a SDAP header, the RRC message as shown in FIG. 2E (see 2e-10, 2e-40, or 2e-75), the one entity of the SDAP and PDAP entities may read and remove a PDCP header and a SDAP header at one time, and may repeatedly apply a decrypting or deciphering procedure on the data. Also, when integrity protection is configured, after a deciphering procedure is performed, the HW accelerator may be applied to integrity verification as described with respect to the deciphering procedure, and thus the integrity verification may be repeatedly performed. That is, the deciphering procedure may be performed and then the integrity verification may be performed. When integrity verification is completed, a ROHC decompression procedure may be performed on the upper layer header (e.g., the IP packet header), and reconstructed upper layer data may be transferred to an upper layer.

Figure 2R:
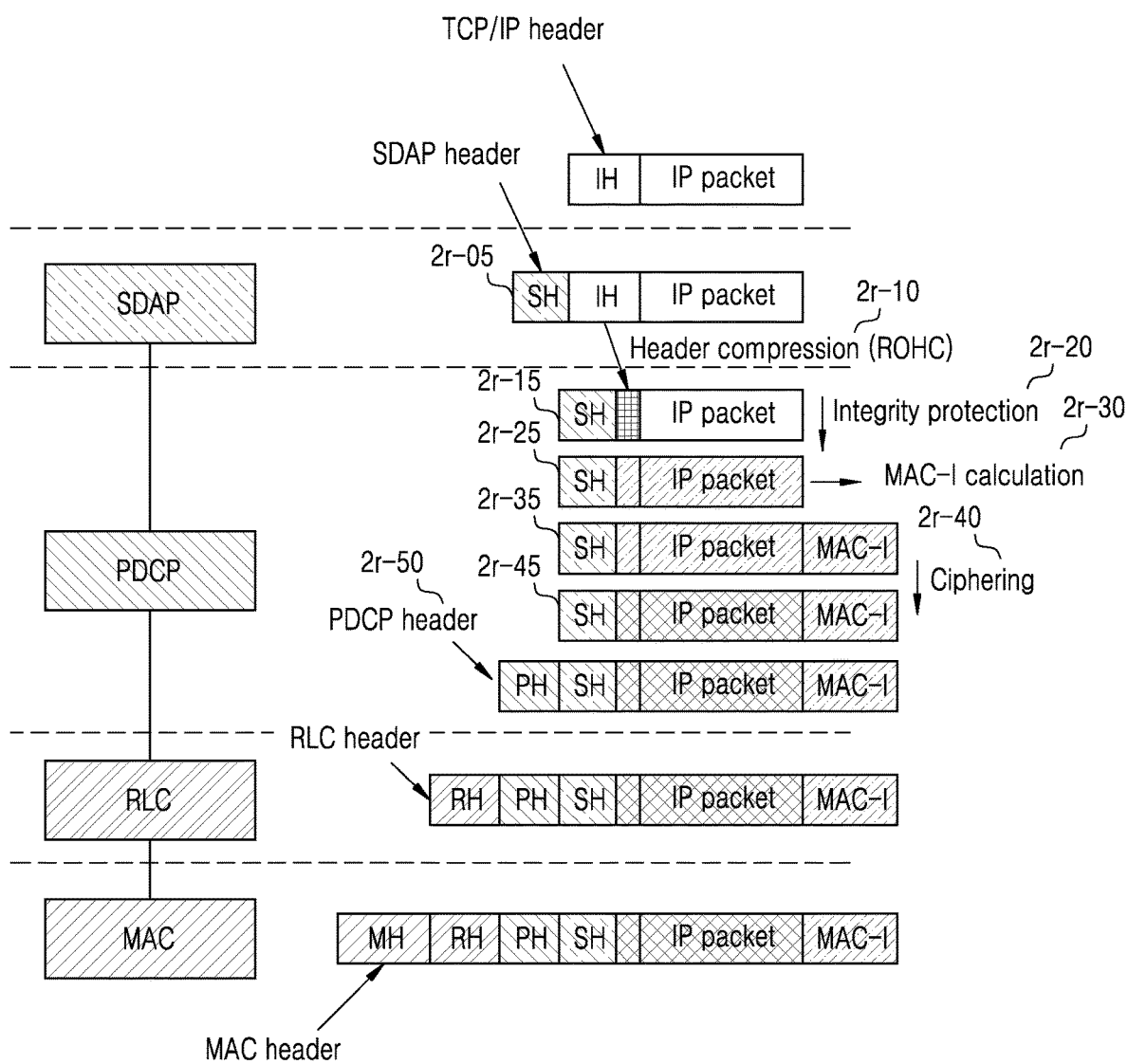
FIG. 2R illustrates a procedure in which a SDAP entity generates a SDAP header with respect to data received from an upper layer, and a PDCP entity performs header compression (i.e., ROHC), does not perform integrity protection and ciphering on the SDAP header, and does not perform ciphering on a MAC-I, according to an embodiment of the disclosure.

FIG. 2R illustrates a procedure in which a SDAP layer generates a SDAP header with respect to data received from an upper layer, and a PDCP entity performs header compression (i.e., ROHC), does not perform integrity protection and ciphering on the SDAP header, and does not perform ciphering on a MAC-I, according to an embodiment of the disclosure.

In FIG. 2R, in a case where it is configured, in a RRC message, to use a function of the SDAP entity or to use a SDAP header, it is configured, in the RRC message, to perform integrity protection and integrity verification, it is configured, in the RRC message, to perform ROHC on an uplink or a downlink, the RRC message as shown in FIG. 2E (see 2e-10, 2e-40, or 2e-75), when the SDAP entity receives data from an upper layer, the SDAP entity may generate and configure a SDAP header as in 2r-05, and may transfer the SDAP header to the PDCP entity. The PDCP entity performs ROHC 2r-10 on an upper layer head part (e.g., an IP packet header) of a received PDCP SDU. When integrity protection is configured, the PDCP entity may perform the integrity protection 2r-20 only on data (an IP packet) of a PDCP SDU (the SDAP header and IP packet 2r-15), except for the SDAP header, the PDCP SDU being received from the upper SDAP entity and ROHC being applied to the data, and may calculate a MAC-I. When the MAC-I is calculated 2r-30, a PDCP COUNT value, an uplink indicator or downlink indicator, a bearer indicator, a security key, a data part (on which the integrity protection is performed) 2r-25, or the like may be input values for an integrity protection algorithm. The calculated MAC-I may be concatenated to an end of the data as shown in 2r-35. The MAC-I may have a certain size, e.g., a size of 4 bytes (or 4 bits). The PDCP entity may perform ciphering on 2r-40 to which the MAC-I is concatenated, except for the SDAP header and a part other than the MAC-I (2r-45), may generate, configure, and concatenate a PDCP header to the data (2r-50), and may transfer the data to a lower layer. Then, an RLC entity and a MAC entity may perform data processing. The embodiment of the disclosure is characterized in that the MAC-I is not ciphered. When the MAC-I is not ciphered, an advantage in data processing may be further obtained as will be described below.

As described above, the PDCP entity may apply ROHC only on the upper layer header (e.g., the IP packet header) of the SDAP entity, except for the SDAP header of the PDCP SDU received from the upper layer. The PDCP SDU may include the SDAP header, the upper layer header (e.g., the IP packet header) of the SDAP entity, and upper layer data (IP packet data) of the SDAP entity. In this manner, because ROHC is not applied to the SDAP header, degree-of-freedom in implementing a base station may be increased, and processing complexity of a UE may be decreased.

A receiving end removes a MAC header and an RLC header and transfers the data to a PDCP layer, and a PDCP entity of the receiving end reads and then removes the PDCP header and the SDAP header, and performs deciphering on the data part, except for the SDAP header and the MAC-I at the end. In this regard, the MAC-I is not deciphered. Afterward, the PDCP entity of the receiving end performs integrity verification on an upper layer header (a TCP/IP header) and the data part, except for the SDAP header, and calculates a computed MAC-I (X-MAC). When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer). When integrity verification is completed, a ROHC decompression procedure may be performed on the upper layer header (e.g., the IP packet header), and reconstructed upper layer data may be transferred to an upper layer.

In this manner, when ciphering or integrity protection is not performed on the SDAP header, a configuration of an implementation of a base station may be simplified, and in particular, in a CU-DU structure split structure, when a CU does not cipher a SDAP header, a DU may check QoS information by reading the SDAP header and may apply the QoS information to scheduling, and thus it may be advantageous to match and adjust QoS. Also, the aforementioned feature may have an advantage in a data processing aspect in a configuration of a UE and a base station. When the MAC-I is not ciphered as described above, an advantage in data processing may be further obtained as will be described below.

Also, as described above, when ROHC is not performed on the SDAP header, a configuration of an implementation of a base station may be simplified, and in particular, in a CU-DU structure split structure, when a CU does not cipher a SDAP header, a DU may check QoS information by reading the SDAP header and may apply the QoS information to scheduling, and thus it may be advantageous to match and adjust QoS. Also, the aforementioned feature may have an advantage in a data processing aspect in a configuration of a UE and a base station.

Figure 2S:
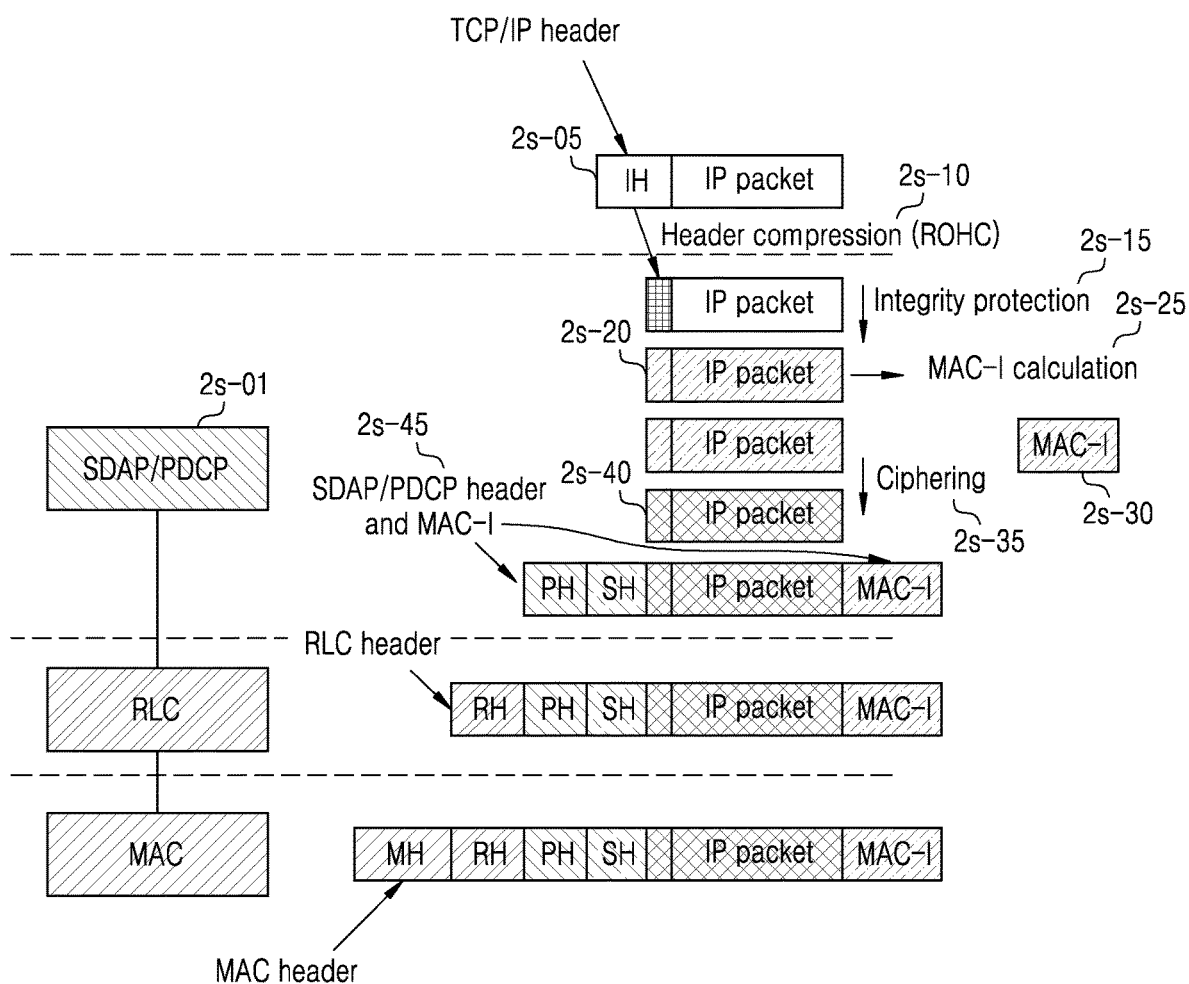
FIG. 2S illustrates an advantage in processing which may be obtained from a base station and a UE which are implemented by applying a SDAP header on which ciphering and integrity protection are not performed, by performing ROHC, and by not ciphering a MAC-I, according to an embodiment of the disclosure.

FIG. 2S illustrates an advantage in processing which may be obtained from a base station and a UE which are implemented by applying a SDAP header on which ciphering and integrity protection are not performed, by performing ROHC, and by not ciphering a MAC-I, according to an embodiment of the disclosure.

In FIG. 2S, when the UE and the base station are implemented, a SDAP entity and a PDCP entity may be unified to one entity (2s-01). Because, logically, the SDAP entity is an upper entity of the PDCP entity, when data 2s-01 is received from an upper application layer, in a case where it is configured, in a RRC message, to use a function of the SDAP entity or to use a SDAP header, integrity protection is configured, and to perform ROHC on an uplink or a downlink in the RRC message as shown in FIG. 2E (see 2e-10, 2e-40, or 2e-75), when the SDAP entity receives data from the upper layer, the SDAP entity has to generate and configure a SDAP header as in 2j-05 of FIG. 2J. However, a ciphering procedure or an integrity protection procedure is an operation requiring high complexity in implementation of the UE and the base station, the operation may be performed by applying a HW accelerator thereto. The HW accelerator obtains a high advantage in processing from a repetitive and continuous procedure. However, when the SDAP entity configures a SDAP header and is configured to perform integrity protection whenever the SDAP entity receives data from the upper entity, when a process of performing an integrity protection procedure and a ciphering procedure on a data part other than a SDAP header, generating a PDCP header, and concatenating the PDCP header to the SDAP header is performed, interruption to the HW accelerator may occur due to an operation of generating the SDAP header before the integrity protection procedure and the ciphering procedure are performed in the process.

Therefore, the disclosure describes a method of implementing a SDAP header on which integrity protection and ciphering are not performed, a MAC-I that is not ciphered, and one entity by unifying a SDAP entity and a PDCP entity. That is, when data is received from an upper application layer 2s-05, whenever data is received, ROHC is continuously and repeatedly performed on an upper layer header part (e.g., an IP packet header) of a received PDCP SDU (2s-10), an integrity protection procedure may be performed (2s-15), a MAC-I may be calculated (2s-25 and 2s-30) on data 2s-20, a ciphering procedure may be performed 2s-35 on the data to which integrity protection is applied (2s-40), a PDCP header, a SDAP header, and the MAC-I may be simultaneously generated and then may be concatenated to the data on which integrity protection and ciphering are performed, and the data may be transferred to a lower layer (2s-45). That is, the generated headers may be concatenated to the front of the data, and the MAC-I may be concatenated to an end of the data. The generation of the PDCP header, the SDAP header, and the MAC-I may be processed in parallel with the integrity protection procedure or the ciphering procedure. In this regard, when headers are generated in a parallel manner, the SDAP header, the PDCP header or an RLC header or a MAC header may be generated together, and the headers may be concatenated at one time to the front of the data that has completely undergone data processing and may be prepared for transmission (a configuration of a MAC PDU may be prepared). The MAC-I may be concatenated to the end of the data that has completely undergone data processing. Also, a receiving end may separate the SDAP header, the PDCP header, a UDC header, or the RLC header or the MAC header at one time from the data and read them, may recognize information corresponding to each layer, and may process data in inverse order of data processing performed by a transmitting end. Thus, the HW accelerator may be continuously and repeatedly applied, and because interruption such as generation of a SDAP header does not occur in between, efficiency of data processing may be increased. Also, when integrity protection is configured, before a ciphering procedure is performed, the HW accelerator may be applied to the integrity protection as described with respect to the ciphering procedure, and thus the integrity protection may be repeatedly performed. That is, the integrity protection may be performed and then the ciphering procedure may be performed.

A PDCP entity of the receiving end may use a method of implementing one entity by unifying a SDAP entity and a PDCP entity as in 2*l*-01. That is, when data is received from a lower layer (a RLC layer), in a case where it is configured, in a RRC message, to use a function of the SDAP entity or to use a SDAP header, the RRC message as shown in FIG. 2E (see 2*e*-10, 2*e*-40, or 2*e*-75), the one entity of the SDAP and PDAP entities may read and remove a PDCP header and a SDAP header at one time, and may repeatedly apply a non-ciphering or deciphering procedure on the data. Also, when integrity protection is configured, after a deciphering procedure is performed, the HW accelerator may be applied to integrity verification as described with respect to the deciphering procedure, and thus the integrity verification may be repeatedly performed. That is, the deciphering procedure may be performed and then the integrity verification may be performed. When integrity verification is completed, a ROHC decompression procedure may be performed on the upper layer header (e.g., the IP packet header), and reconstructed upper layer data may be transferred to the upper layer.

Figure 2T:
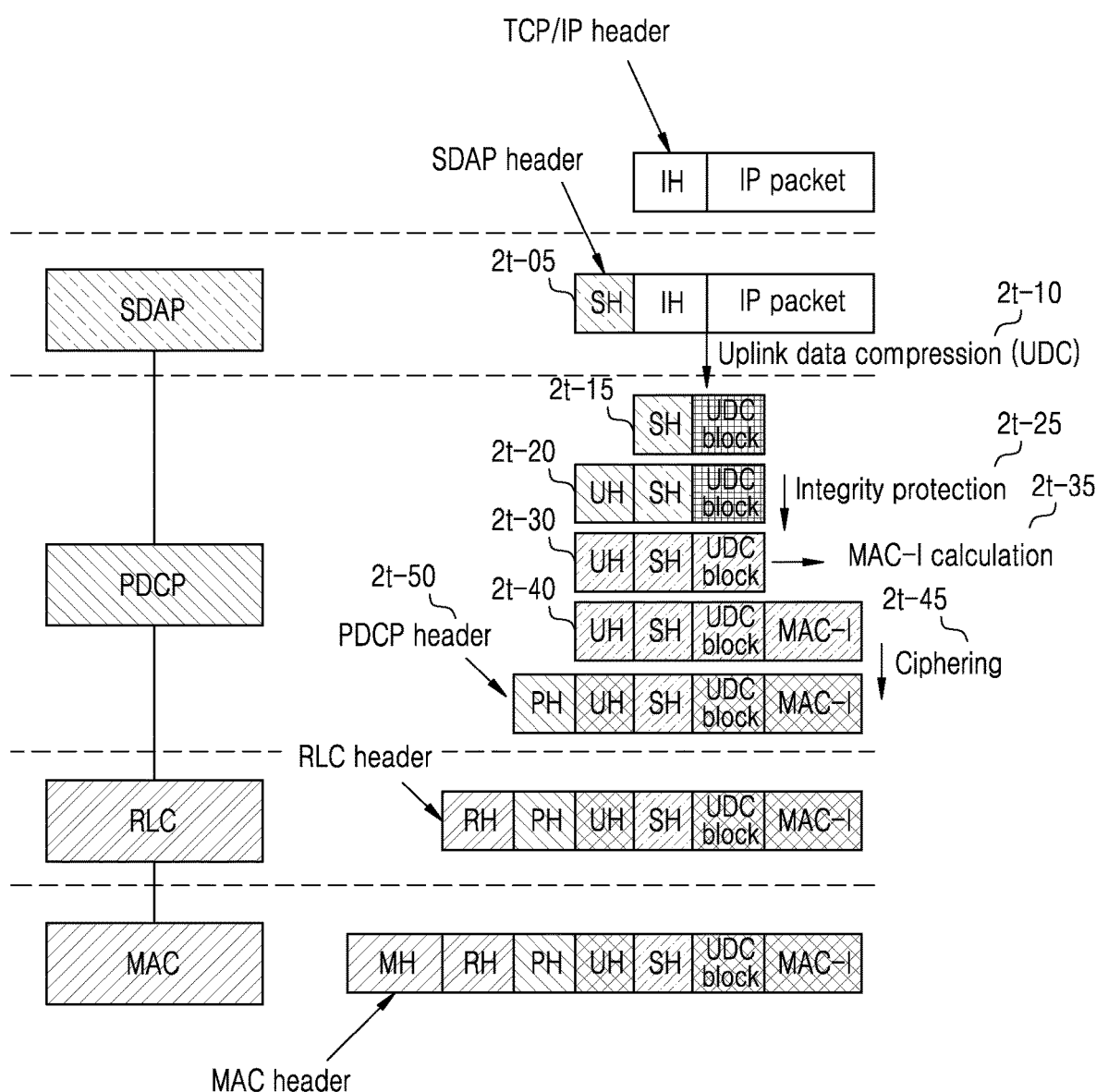
FIG. 2T illustrates a procedure in which a SDAP entity generates a SDAP header with respect to data received from an upper layer, and a PDCP entity performs UDC, applies integrity protection to a UDC header, performs ciphering on the UDC header, applies integrity protection to the SDAP header, and does not perform ciphering on the SDAP header, according to an embodiment of the disclosure.

FIG. 2T illustrates a procedure in which a SDAP entity generates a SDAP header with respect to data received from an upper layer, and a PDCP entity performs UDC, applies integrity protection to a UDC header, performs ciphering on the UDC header, applies integrity protection to the SDAP header, and does not perform ciphering on the SDAP header, according to an embodiment of the disclosure.

In FIG. 2T, in a case where it is configured, in a RRC message, to use a function of the SDAP entity or to use a SDAP header, it is configured, in the RRC message, to perform integrity protection and integrity verification, it is configured, in the RRC message, to perform UDC on an uplink or a downlink, the RRC message as shown in FIG. 2E (see 2*e*-10, 2*e*-40, or 2*e*-75), when the SDAP entity receives data from the upper layer, the SDAP entity may generate and configure a SDAP header as in 2*t*-05, and may transfer the SDAP header to the PDCP entity. The PDCP entity performs UDC on a part (e.g., an IP packet header) of a received PDCP SDU, except for the SDAP header (2*t*-10). Then, the PDCP entity may calculate a checksum field based on a current UDC buffer 2*t*-15, may configure a UDC header, and may concatenate the UDC header to the front of the SDAP header as shown in 2*t*-20. When integrity protection is configured, the PDCP entity may perform the integrity protection 2*t*-25 on 2*t*-20 including the UDC header, the SDAP header, and a UDC block, which is received from the upper SDAP entity, to which UDC is applied, and the UDC header is concatenated, and may calculate a MAC-I (2*t*-35) from data 2*t*-30. When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2*t*-40. The MAC-I may have a certain size, e.g., a size of 4 bytes. The PDCP entity may perform ciphering on 2*t*-40 to which the MAC-I is concatenated, except for the SDAP header (2*t*-45), may generate, configure, and concatenate a PDCP header to the data (2*t*-50), and may transfer the data to a lower layer. Then, an RLC entity and a MAC entity may perform data processing.

A receiving end removes a MAC header and an RLC header and transfers the data to a PDCP layer, and a PDCP entity of the receiving end reads and then removes the PDCP header, and performs deciphering on the data part, except for the SDAP header. Afterward, the PDCP entity of the receiving end performs integrity verification on the SDAP header, an upper layer header (a TCP/IP header) and the data part, and calculates an X-MAC. When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer). When integrity verification is completed, whether occurrence of a checksum failure may be checked by reading the UDC header from upper layer data, a UDC decompression procedure may be performed, and the reconstructed upper layer data may be transferred to an upper layer.

Figure 2U:
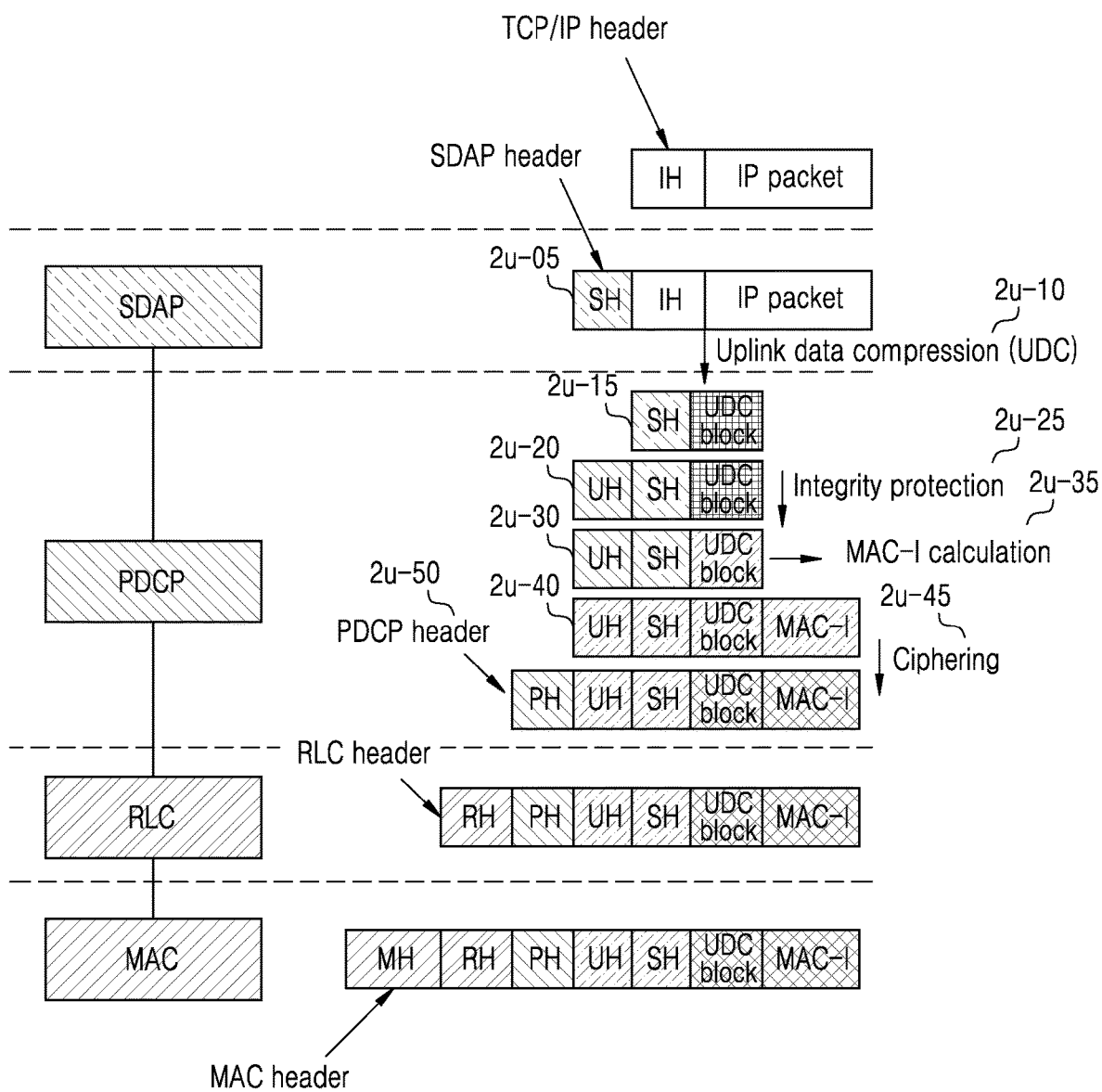
FIG. 2U illustrates a procedure in which a SDAP entity generates a SDAP header with respect to data received from an upper layer, and a PDCP entity performs UDC, applies integrity protection to a UDC header, does not perform ciphering on the UDC header, applies integrity protection to the SDAP header, and does not perform ciphering on the SDAP header, according to an embodiment of the disclosure.

FIG. 2U illustrates a procedure in which a SDAP entity generates a SDAP header with respect to data received from an upper layer, and a PDCP entity performs UDC, applies integrity protection to a UDC header, does not perform ciphering on the UDC header, applies integrity protection to the SDAP header, and does not perform ciphering on the SDAP header, according to an embodiment of the disclosure.

In FIG. 2U, in a case where it is configured, in a RRC message, to use a function of the SDAP entity or to use a SDAP header, it is configured, in the RRC message, to perform integrity protection and integrity verification, it is configured, in the RRC message, to perform UDC on an uplink or a downlink, the RRC message as shown in FIG. 2E (see 2*e*-10, 2*e*-40, or 2*e*-75), when the SDAP entity receives data from the upper layer, the SDAP entity may generate and configure a SDAP header as in 2*u*-05, and may transfer the SDAP header to the PDCP entity. The PDCP entity performs UDC on a part (e.g., an IP packet header) of a received PDCP SDU, except for the SDAP header (2*u*-10). Then, the PDCP entity may calculate a checksum field based on a current UDC buffer 2*u*-15, may configure a UDC header, and may concatenate the UDC header to the front of the SDAP header as shown in 2*u*-20. When integrity protection is configured, the PDCP entity may perform the integrity protection 2*u*-25 on 2*u*-20 including the UDC header, the SDAP header, and a UDC block, which is received from the upper SDAP entity, to which UDC is applied, and the UDC header is concatenated, and may calculate a MAC-I (2*u*-35) on data 2*u*-30. When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2*u*-40. The MAC-I may have a certain size, e.g., a size of 4 bytes. The PDCP entity may perform ciphering on 2*u*-40 to which the MAC-I is concatenated, except for the UDC header and the SDAP header (2u-45), may generate, configure, and concatenate a PDCP header to the data (2u-50), and may transfer the data to a lower layer. Then, an RLC entity and a MAC entity may perform data processing.

A receiving end removes a MAC header and an RLC header and transfers the data to a PDCP layer, and a PDCP entity of the receiving end reads and then removes the PDCP header, and performs deciphering on the data part, except for the SDAP header. Afterward, the PDCP entity of the receiving end performs integrity verification on the SDAP header, an upper layer header (a TCP/IP header) and the data part, and calculates an X-MAC. When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer). When integrity verification is completed, whether occurrence of a checksum failure may be checked by reading the UDC header from upper layer data, a UDC decompression procedure may be performed, and the reconstructed upper layer data may be transferred to an upper layer.

Figure 2V:
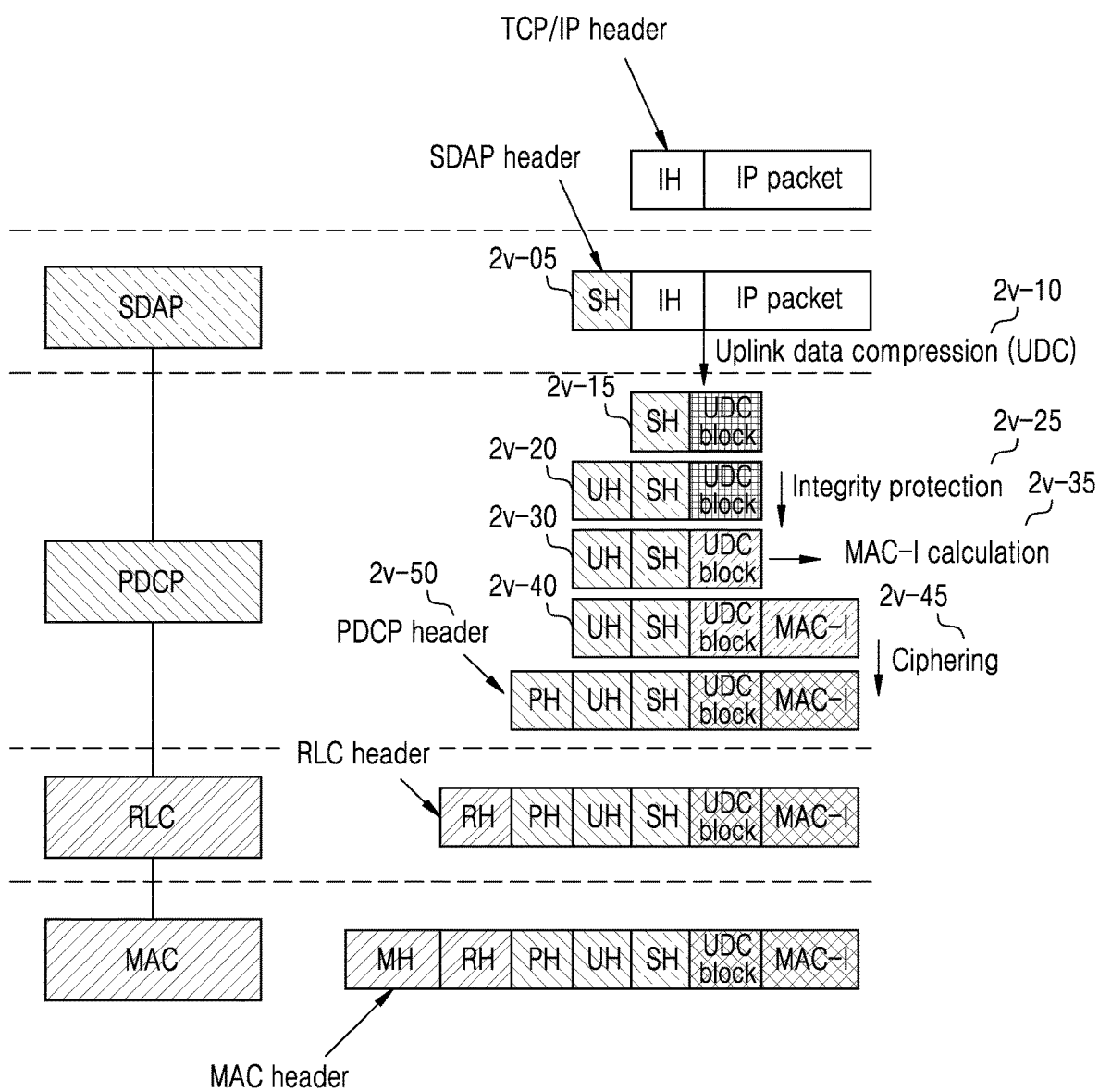
FIG. 2V illustrates a procedure in which a SDAP entity generates a SDAP header with respect to data received from an upper layer, and a PDCP entity performs UDC, does not apply integrity protection to a UDC header, does not perform ciphering on the UDC header, ciphers a MAC-I, does not apply integrity protection to the SDAP header, and does not perform ciphering on the SDAP header, according to an embodiment of the disclosure.

FIG. 2V illustrates a procedure in which a SDAP entity generates a SDAP header with respect to data received from an upper layer, and a PDCP entity performs UDC, does not apply integrity protection to a UDC header, does not perform ciphering on the UDC header, ciphers a MAC-I, does not apply integrity protection to the SDAP header, and does not perform ciphering on the SDAP header, according to an embodiment of the disclosure.

In FIG. 2V, in a case where it is configured, in a RRC message, to use a function of the SDAP entity or to use a SDAP header, it is configured, in the RRC message, to perform integrity protection and integrity verification, it is configured, in the RRC message, to perform UDC on an uplink or a downlink, the RRC message as shown in FIG. 2E (see 2e-10, 2e-40, or 2e-75), when the SDAP entity receives data from the upper layer, the SDAP entity may generate and configure a SDAP header as in 2v-05, and may transfer the SDAP header to the PDCP entity. The PDCP entity performs UDC on a part (e.g., an IP packet header) of a received PDCP SDU, except for the SDAP header (2v-10). Then, the PDCP entity may calculate a checksum field based on a current UDC buffer 2v-15, may configure a UDC header, and may concatenate the UDC header to the front of the SDAP header as shown in 2v-20. When integrity protection is configured, the PDCP entity may perform the integrity protection 2v-25 on 2v-20 including the UDC header, the SDAP header, and a UDC block, except for the UDC header and the SDAP header, which is received from the upper SDAP entity, to which UDC is applied, and the UDC header is concatenated, and may calculate a MAC-I (2v-35) from data 2v-30. When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2v-40. The MAC-I may have a certain size, e.g., a size of 4 bytes.

The PDCP entity may perform ciphering on 2v-40 to which the MAC-I is concatenated, except for the UDC header and the SDAP header (2v-45), may generate, configure, and concatenate a PDCP header to the data (2v-50), and may transfer the data to a lower layer. Then, an RLC entity and a MAC entity may perform data processing.

A receiving end removes a MAC header and an RLC header and transfers the data to a PDCP layer, and a PDCP entity of the receiving end reads and then removes the PDCP header, and performs deciphering on the data part, except for the SDAP header. Afterward, the PDCP entity of the receiving end performs integrity verification on the SDAP header, an upper layer header (a TCP/IP header) and the data part, and calculates an X-MAC. When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer). When integrity verification is completed, whether occurrence of a checksum failure may be checked by reading the UDC header, a UDC decompression procedure may be performed on upper layer data, and the reconstructed upper layer data may be transferred to an upper layer.

Figure 2W:
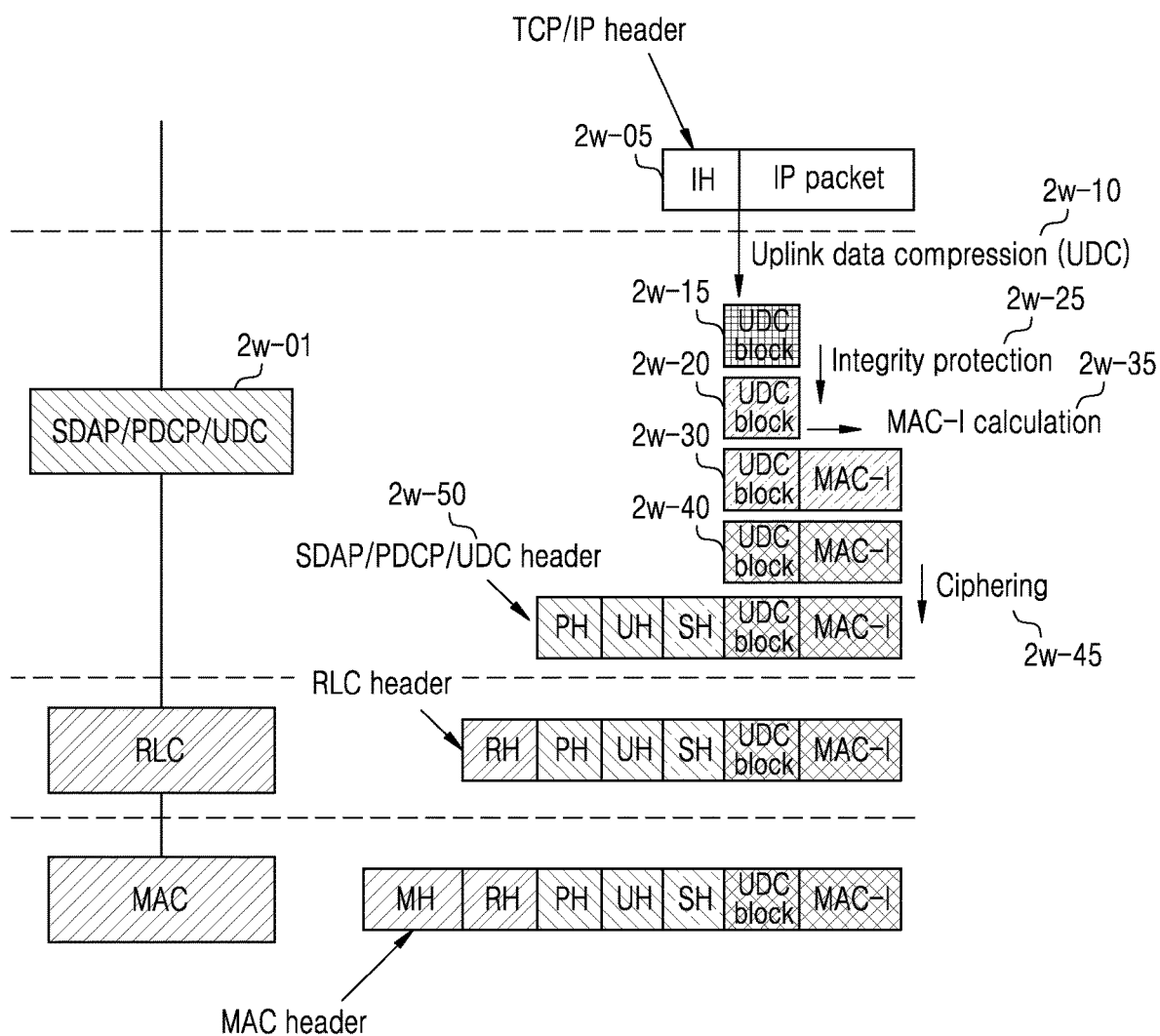
FIG. 2W illustrates an advantage in processing which may be obtained from a base station and a UE which are implemented by applying a SDAP header and a UDC header on which ciphering and integrity protection are not performed, according to an embodiment of the disclosure.

FIG. 2W illustrates an advantage in processing which may be obtained from a base station and a UE which are implemented by applying a SDAP header and a UDC header on which ciphering and integrity protection are not performed, according to an embodiment of the disclosure.

In FIG. 2W, when the UE and the base station are implemented, a SDAP entity and a PDCP entity may be unified to one entity (2w-01). Because, logically, the SDAP entity is an upper entity of the PDCP entity, when data 2w-05 is received from an upper application layer, in a case where it is configured, in a RRC message, to use a function of the SDAP entity or to use a SDAP header, and integrity protection is configured and use of UDC is configured for a uplink or downlink in the RRC message as shown in FIG. 2E (see 2e-10, 2e-40, or 2e-75), when the SDAP entity receives data from the upper layer, the SDAP entity has to generate and configure a SDAP header as in 2j-05 of FIG. 2J. However, a ciphering procedure or an integrity protection procedure is an operation requiring high complexity in implementation of the UE and the base station, the operation may be performed by applying a HW accelerator thereto. The HW accelerator obtains a high advantage in processing from a repetitive and continuous procedure. However, when the SDAP entity configures a SDAP header and are configured to perform integrity protection and UDC whenever the SDAP entity receives data from the upper entity, when a process of performing a UDC procedure, generating and concatenating a UDC header, performing an integrity protection procedure and a ciphering procedure on a data part other than a SDAP header and the UDC header, generating a PDCP header, and concatenating the PDCP header to the SDAP header is performed, interruption to the HW accelerator may occur due to an operation of generating the UDC header and the SDAP header before the integrity protection procedure and the ciphering procedure are performed in the process.

Therefore, the disclosure describes a method of implementing a SDAP header and a UDC header on which integrity protection and ciphering are not performed and one entity by unifying a SDAP entity and a PDCP entity. That is, when data is received from an upper application layer, whenever data is received, UDC is continuously and repeatedly performed 2w-10 on an upper layer header part (e.g., an IP packet header) of a received PDCP SDU ti generate 2w-15. Then, as shown in 2w-20, an integrity protection procedure may be performed (2w-25) on the PDCP SDU to which header compression is applied, MAC-I may be calculated 2w-35 and then may be concatenated to an end of the data (2w-30), a ciphering procedure may be performed 2w-45 on the MAC-I and the data to which integrity protection is applied (2w-40), a PDCP header, the UDC header, and a SDAP header may be simultaneously generated (2w-50) and then may be concatenated to the data on which integrity protection and ciphering are performed, and the data may be transferred to a lower layer. The generation of the PDCP header, the UDC header, and the SDAP header may be processed in parallel with the integrity protection procedure or the ciphering procedure. In this regard, when headers are generated in a parallel manner, the SDAP header, the PDCP header, the UDC header, or an RLC header or a MAC header may be generated together, and the headers may be concatenated at one time to the front of data that has completely undergone data processing and may be prepared for transmission (a configuration of a MAC PDU may be prepared). Also, a receiving end may separate the SDAP header, the PDCP header, the UDC header, or the RLC header or the MAC header at one time from the data and read them, may recognize information corresponding to each layer, and may process data in inverse order of data processing performed by a transmitting end. Thus, the HW accelerator may be continuously and repeatedly applied, and because interruption such as generation of a UDC header and a SDAP header does not occur in between, efficiency of data processing may be increased. Also, when integrity protection is configured, before a ciphering procedure is performed, the HW accelerator may be applied to the integrity protection as described with respect to the ciphering procedure, and thus the integrity protection may be repeatedly performed. That is, the integrity protection may be performed and then the ciphering procedure may be performed.

A PDCP entity of the receiving end may use a method of implementing one entity by unifying a SDAP entity and a PDCP entity as in 2w-01. That is, when data is received from a lower layer (a RLC layer), in a case where it is configured, in a RRC message, to use a function of the SDAP entity or to use a SDAP header, the RRC message as shown in FIG. 2E (see 2e-10, 2e-40, or 2e-75), the one entity of the SDAP and PDAP entities may read and remove a PDCP header and a SDAP header at one time, and may repeatedly apply a decrypting or deciphering procedure on the data. Also, when integrity protection is configured, after a deciphering procedure is performed, the HW accelerator may be applied to integrity verification as described with respect to the deciphering procedure, and thus the integrity verification may be repeatedly performed. That is, the deciphering procedure may be performed and then the integrity verification may be performed. When integrity verification is completed, whether occurrence of a checksum failure may be checked by reading the UDC header from upper layer data, a UDC decompression procedure may be performed on the upper layer data, and the reconstructed upper layer data may be transferred to an upper layer.

Figure 2X:
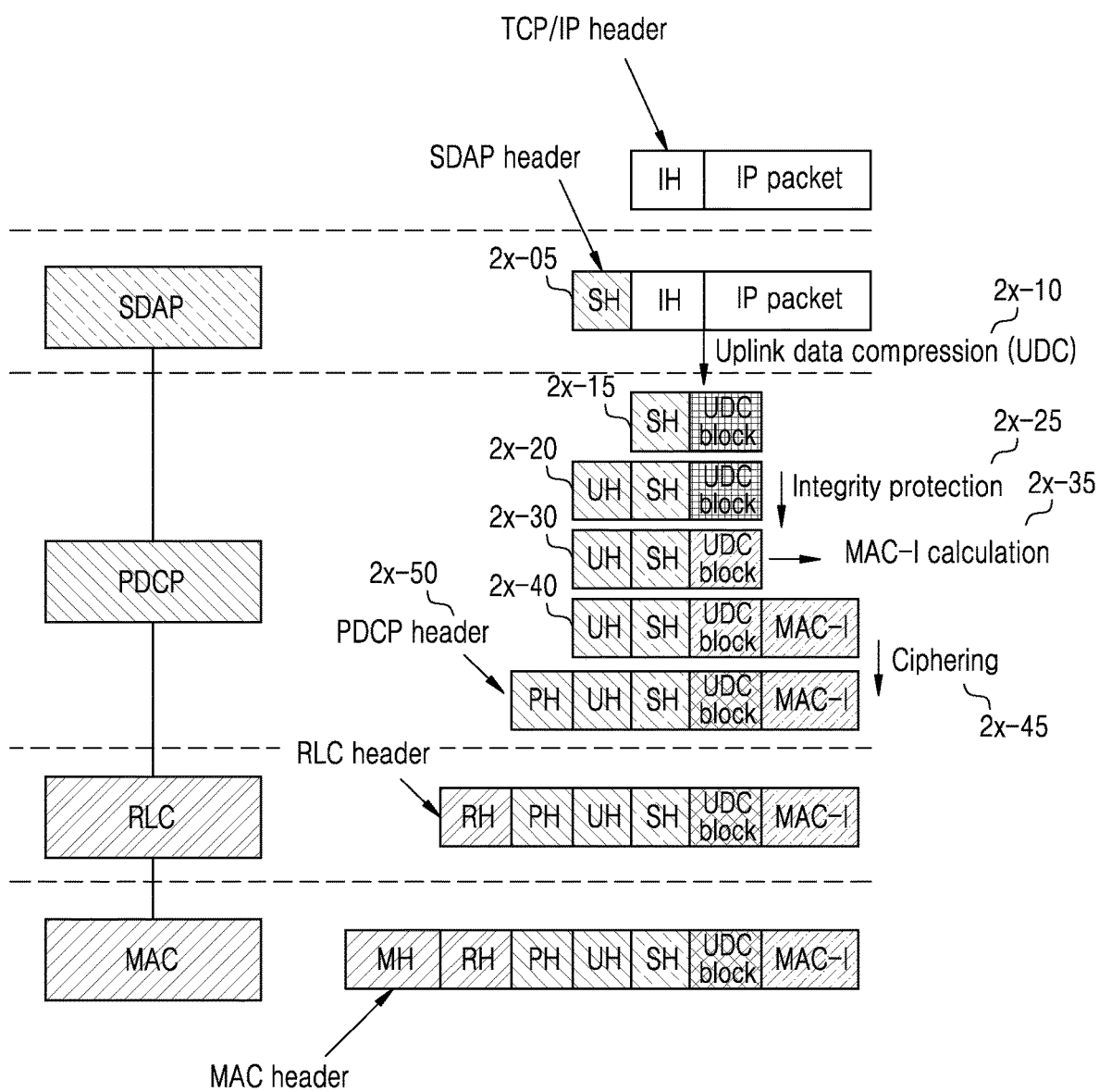
FIG. 2X illustrates a procedure in which a SDAP entity generates a SDAP header with respect to data received from an upper layer, and a PDCP entity performs UDC, does not apply integrity protection to a UDC header, does not perform ciphering on the UDC header, does not apply integrity protection to the SDAP header, does not perform ciphering on the SDAP header, and does not perform ciphering on a MAC-I, according to an embodiment of the disclosure.

FIG. 2X illustrates a procedure in which a SDAP entity generates a SDAP header with respect to data received from an upper layer, and a PDCP entity performs UDC, does not apply integrity protection to a UDC header, does not perform ciphering on the UDC header, does not apply integrity protection to the SDAP header, does not perform ciphering on the SDAP header, and does not perform ciphering on a MAC-I, according to an embodiment of the disclosure.

In FIG. 2X, in a case where it is configured, in a RRC message, to use a function of the SDAP entity or to use a SDAP header, it is configured, in the RRC message, to perform integrity protection and integrity verification, it is configured, in the RRC message, to perform UDC on an uplink or a downlink, the RRC message as shown in FIG. 2E (see 2e-10, 2e-40, or 2e-75), when the SDAP entity receives data from the upper layer, the SDAP entity may generate and configure a SDAP header as in 2x-05, and may transfer the SDAP header to the PDCP entity. The PDCP entity performs UDC on a part (e.g., an IP packet header) of a received PDCP SDU, except for the SDAP header (2x-10). Then, the PDCP entity may calculate a checksum field based on a current UDC buffer 2x-15, may configure a UDC header, and may concatenate the UDC header to the front of the SDAP header as shown in 2x-20. When integrity protection is configured, the PDCP entity may perform the integrity protection on 2x-25 including the UDC header, the SDAP header, and a UDC block, except for the UDC header and the SDAP header, which is received from the upper SDAP entity, to which UDC is applied, and the UDC header is concatenated, and may calculate a MAC-I (2x-30 and 2x-35). When the MAC-I is calculated, a PDCP COUNT value, an uplink indicator or downlink indicator, a bearer indicator, a security key, a data part (on which the integrity protection is performed), or the like may be input values for an integrity protection algorithm. The calculated MAC-I may be concatenated to an end of the data as shown in 2x-40. The MAC-I may have a certain size, e.g., a size of 4 bytes. The PDCP entity may perform ciphering on 2x-40 to which the MAC-I is concatenated, except for the UDC header and the SDAP header (2x-40 and 2x-45), may generate, configure, and concatenate a PDCP header to the data (2x-50), and may transfer the data to a lower layer. Then, an RLC entity and a MAC entity may perform data processing. The embodiment of the disclosure is characterized in that the MAC-I is not ciphered. When the MAC-I is not ciphered, an advantage in data processing may be further obtained as will be described below.

A receiving end removes a MAC header and an RLC header and transfers the data to a PDCP layer, and a PDCP entity of the receiving end reads and then removes the PDCP header, the UDC header, and the SDAP header, and performs deciphering on the data part, except for the UDC header, the SDAP header, and the MAC-I at the end. In this regard, deciphering is not performed on the MAC-I. Afterward, the PDCP entity of the receiving end performs integrity verification on an upper layer header (a TCP/IP header) and the data part, except for the UDC header and the SDAP header, and calculates an X-MAC. When the X-MAC is calculated, the PDCP COUNT value, the uplink indicator or downlink indicator, the bearer indicator, the security key, the data part (on which the integrity protection is performed), or the like may be the input values for the integrity protection algorithm. The PDCP entity of the receiving end checks whether a value of the X-MAC is equal to a value of the MAC-I concatenated to the end of the data. When the values are equal, integrity verification succeeded, but when the values of the X-MAC and MAC-I are not equal, integrity verification failed and therefore, the PDCP entity of the receiving end discards the data and has to report the failure of the integrity verification to an upper layer (e.g., an RRC layer). When integrity verification is completed, whether occurrence of a checksum failure may be checked by reading the UDC header, a UDC decompression procedure may be performed on upper layer data, and the reconstructed upper layer data may be transferred to an upper layer.

In this manner, when ciphering or integrity protection is not performed on the UDC header and the SDAP header, a configuration of an implementation of a base station may be simplified, and in particular, in a CU-DU structure split structure, when a CU does not cipher a SDAP header, a DU may check QoS information by reading the SDAP header and may apply the QoS information to scheduling, and thus it may be advantageous to match and adjust QoS. Also, the aforementioned feature may have an advantage in a data processing aspect in a configuration of a UE and a base station. In addition, when the MAC-I is not ciphered, an advantage in data processing may be further obtained as will be described below.

Figure 2Y:
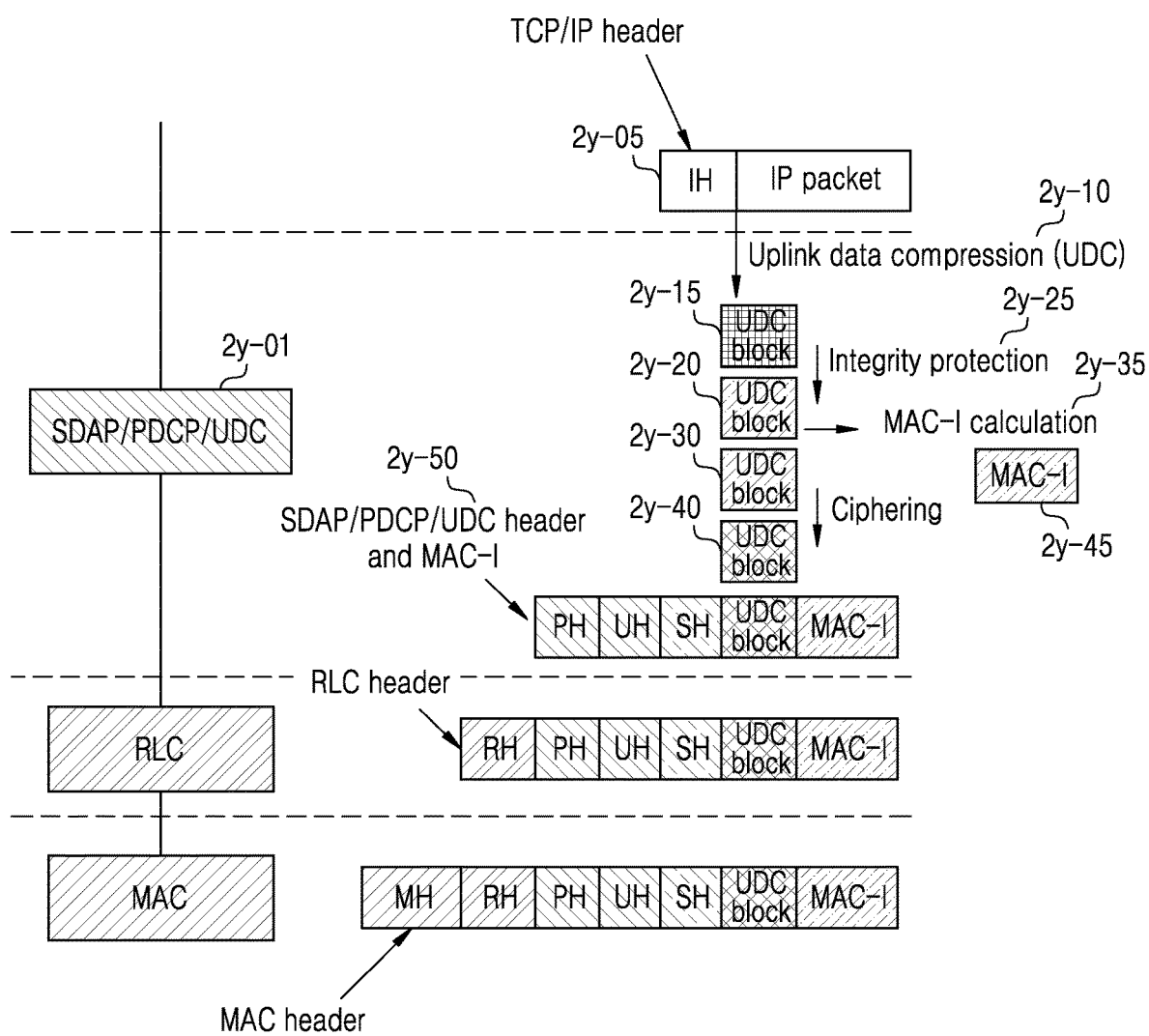
FIG. 2Y illustrates an advantage in processing which may be obtained from a base station and a UE which are implemented by applying a SDAP header and a UDC header on which ciphering and integrity protection are not performed, by performing UDC, and by not ciphering a MAC-I, according to an embodiment of the disclosure.

FIG. 2Y illustrates an advantage in processing which may be obtained from a base station and a UE which are implemented by applying a SDAP header and a UDC header on which ciphering and integrity protection are not performed, by performing UDC, and by not ciphering a MAC-I, according to an embodiment of the disclosure.

In FIG. 2Y, when the UE and the base station are implemented, a SDAP entity and a PDCP entity may be unified to one entity (2y-01). Because, logically, the SDAP entity is an upper entity of the PDCP entity, when data 2s-01 is received from an upper application layer, in a case where it is configured, in a RRC message, to use a function of the SDAP entity or to use a SDAP header, integrity protection is configured, and to perform UDC on an uplink or a downlink in the RRC message as shown in FIG. 2E (see 2e-10, 2e-40, or 2e-75), when the SDAP entity receives data from the upper layer, the SDAP entity has to generate and configure a SDAP header as in 2j-05 of FIG. 2J. However, a ciphering procedure or an integrity protection procedure is an operation requiring high complexity in implementation of the UE and the base station, the operation may be performed by applying a HW accelerator thereto. The HW accelerator obtains a high advantage in processing from a repetitive and continuous procedure. However, when the SDAP entity configures a SDAP header and is configured to perform integrity protection and UDC whenever the SDAP entity receives data from the upper entity, when a process of performing a UDC procedure, generating and concatenating a UDC header, performing an integrity protection procedure and a ciphering procedure on a data part other than the UDC header and the SDAP header, generating a PDCP header, and concatenating the PDCP header to the SDAP header is performed, interruption to the HW accelerator may occur due to an operation of generating the UDC header and the SDAP header before the integrity protection procedure and the ciphering procedure are performed in the process.

Therefore, the disclosure describes a method of implementing a UDC header and a SDAP header on which integrity protection and ciphering are not performed, a MAC-I that is not ciphered, and one entity by unifying a SDAP entity and a PDCP entity. That is, when data is received from an upper application layer 2y-05, whenever data is received, UDC is continuously and repeatedly performed on an upper layer header part (e.g., an IP packet header) of a received PDCP SDU (2y-10), an integrity protection procedure may be performed (2y-25) on data 2y-15, a MAC-I may be calculated (2y-35 and 2y-45) on data 2y-20, a ciphering procedure may be performed on the data 2y-30 to which integrity protection is applied, a PDCP header, the UDC header, the SDAP header, and the MAC-I may be simultaneously generated and then may be concatenated to the data on which integrity protection and ciphering are performed, and the data 2y-40 may be transferred to a lower layer (2y-50). That is, the generated headers may be concatenated to the front of the data, and the MAC-I may be concatenated to an end of the data. The generation of the PDCP header, the SDAP header, and the MAC-I may be processed in parallel with the integrity protection procedure or the ciphering procedure. In this regard, when headers are generated in a parallel manner, the SDAP header, the PDCP header, the UDC header, or an RLC header or a MAC header may be generated together, and the headers may be concatenated at one time to the front of the data that has completely undergone data processing and may be prepared for transmission (a configuration of a MAC PDU may be prepared). The MAC-I may be concatenated to the end of the data that has completely undergone data processing. Also, a receiving end may separate the SDAP header, the PDCP header, the UDC header, or the RLC header or the MAC header at one time from the data and read them, may recognize information corresponding to each layer, and may process data in inverse order of data processing performed by a transmitting end. Thus, the HW accelerator may be continuously and repeatedly applied, and because interruption such as generation of the UDC header and the SDAP header does not occur in between, efficiency of data processing may be increased. Also, when integrity protection is configured, before a ciphering procedure is performed, the HW accelerator may be applied to the integrity protection as described with respect to the ciphering procedure, and thus the integrity protection may be repeatedly performed. That is, the integrity protection may be performed and then the ciphering procedure may be performed.

A PDCP entity of the receiving end may use a method of implementing one entity by unifying a SDAP entity and a PDCP entity as in 2l-01. That is, when data is received from a lower layer (a RLC layer), in a case where it is configured, in a RRC message, to use a function of the SDAP entity or to use a SDAP header, the RRC message as shown in FIG. 2E (see 2e-10, 2e-40, or 2e-75), the one entity of the SDAP and PDAP entities may read and remove the PDCP header, the UDC header, and the SDAP header at one time, and may repeatedly apply a decrypting or deciphering procedure on the data. When integrity verification is completed, whether occurrence of a checksum failure may be checked by reading the UDC header, a UDC decompression procedure may be performed on upper layer data, and the reconstructed upper layer data may be transferred to an upper layer. That is, the headers of received data may be read and removed, the MAC-I at the end of the data may be read and removed, deciphering may be performed on the data part, and an integrity verification procedure may be performed. When integrity verification is completed, a UDC decompression procedure may be performed on the upper layer header (e.g., the IP packet header), and reconstructed upper layer data may be transferred to an upper layer.

Figure 2Z:
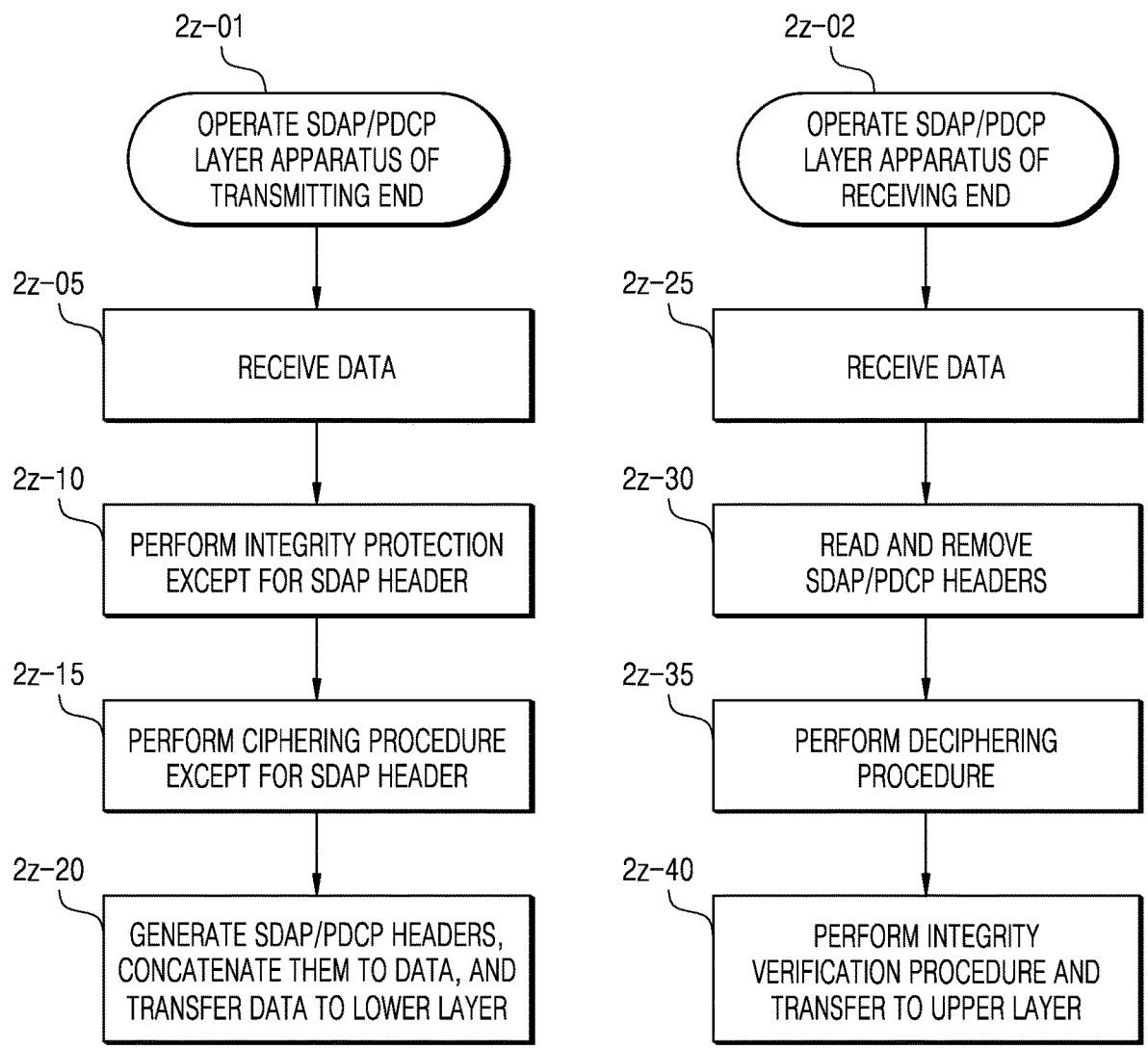
FIG. 2Z illustrates operations of a transmitting SDAP/PDCP entity and a receiving SDAP/PDCP entity of a logical channel, a bearer, or a SDAP/PDCP entity to which integrity protection is configured, when a SDAP header on which integrity protection and ciphering are not performed is applied to the SDAP/PDCP entity, according to an embodiment of the disclosure.
Figure 2A:
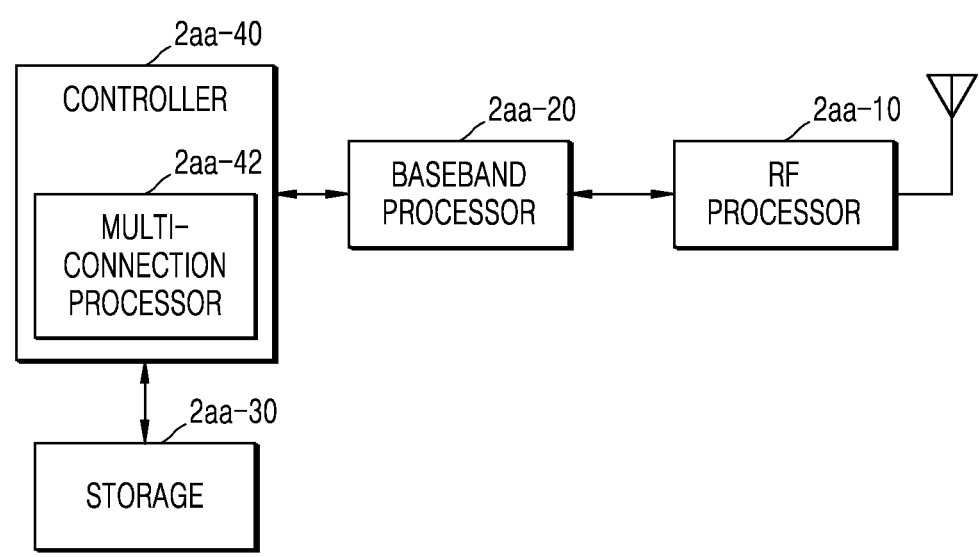
Figure 2A:
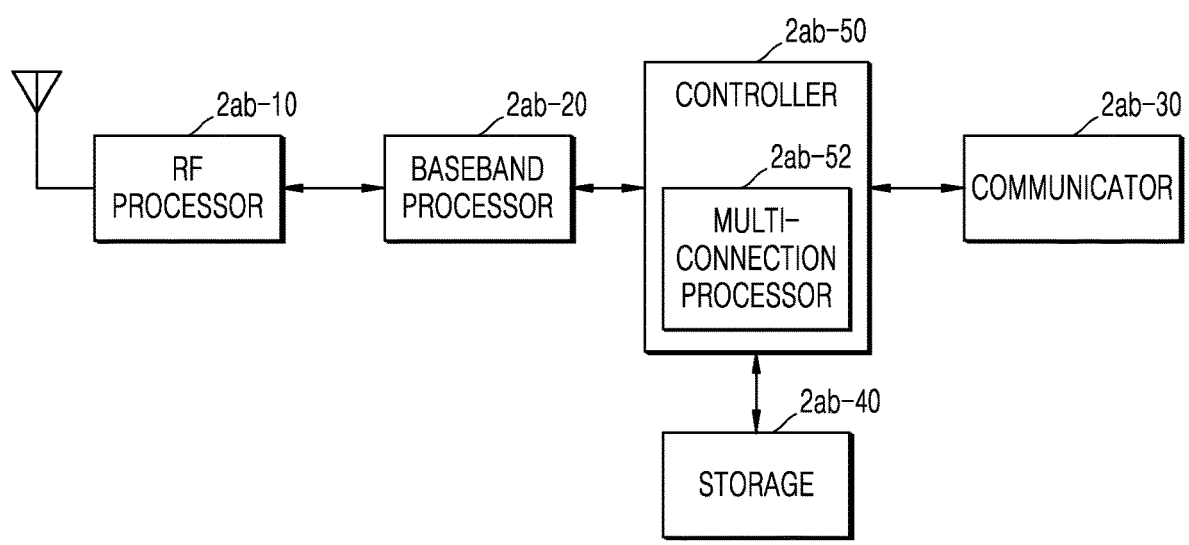

FIG. 2Z illustrates operations of a transmitting SDAP/PDCP entity and a receiving SDAP/PDCP entity of a logical channel, a bearer, or a SDAP/PDCP entity to which integrity protection is configured, when a SDAP header on which integrity protection and ciphering are not performed is applied to the SDAP/PDCP entity, according to an embodiment of the disclosure.

In FIG. 2Z, when a UE and a base station are implemented, a SDAP entity and a PDCP entity may be unified to one entity (2z-01). The disclosure provides a method for a case in which integrity protection is configured, the method of implementing a SDAP header on which ciphering is not performed, and one entity by unifying a SDAP entity and a PDCP entity. That is, when data is received from an upper application layer (2z-05), integrity protection may be applied to the data whenever the data is received (2z-10), a ciphering procedure may be continuously and repeatedly performed (2z-15), a PDCP header and a SDAP header may be simultaneously performed (2z-20), the PDCP and SDAP headers may be concatenated to ciphered data, and the ciphered data may be transferred to a lower layer. The generation of the PDCP header and the SDAP header may be processed in parallel with the integrity protection procedure or the ciphering procedure. In this regard, when headers are generated in a parallel manner, the SDAP header, the PDCP header, a UDC header, or an RLC header or a MAC header may be generated together, and the headers may be concatenated at one time to the front of data that has completely undergone data processing and may be prepared for transmission (a configuration of a MAC PDU may be prepared). Also, a receiving end may separate the SDAP header, the PDCP header, the UDC header, or the RLC header or the MAC header at one time from the data and read them, may recognize information corresponding to each layer, and may process data in inverse order of data processing performed by a transmitting end. Thus, the HW accelerator may be continuously and repeatedly applied, and because interruption such as generation of the SDAP header does not occur in between, efficiency of data processing may be increased. The HW accelerator may be applied to a UDC procedure.

A PDCP entity 2z-02 of the receiving end may apply the method to the case in which integrity protection is configured, the method of implementing one entity by unifying a SDAP entity and a PDCP entity. That is, when data is received from a lower layer (an RLC layer) (2z-25), in a case where it is configured, in a RRC message, to use a function of the SDAP entity or to use a SDAP header, the RRC message as shown in FIG. 2E (see 2e-10, 2e-40, or 2e-75), the one entity of the SDAP and PDAP entities may read and remove the PDCP header and the SDAP header at one time (2z-30), may repeatedly apply a deciphering procedure to the data (2z-35), may repeatedly apply an integrity verification procedure to the data, and may transfer the data to an upper layer (2z-40).

FIG. 2AA illustrates a configuration of a UE according to an embodiment of the disclosure.

Referring to FIG. 2AA, the UE includes a radio frequency (RF) processor 2aa-10, a baseband processor 2aa-20, a storage 2aa-30, and a controller 2aa-40.

The RF processor 2aa-10 performs functions including conversion, amplification, or the like of a band of a signal so as to transceive the signal through a wireless channel. That is, the RF processor 2aa-10 up-converts a baseband signal provided from the baseband processor 2aa-20 to an RF band signal and receives the RF band signal via an antenna, and down-converts a RF band signal received via the antenna to a baseband signal. For example, the RF processor 2aa-10 may include a transmission filter, a reception filter, an amplifier, a mixer, an oscillator, a digital-to-analog converter (DAC), an analog-to-digital converter (ADC), or the like. Although FIG. 2AA illustrates only one antenna, the UE may include a plurality of antennas. Also, the RF processor 2aa-10 may include a plurality of RF chains. Furthermore, the RF processor 2aa-10 may perform beamforming. For beamforming, the RF processor 2aa-10 may adjust phases and magnitudes of respective signals transceived via the plurality of antennas or antenna elements. Also, the RF processor 2aa-10 may perform massive multiple input multiple output (MIMO), and may receive a plurality of layers while performing a MIMO operation. The RF processor 2aa-10 may perform reception beam sweeping by appropriately setting the plurality of antennas or the antenna elements by the control of the controller 2aa-40, or may adjust a direction and width of a received beam such that the received beam coordinates with a transmitted beam.

The baseband processor 2aa-20 performs a function of conversion between the baseband signal and a bit string according to a physical layer specification of a system. For example, in data transmission, the baseband processor 2aa-20 generates complex symbols by encoding and modulating a transmitted bit string. Also, in data reception, the baseband processor 2aa-20 reconstructs a received bit string by demodulating and decoding a baseband signal provided from the RF processor 2aa-10. For example, when data is transmitted according to an OFDM scheme, the baseband processor 2aa-20 generates complex symbols by encoding and modulating a transmitted bit string, maps the complex symbols to subcarriers, and configures OFDM symbols by performing an inverse fast Fourier transform (IFFT) operation and inserting a cyclic prefix (CP). Also, in data reception, the baseband processor 2aa-20 may divide the baseband signal provided from the RF processor 2aa-10 into OFDM symbol units and restore the signals mapped to the subcarriers by performing a fast Fourier transform (FFT) operation and then reconstruct the received bit string by demodulating and decoding the signals.

The baseband processor 2aa-20 and the RF processor 2aa-10 transmit and receive signals as described above. Accordingly, the baseband processor 2aa-20 and the RF processor 2aa-10 may be referred to as a transmitter, a receiver, a transceiver, or a communicator. Furthermore, at least one of the baseband processor 2aa-20 and the RF processor 2aa-10 may include a plurality of communication modules to support different wireless access technologies. Also, at least one of the baseband processor 2aa-20 and the RF processor 2aa-10 may include different communication modules configured to support a plurality of different wireless access technologies. Also, at least one of the baseband processor 2aa-20 and the RF processor 2aa-10 may include different communication modules configured to process signals of different frequency bands. For example, the different wireless access technologies may include an LTE network, an NR network, or the like. Examples of the different frequency bands may include a super-high frequency (SHF) band (e.g., 2.5 GHz or 5 Ghz), and a mmWave band (e.g., 60 GHz).

The storage 2aa-30 may store data such as a default program, an application program, and configuration information for the operations of the UE. The storage 2aa-30 provides stored data, in response to a request by the controller 2aa-40.

The controller 2aa-40 controls overall operations of the UE. For example, the controller 2aa-40 transmits and receives signals through the baseband processor 2aa-20 and the RF processor 2aa-10. Also, the controller 2aa-40 records and reads the data stored in the storage 2aa-30. To do so, the controller 2aa-40 may include at least one processor. For example, the controller 2aa-40 may include a communication processor (CP) configured to perform communication control and an application processor (AP) configured to control an upper layer such as an application program.

According to an embodiment of the disclosure, the controller 2aa-40 includes a multi-connection processor 2aa-42 configured to perform processing to operate in a multi-connection mode.

FIG. 2AB illustrates a configuration of a base station according to an embodiment of the disclosure.

Referring to FIG. 2AB, the base station includes a RF processor 2ab-10, a baseband processor 2ab-20, a communicator 2ab-30, a storage 2ab-40, and a controller 2ab-50.

The RF processor 2ab-10 performs functions including conversion, amplification, or the like of a band of a signal so as to transceive the signal through a wireless channel. That is, the RF processor 2ab-10 up-converts a baseband signal provided from the baseband processor 2ab-20 to an RF band signal and receives the RF band signal via an antenna, and down-converts a RF band signal received via the antenna to a baseband signal. For example, the RF processor 2ab-10 may include a transmission filter, a reception filter, an amplifier, a mixer, an oscillator, a DAC, an ADC, or the like. Although FIG. 2AB illustrates only one antenna, the base station may include a plurality of antennas. Also, the RF processor 2ab-10 may include a plurality of RF chains. Furthermore, the RF processor 2ab-10 may perform beamforming. For beamforming, the RF processor 2ab-10 may adjust phases and magnitudes of respective signals transceived via the plurality of antennas or antenna elements. Also, the RF processor 2ab-10 may perform a down-MIMO operation by transmitting one or more layers.

The baseband processor 2ab-20 performs a function of conversion between the baseband signal and a bit string according to a physical layer specification of a first wireless access technology. For example, in data transmission, the baseband processor 2ab-20 generates complex symbols by encoding and modulating a transmitted bit string. Also, in data reception, the baseband processor 2ab-20 reconstructs a received bit string by demodulating and decoding a baseband signal provided from the RF processor 2ab-10. For example, when data is transmitted according to an OFDM scheme, the baseband processor 2ab-20 generates complex symbols by encoding and modulating a transmitted bit string, maps the complex symbols to subcarriers, and configures OFDM symbols by performing an IFFT operation and inserting a cyclic prefix (CP). Also, in data reception, the baseband processor 2ab-20 may divide the baseband signal provided from the RF processor 2ab-10 into OFDM symbol units and restore the signals mapped to the subcarriers by performing an FFT operation and then reconstruct the received bit string by demodulating and decoding the signals. The baseband processor 2ab-20 and the RF processor 2ab-10 transceive a signal as described above. Accordingly, the baseband processor 2ab-20 and the RF processor 2ab-10 may be referred to as a transmitter, a receiver, a transceiver, a communicator, or a wireless communicator.

The communicator 2ab-30 provides an interface for performing communication with other nodes in a network.

The storage 2ab-40 stores data such as a default program, an application program, and configuration information for operations of the base station. In particular, the storage 2ab-40 may store information about a bearer allocated to a connected UE, a measurement result reported by the connected UE, or the like. Also, the storage 2ab-40 may store information that is a criterion of determining whether to provide or stop multi-connection to the UE. Also, the storage 2ab-40 may provide stored data, in response to a request by the controller 2ab-50.

The controller 2ab-50 controls all operations of the base station. For example, the controller 2ab-50 transceives signals via the baseband processor 2ab-20 and the RF processor 2ab-10, or via the communicator 2ab-30. Also, the controller 2ab-50 may record/read data to/from the storage 2ab-40. To do so, the controller 2ab-50 may include at least one processor. According to an embodiment of the disclosure, the controller 2ab-50 includes a multi-connection processor 2aa-52 configured to perform processing to operate in a multi-connection mode.

Figure 3A:
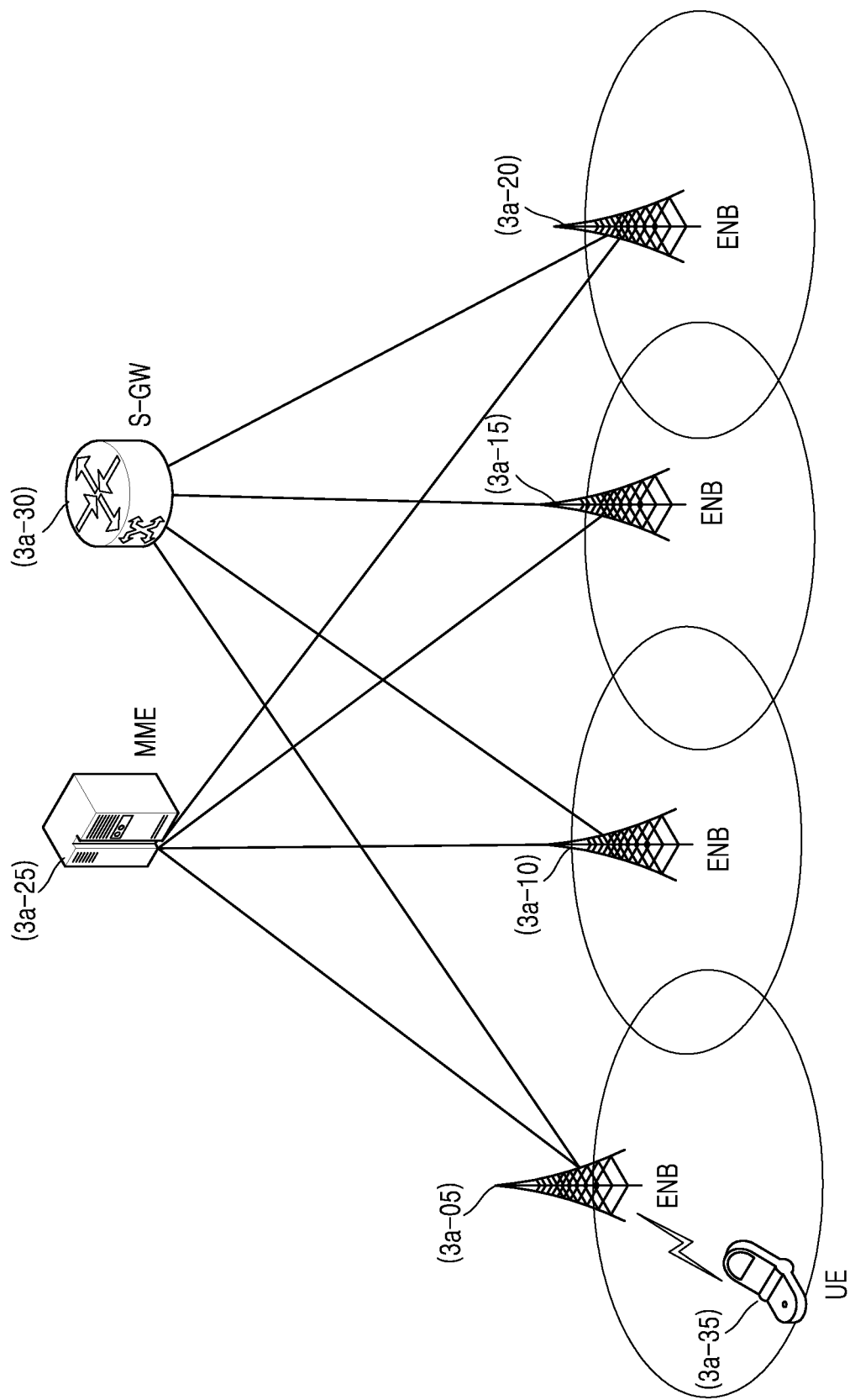
FIG. 3A is a diagram illustrating a configuration of an LTE system according to an embodiment of the disclosure.

FIG. 3A is a diagram illustrating a configuration of an LTE system.

Referring to FIG. 3A, a wireless communication system is configured of a plurality of base stations (also referred to as 'eNBs') 3a-05, 3a-10, 3a-15, and 3a-20, an MME 3a-25, and an S-GW 3a-30. A user equipment (hereinafter, a UE or a terminal) 3a-35 accesses an external network via the eNBs 3a-05, 3a-10, 3a-15, and 3a-20 and the S-GW 3a-30.

The eNBs 3a-05, 3a-10, 3a-15, and 3a-20, as access nodes of a cellular network, provide radio access to UEs that access a network. That is, to service traffic of users, the eNBs 3a-05, 3a-10, 3a-15, and 3a-20 collect and schedule a plurality of pieces of state information including buffer states, available transmission power states, channel states, or the like of the UEs, and then support connection between the UEs and a core network (CN). The MME 3a-25 is a device configured to perform not only a mobility management function but also perform various control functions with respect to the UEs, and is connected to a plurality of base stations. The S-GW 3a-30 is a device configured to provide a data bearer. Also, the MME 3a-25 and the S-GW 3a-30 may be further configured to perform authentication, bearer management, or the like with respect to UE that accesses the network, and to process a packet received from the eNBs 3a-05, 3a-10, 3a-15, and 3a-20 or a packet to be transmitted to the eNBs 3a-05, 3a-10, 3a-15, and 3a-20.

Figure 3B:
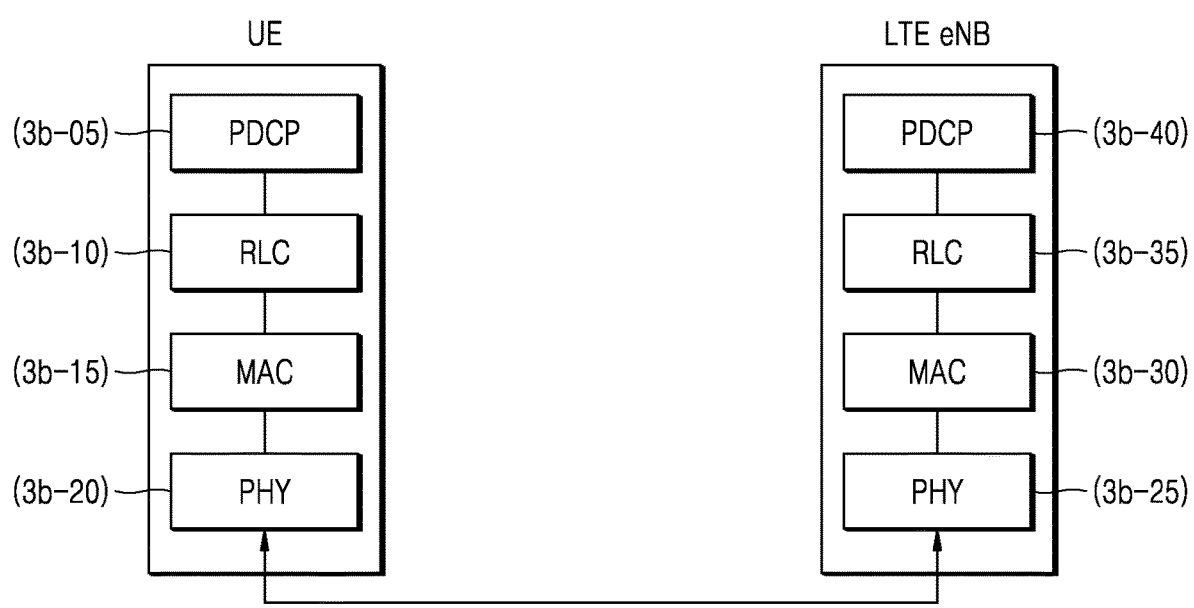
FIG. 3B is a diagram illustrating a radio protocol architecture in an LTE system according to an embodiment of the disclosure.

FIG. 3B is a diagram illustrating a radio protocol architecture in an LTE system.

An NR system has a protocol architecture that is very similar to that of the LTE system.

Referring to FIG. 3B, a radio protocol in the LTE system is configured of PDCPs 3b-05 and 3b-40, RLCs 3b-10 and 3b-35, and MACs 3b-15 and 3b-30 in respective UE and eNB. The PDCPs 3b-05 and 3b-40 perform operations including IP header compression/decompression, and the RLCs 3b-10 and 3b-35 reconfigure a PDCP Packet Data Unit (PDCP PDU) to have an appropriate size. The MACs 3b-15 and 3b-30 are connected to a plurality of RLC layers configured in one UE, and may perform operations of multiplexing RLC PDUs into MAC PDUs and demultiplexing RLC PDUs from MAC PDUs. PHY layers 3b-20 and 3b-25 perform operations of channel-encoding and modulating upper layer data and transmitting OFDM symbols through a wireless channel by converting the upper layer data to the OFDM symbols, or operations of demodulating and channel-decoding OFDM symbols received through the wireless channel, and transmitting decoded data to an upper layer. To perform additional error correction, the PHY layers 3b-20 and 3b-25 use hybrid automatic repeat request (hybrid ARQ or HARQ), and a receiving end transmits 1 bit indicating acknowledge (ACK) or negative acknowledge (NACK) about a packet transmitted from a transmitting end. This is called HARQ ACK/NACK information. Downlink HARQ ACK/NACK information with respect to uplink transmission may be transmitted via a physical hybrid-ARQ indicator channel (PHICH) physical channel, and uplink HARQ ACK/NACK information with respect to downlink transmission may be transmitted via a physical uplink control channel (PUCCH) physical channel or a physical uplink shared channel (PUSCH) physical channel.

Although not illustrated in FIG. 3B, respective radio resource control (RRC) layers are present as upper layers of the PDCP layers 3b-05 and 3b-40 of the UE and the eNB, and the RRC layers may exchange a setting control message related to access and measurement for controlling wireless resources.

The PHY layer 3b-20 or 3b-25 may include one or more frequencies/carriers, and a technology for simultaneously setting and using multiple frequencies in one base station is called carrier aggregation (CA). According to the CA technology, instead of using only one carrier for communication between a UE and a base station (i.e., an E-UTRAN NodeB (eNB)), one primary carrier and multiple secondary carriers are additionally used and thus transmission capacity may be significantly increased by the number of secondary carriers. In LTE and NR systems, a cell served by a base station using the primary carrier is called a primary cell (PCell) and a cell served by the base station using the secondary carrier is called a secondary cell (SCell). A technology of expanding the CA technology is called dual connectivity (DC). According to the DC technology, a UE is simultaneously connected to a master base station (i.e., a master E-UTRAN NodeB (MeNB)) and a secondary base station (i.e., a secondary E-UTRAN NodeB (SeNB)) so as to use radio resources, and cells served by the MeNB is called a master cell group (MCG) and cells served by the SeNB is called a secondary cell group (SCG). Each group has a representative cell, and in this regard, a representative cell of the MCG is called a primary cell (PCell) and a representative cell of the SCG is called a primary secondary cell (PSCell). When using the NR, the MCG uses the LTE technology and the SCG uses the NR, and thus the UE may simultaneously use the LTE technology and the NR.

In the LTE and NR systems, the UE transmits a power headroom report (PHR) to the eNB, according to a certain condition. The PHR indicates a difference between maximum transmission power and transmission power, the maximum transmission power being set in the UE and the transmission power being estimated by the UE. The transmission power estimated by the UE is calculated (a resultant value thereof is called a real value) based on a value used when the UE transmits an actual uplink, but when the UE does not transmit the actual uplink, the estimated transmission power is calculated (a resultant value thereof is called a virtual value) according to a certain equation defined in a standard rule. When the eNB receives the PHR, the eNB may determine available maximum transmission power of the UE. When the CA is used, the PHR is transmitted to each of the multiple secondary carriers.

Figure 3C:
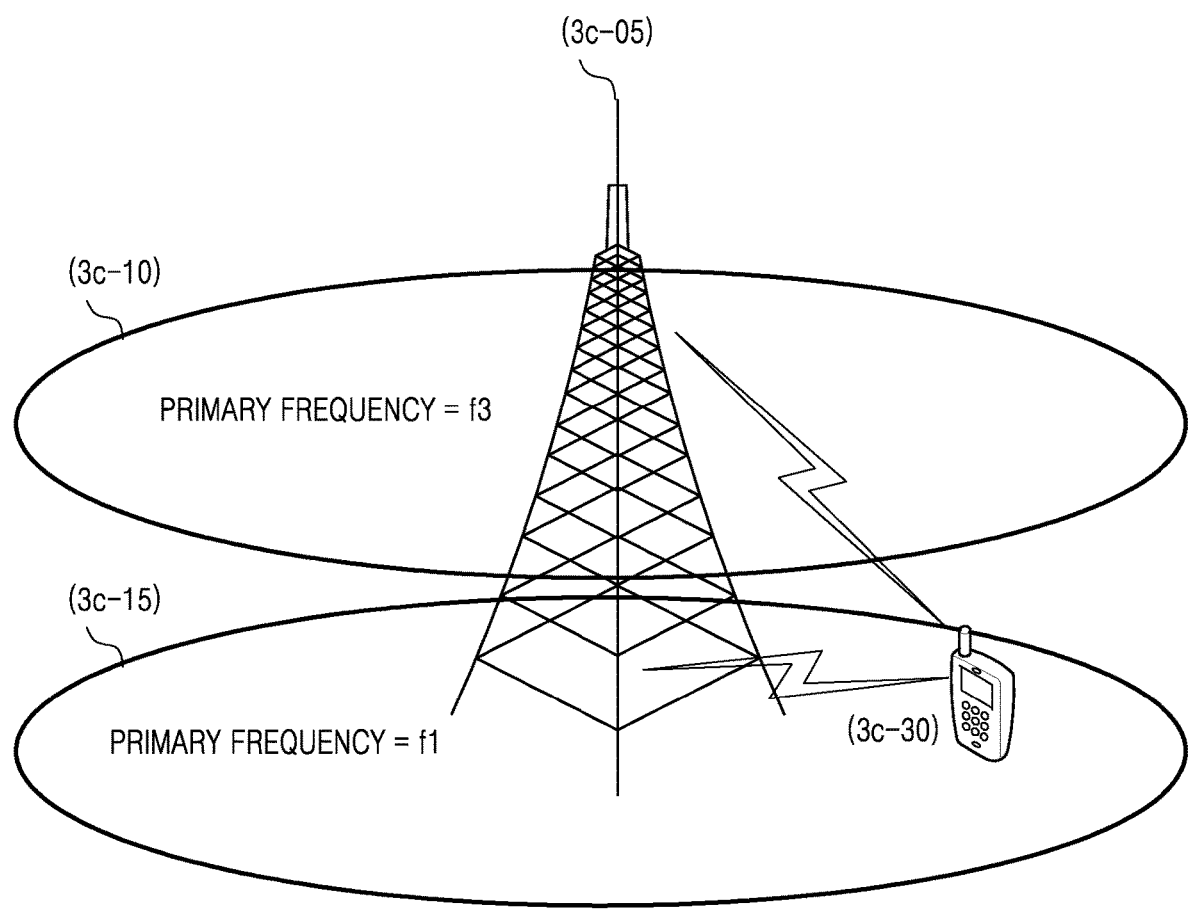
FIG. 3C is a diagram for describing carrier aggregation (CA) in a UE according to an embodiment of the disclosure.

FIG. 3C is a diagram for describing CA in a UE.

Referring to FIG. 3C, in one base station, multiple carriers are generally transmitted and received over several frequency bands. For example, when a base station 3c-05 transmits a carrier 3c-15 whose primary frequency is f1 and a carrier 3c-10 whose primary frequency is f3, according to the related art, one UE transceives data by using one of two carriers. However, a UE having a CA function may simultaneously transceive data with multiple carriers. The base station 3c-05 may allocate more carriers to a UE 3c-30 having a CA function, according to a condition, thereby increasing a transmission rate of the UE 3c-30.

When it is assumed that one cell generally consists of one forward carrier and one backward carrier which are transmitted/received from/by one base station, CA may be understood in a manner that a UE simultaneously transceives data through multiple cells. By doing so, a maximum transmission rate is increased in proportion to the number of aggregated carriers.

Hereinafter, in the disclosure, the expression of that a UE receives data through a random forward carrier or transmits data through a random backward carrier has the same meaning as that the data is transceived by using a control channel and a data channel provided by a cell corresponding to a primary frequency and a frequency bandwidth which specify a corresponding carrier. Also, hereinafter, the disclosure will now be described with reference to an LTE system for convenience of description, but the disclosure may be applied to various wireless communication system that support CA.

Even when CA is performed or not performed, backward transmission (i.e., transmission from a UE to a base station) causes interference in a backward transmission by another cell, and thus, a backward transmission output has to maintain in an appropriate level. To do so, when the UE performs backward transmission, the UE calculates a backward transmission output by using a certain function, and performs backward transmission based on a calculated backward transmission output. For example, the UE may calculate a value of a requested backward transmission output by inputting, to the certain function, scheduling information such as the amount of an allocated transmission resource, a modulation coding scheme (MCS) level to be applied, or the like and input values such as a path loss value or the like for estimating a channel state, and may perform backward transmission by applying the calculated value of the requested backward transmission output. The value of the backward transmission output which is applicable to the UE is limited due to a maximum transmission value of the UE, and when the calculated requested value of the backward transmission output is greater than the maximum transmission value of the UE, the UE performs the backward transmission according to the maximum transmission value. In this case, because the backward transmission output is not sufficient, a quality of the backward transmission may deteriorate. The base station may perform scheduling to prevent a requested transmission output from exceeding the maximum transmission value. However, few parameters including a path loss cannot be detected by the base station, and thus, when necessary, the UE transmits a PHR to report a state of an available transmission output (power headroom (PH)) of the UE to the base station.

Factors that affect an available transmission output are 1) the amount of an allocated transmission resource, 2) an MCS to be applied to backward transmission, 3) a path loss of an associated forward carrier, 4) an accumulated value of an output adjustment command, or the like. Among the factors, the path loss (hereinafter, the PL) or the accumulated value of the output adjustment command may vary according to backward carriers, and thus, when a plurality of backward carriers are aggregated in one UE, it is reasonable to configure whether to transmit a PHR for each of the backward carriers. However, for efficient transmission of the PHR, one backward carrier may report PHs of a plurality of backward carriers. According to an operational strategy, a PH may be requested by a carrier that does not actually transmit a PUSCH. Therefore, for this case, it is more efficient that one backward carrier reports all PHs of a plurality of backward carriers. To do so, an existing PHR has to be expanded. A plurality of PHs to be included in one PHR may be configured according to a predetermined order.

A PHR is triggered when a PL of a generally connected forward carrier is changed over a preset reference value, when a prohibit PHR timer is expired, or when a preset time elapses after the PHR is generated. Even when the PHR is triggered, the UE does not immediately transmit the PHR and stands by until a backward transmission resource is allocated thereto. This is because the PHR is not information that should be rapidly processed.

Figure 3D:
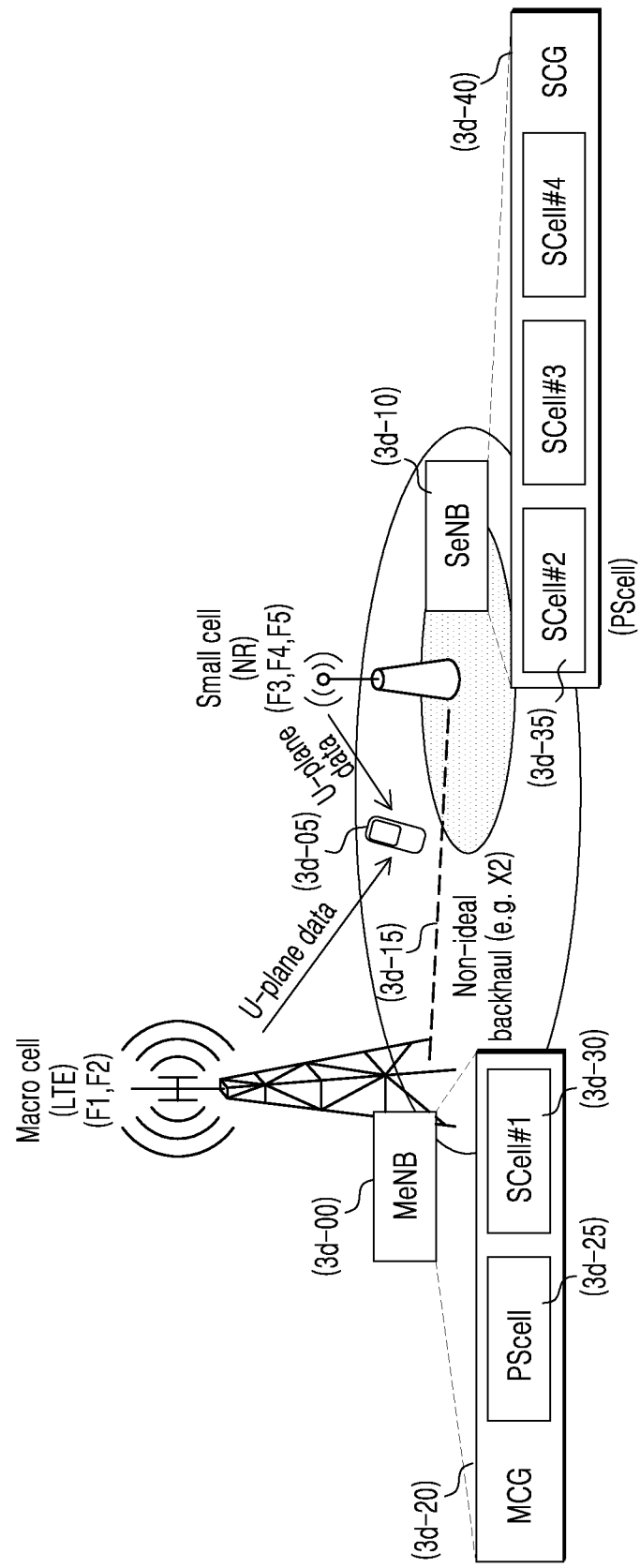
FIG. 3D is a diagram for describing a concept of multiple connectivity in an LTE and new radio (NR) according to an embodiment of the disclosure.

FIG. 3D is a diagram for describing a concept of multiple connectivity in an LTE and NR.

By using a DC technology, a UE may be simultaneously connected to two base stations and may use radio resources, and FIG. 3D illustrates a case in which a UE 3d-05 is simultaneously connected to a macro base station 3d-00 using an LTE technology and a small cell base station 3d-10 using an NR technology. This is called E-UTRAN-NR dual connectivity (EN-DC). The macro base station 3d-00 is called a Master E-UTRAN nodeB (MeNB) 3d-00, and the small cell base station 3d-10 is called a Secondary 5G nodeB (SgNB) 3d-10. A plurality of small cells may be present in a service coverage of the MeNB 3d-00, and the MeNB 3d-00 may be connected to a plurality of the SgNBs 3d-10 via a wired backhaul network 3d-15. A group of serving cells provided from the MeNB 3d-00 is called a master cell group (MCG) 3d-20, and one serving cell in the MCG 3d-20 is certainly a primary cell (PCell) 3d-25 having all functions such as connection establishment, connection re-establishment, handover, or the like which are used to be performed by an existing cell. In the PCell 3d-25, an uplink control channel has an PUCCH. A serving cell other than the PCell 3d-25 is called a secondary cell (SCell) 3d-30. FIG. 3D illustrates a scenario in which the MeNB 3d-00 provides one SCell 3d-30, and the SgNBs 3d-10 provides three SCells. A group of serving cells provided by the SgNBs 3d-10 is called a secondary cell group (SCG) 3d-40. When the UE 3d-05 transceives data to/from the MeNB 3d-00 and the SgNB 3d-10, the MeNB 3d-00 issues, to the SgNB 3d-10, a command for adding, changing, and removing serving cells provided by the SgNB 3d-10. To issue the command, the MeNB 3d-00 may configure the UE 3d-05 to measure a serving cell and neighboring cells. According to configuration information, the UE 3d-05 has to report a measurement result to the MeNB 3d-00. In order for the SgNB 3d-10 to efficiently transceive data to/from the UE 3d-05, the SgNB 3d-10 requires a serving cell to similarly serve as the PCell 3d-25 of the MCG 3d-20, and in the disclosure, the serving cell is called a primary SCell (PSCell) 3d-35. The PSCell 3d-35 is set as one of the serving cells of the SCG 3d-40, and is characterized in having a PUCCH that is an uplink control channel. The PUCCH is used by the UE 3d-05 to transfer HARQ ACK/NACK information, channel status information (CSI) information, a scheduling request (SR), or the like to a base station.

The disclosure provides a method of reporting remaining transmission power (a power headroom) of a UE to a base station, the method being performed by the UE that transceives data by simultaneously using a plurality of Radio Access Technologies (RATs) in a wireless communication system.

According to the disclosure, the UE exactly reports available transmission power to each of base stations and thus the base stations may correctly perform uplink scheduling.

FIG. 3E illustrates a method of transmitting an uplink according to a configuration and a type of the uplink, according to an embodiment of the disclosure.

In FIG. 3E, Example 1 corresponds to a scenario in which two serving cells, i.e., a PCell 3e-01 and a SCell 3e-03 are configured to the UE and then the UE performs uplink transmission according to scheduling by a base station. In the scenario, the UE cannot simultaneously transmit a PUCCH and a PUSCH in one serving cell due to a limit in a transmitting method and a RF structure. Accordingly, the UE transmits the PUSCH having PUCCH information embedded therein (3e-05). In this regard, the UE transmits the PUCCH information in the PCell 3e-01, or when there is no PUSCH that is transmitted in the PCell 3e-01, the UE transmits the PUCCH information in a SCell having a low index from among SCells. A PHR message is transmitted as a part of the PUSCH, and thus, in the scenario, the UE is required to report only a power headroom value obtained by subtracting transmission power from maximum transmission power $P_{CMAX,c}$ of each serving cell, the transmission power being consumed by transmitting the PUSCH (3e-05 and 3e-07). This is called a Type 1 power headroom.

Equally, Example 2 corresponds to a scenario in which two serving cells, i.e., a PCell 3e-11 and a SCell 3e-13 are configured to the UE and then the UE performs uplink transmission according to scheduling by a base station. In the scenario, the UE has a capability to simultaneously transmit a PUCCH and a PUSCH in one serving cell, or separately transmits the PUCCH from the PUSCH by using an uplink transmission technology in which simultaneous transmission is possible. In this regard, in a PCell (or when the PUCCH may be transmitted in a SCell, the same is applied to the SCell), the UE is required to report a power headroom value obtained by subtracting both a PUSCH transmission value and a PUCCH transmission value from maximum transmission power $P_{CMAX,c}$ of the PCell, in consideration of transmission power consumed by not only PUSCH transmission (3e-17) but also PUCCH transmission (3e-15). This is called a Type 2 power headroom.

When the UE reports the Type 1 power headroom or the Type 2 power headroom, the UE reports a power headroom by using Single Entry PHR format 3e-21 or a Multiple Entry PHR format 3e-31, and when dual connectivity is configured, the UE reports the power headroom by using the Multiple Entry PHR format 3e-31. In this regard, the power headroom is reported as shown in 3e-41, 3e-51, 3e-61, or the like, and when the report is required, a $P_{CMAX,c}$ value corresponding thereto is also reported (see 3e-43, 3e-53, and 3e-63). When the UE reports the power headroom, the UE uses a field having a length of 6 bits as shown in FIG. 3E, and in an LTE, the field has values as shown in the Table below. The Table is called Table 2.

TABLE 2

| Reported value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

In an NR, a frequency range is roughly designated as two frequency ranges below, according to frequency coverage in which a base station operates.

TABLE 3

| Frequency range designation | Corresponding frequency range |
|---|---|
| FR1 | 450 MHz-6000 MHz |
| FR2 | 24250 MHz-52600 MHz |

A base station operating in FR1 and a base station operating in FR2 may request significantly different transmission powers to a UE to operate in each of the base stations. Accordingly, a Table different from Table 2 of the LTE may be defined according to frequency ranges (i.e., according to each of FR1 and FR2).

For example, for a PHR report to a base station that operates in FR1 from among NR base stations, Table 4 below may be used (because FR1 of Table 4 is not greatly different from a frequency range of the LTE, the same Table as Table 2 of the LTE is shown for convenience. However, Table 4 may have different values).

TABLE 4

| Reported value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| . . . | . . . |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

As another example, for a PHR report to a base station that operates in FR1 from among NR base stations, Table 5 below may be used.

TABLE 5

| Reported value | Measured quantity value (dB) |
|---|---|
| POWER_HEADROOM_0 | $-13 \leq PH < -12$ |
| POWER_HEADROOM_1 | $-12 \leq PH < -11$ |
| POWER_HEADROOM_2 | $-11 \leq PH < -10$ |
| POWER_HEADROOM_3 | $-10 \leq PH < -9$ |
| POWER_HEADROOM_4 | $-9 \leq PH < -8$ |
| POWER_HEADROOM_5 | $-8 \leq PH < -7$ |
| . . . | . . . |
| POWER_HEADROOM_57 | $44 \leq PH < 45$ |
| POWER_HEADROOM_58 | $45 \leq PH < 46$ |
| POWER_HEADROOM_59 | $46 \leq PH < 47$ |
| POWER_HEADROOM_60 | $47 \leq PH < 48$ |
| POWER_HEADROOM_61 | $48 \leq PH < 49$ |
| POWER_HEADROOM_62 | $49 \leq PH < 50$ |
| POWER_HEADROOM_63 | $PH \geq 50$ |

Accordingly, when the UE reports a PHR about each cell that is configured to the UE by a current base station and is activated, even when the UE uses a same PH report field of a Multiple Entry PHR format according to a RAT and an operation frequency of a corresponding serving cell, the UE generates a value based on a Table according to a type of the corresponding serving cell and reports the value to a base station.

In EN-DC, an LTE base station that is a MeNB and an NR base station that is a SgNB may not recognize an operation frequency of each other. This is because the MeNB and the SgNB may be designed to individually operate to ensure independent operations therebetween. Accordingly, when the UE reports a PHR to the LTE base station that is the MeNB, a frequency range where LTE serving cells operate and a PHR report table corresponding thereto are related to only Table 2, the UE reports according to Table 2. In an EN-DC situation, when the UE reports a PHR, the UE has to report about serving cells of the SgNB (i.e., the NR base station), and in this regard, the LTE base station that receives the PHR does not know frequency information about a serving cell of the NR base station and thus, the UE reports the PHR according to Table 2. For example, when a calculated frequency of an NR serving cell belongs to FR2 and a PH value is 45 dB, the UE uses a value of POWER_HEADROOM_58 so as to report to the NR base station. However, when the UE reports to the LTE base station, the UE uses a value of POWER_HEADROOM_63. In a case where the UE reports a PHR report to the SgNB (i.e., the NR base station), when a PH value is 45 dB, the UE reports an exact value by using the value of POWER_HEADROOM_58.

A scenario of dual connectivity between NR base stations is called NR-DC, and even in this case, the NR base station that is an MgNB and the NR base station that is an SgNB may not recognize each others' operation frequency. This is because the MeNB and the SgNB may be designed to individually operate to ensure independent operations therebetween. In this situation, when the UE reports a PHR about a serving cell included in a base station to which the UE currently reports, the UE reports the PHR according to a frequency operation range (FR1 or FR2). However, when a serving cell is not included in the base station to which the UE currently reports (i.e., with respect to a serving cell of a SCG when reporting a PHR to an MCG, or with respect to a serving cell of the MCG when reporting a PHR to the SCG), the UE reports a PHR value to a base station according to Table 4 (i.e., FR1). Alternatively, the UE may separately inform a base station of whether a corresponding value is related to Table 4 of FR1 or Table 5 of FR2 by using a bit from among R bits 3e-39 that are reserved in the Multiple Entry PHR format, and thus the UE may inform the base station of an exact value.

Figure 3F:
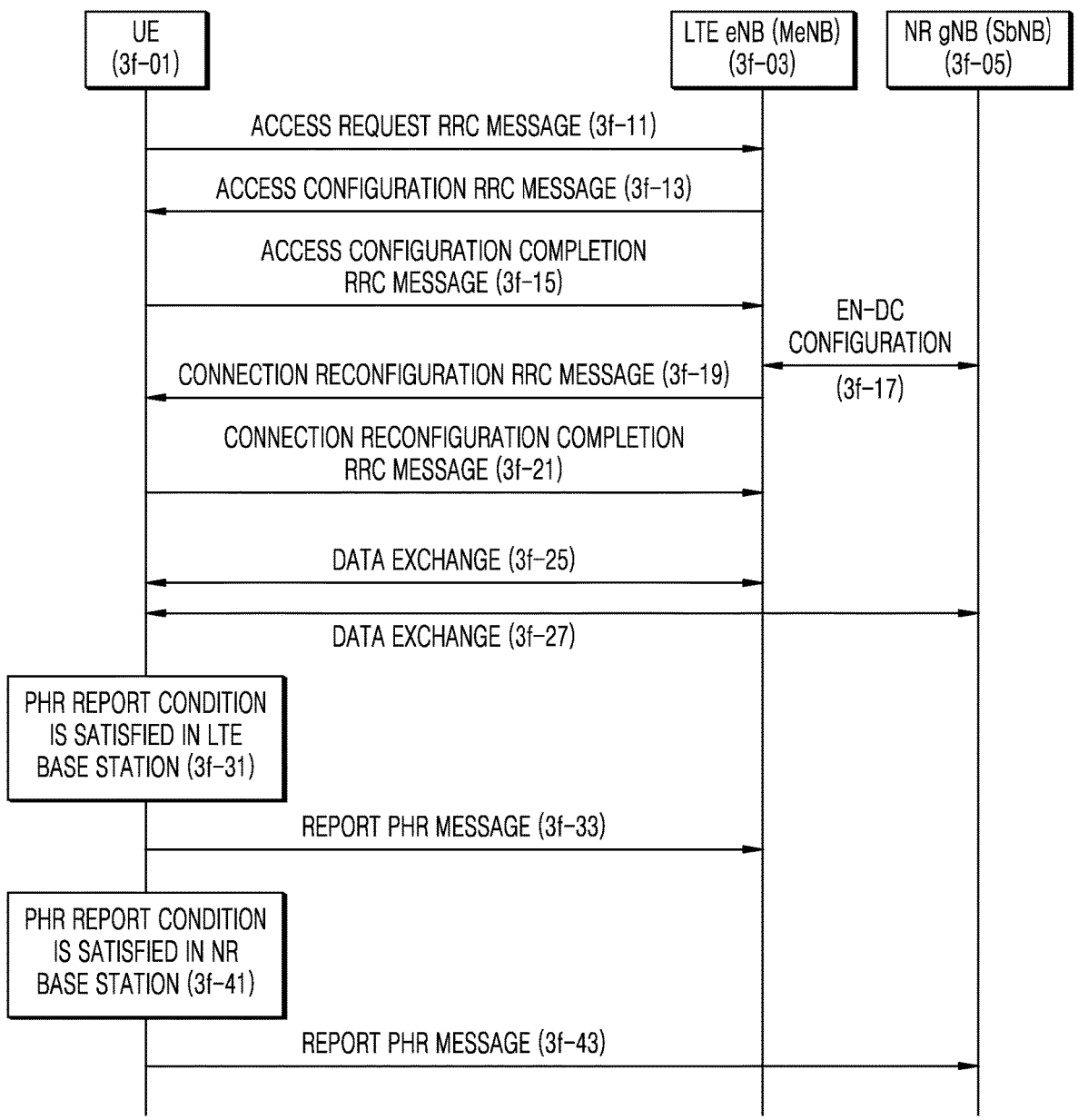
FIG. 3F illustrates a flow of messages between a UE and a base station to which the UE reports a power headroom (PHR) while dual connectivity is established between different radio access technologies (RATs), according to an embodiment of the disclosure.

FIG. 3F illustrates a flow of messages between a UE 3f-01 and an LTE eNB 3f-03 when the UE 3f-01 reports a PHR while dual connectivity is established between different RATs, according to an embodiment of the disclosure.

The UE 3f-01 in an idle state scans surroundings of the UE 3f-01 and selects an appropriate LTE base station (or a cell), i.e., the LTE eNB 3f-03, and when the UE 3f-01 determines to access the cell, the UE 3f-01 transmits an access request message to the LTE eNB 3f-03 through a random access procedure (3f-11). The access request message is transmitted as an RRC layer message by using the aforementioned uplink access technology.

Afterward, the UE 3f-01 receives an access configuration message (3f-13) and transmits an access configuration completion message that is an acknowledgment message thereof (3f-15), thereby completing access to the LTE eNB 3f-03. When the UE 3f-01 receives the access configuration message, the UE 3f-01 may transition to a connected state and may transceive data to/from the LTE eNB 3f-03. Afterward, to receive a PHR report for the LTE eNB 3f-03 to perform scheduling on the UE 3f-01, the LTE eNB 3f-03 may configure PHR-related parameters by using an RRC layer message (3f-19). The PHR-related parameters may include periodicPHR-Timer, prohibitPHR-Timer, downlink (dl)-PathlossChange, or the like. PeriodicPHR-Timer is a timer configured to periodically report a PHR value to a base station, prohibitPHR-Timer is a timer configured to prevent frequent PHR reports, and a value of dl-PathlossChange is a threshold value at which a PHR is reported when a change in reception of a downlink channel is equal to or greater than the value. A connection reconfiguration message may include configuration information related to a wireless bearer used in data transmission, or a separate connection reconfiguration message may be transmitted again for the wireless bearer configuration. Also, when the UE 3f-01 is configured, by the LTE eNB 3f-03, to measure neighboring NR base stations and then reports results thereof, configuration is performed between the LTE eNB 3f-03 and an NR base station (3f-17), and then information may also be included in the RRC message, the information involving an additional configuration to use not only the LTE eNB 3f-03 but also an NR gNB 3f-05. That is, information for configuration of dual connectivity (EN-DC) may also be included in the RRC message. RRC configuration is based on an RRC-ConnectionReconfiguration message. The UE 3f-01 receives an RRC layer message and transmits an acknowledgment message to the LTE eNB 3f-03 (3f-21). The acknowledgment message corresponds to an RRCConnectionReconfigurationComplete message.

When dual connectivity enabling simultaneous use of the LTE base station and the NR base station is established based on the configuration message, the UE 3f-01 may simultaneously perform data exchange with the LTE eNB 3f-03 and the NR gNB 3f-05 (3f-25 and 3f-27).

A condition of when to transmit a PHR to a base station (i.e., when to trigger a report) may be defined, and the following conditions may be defined in an LTE system and an NR system.

When a change in downlink reception strength is equal to or greater than a value of dl-PathlossChange dB when prohibitPHR-Timer is expired.

When periodicPHR-Timer is expired.

When a PHR report is initially configured.

When SCell including an uplink is added.

When a PSCell of a secondary base station is added while a dual connectivity technology is used.

When the aforementioned PHR triggering conditions occur in each of the LTE eNB 3f-03 and the NR gNB 3f-05 (3f-31 and 3f-41), the UE 3f-01 generates and reports PHRs to the LTE eNB 3f-03 and the NR gNB 3f-05, respectively, (3f-33 and 3f-43).

When a condition is satisfied in the LTE eNB 3f-03 (3f-31), the UE 3f-01 includes a value of the Type 1 power headroom with respect to all serving cells that are currently configured and activated in the LTE eNB 3f-03 and the NR gNB 3f-05, and reports a PHR to the LTE eNB 3f-03 (3f-33). Also, when actual transmission occurs in the LTE eNB 3f-03 or the NR gNB 3f-05 when the PHR is reported, a PcmAxc value with respect to a cell for which the Type 1 power headroom is reported is also included and reported. In addition, in FIG. 3F, it is assumed that the LTE base station is an MeNB, and thus, when the UE 3f-01 is configured to be capable of simultaneously transmitting a PUCCH and a PUSCH in a PCell that is a representative cell of the MeNB, the UE 3f-01 also includes a value of the Type 2 power headroom of the PCell in the PHR and reports the PHR. Also, in FIG. 3F, because a base station to which the PHR is reported is the LTE base station, regardless of whether a cell is a serving cell corresponding to the LTE base station or a serving cell corresponding to the NR base station, the UE 3f-01 generates a value according to the aforementioned Table 2 (i.e., a Table used in reporting a PHR of an LTE) and reports the value to the base station.

When a condition is satisfied in the NR gNB 3f-05 (3f-41), the UE 3f-01 includes a value of the Type 1 power headroom with respect to all serving cells that are currently configured and activated in the LTE eNB 3f-03 and the NR gNB 3f-05, and reports a PHR to the NR gNB 3f-05 (3f-43). Also, when actual transmission occurs in the LTE eNB 3f-03 or the NR gNB 3f-05 when the PHR is reported, a $P_{CMAX,c}$ value with respect to a cell for which the Type 1 power headroom is reported is also included and reported. In addition, in FIG. 3F, it is assumed that the LTE base station is the MeNB, and the UE 3f-01 reports the PHR to the NR gNB 3f-05 because the condition is satisfied in the NR gNB 3f-05, and thus, when the UE 3f-01 is configured to be capable of simultaneously transmitting a PUCCH and a PUSCH in a PSCell that is a representative cell of the NR gNB 3f-05 (i.e., a SgNB), the UE 3f-01 also includes a value of the Type 2 power headroom of the PSCell in the PHR and reports the PHR. Also, the UE 3f-01 reports the Type 2 power headroom with respect to the PCell of the LTE base station, and when the UE 3f-01 is configured to report an actual transmission value, the UE 3f-01 includes a $P_{CMAX,c}$ value with respect to the PCell of the LTE base station in a report and transmits the report. In FIG. 3F, a base station that receives a PHR is the NR base station, it is assumed that the NR base station understands all of Tables 3, 5, and 6. Accordingly, when a servicing cell corresponds to the LTE base station, the UE 3f-01 generates a value according to Table 2 (i.e., a Table used in reporting a PHR of an LTE) and reports the value to the base station, and in a case of an NR serving cell, the UE 3f-01 reports remaining transmission power of the UE 3f-01 by reporting to a base station according to Table 4 in a case of FR1 and Table 5 in a case of FR2, depending on operation frequency ranges.

Accordingly, a PHR is reported to a corresponding base station when each corresponding condition occurs, and the base station may determine current remaining power of a UE and may appropriately perform scheduling on the UE.

Figure 3G:
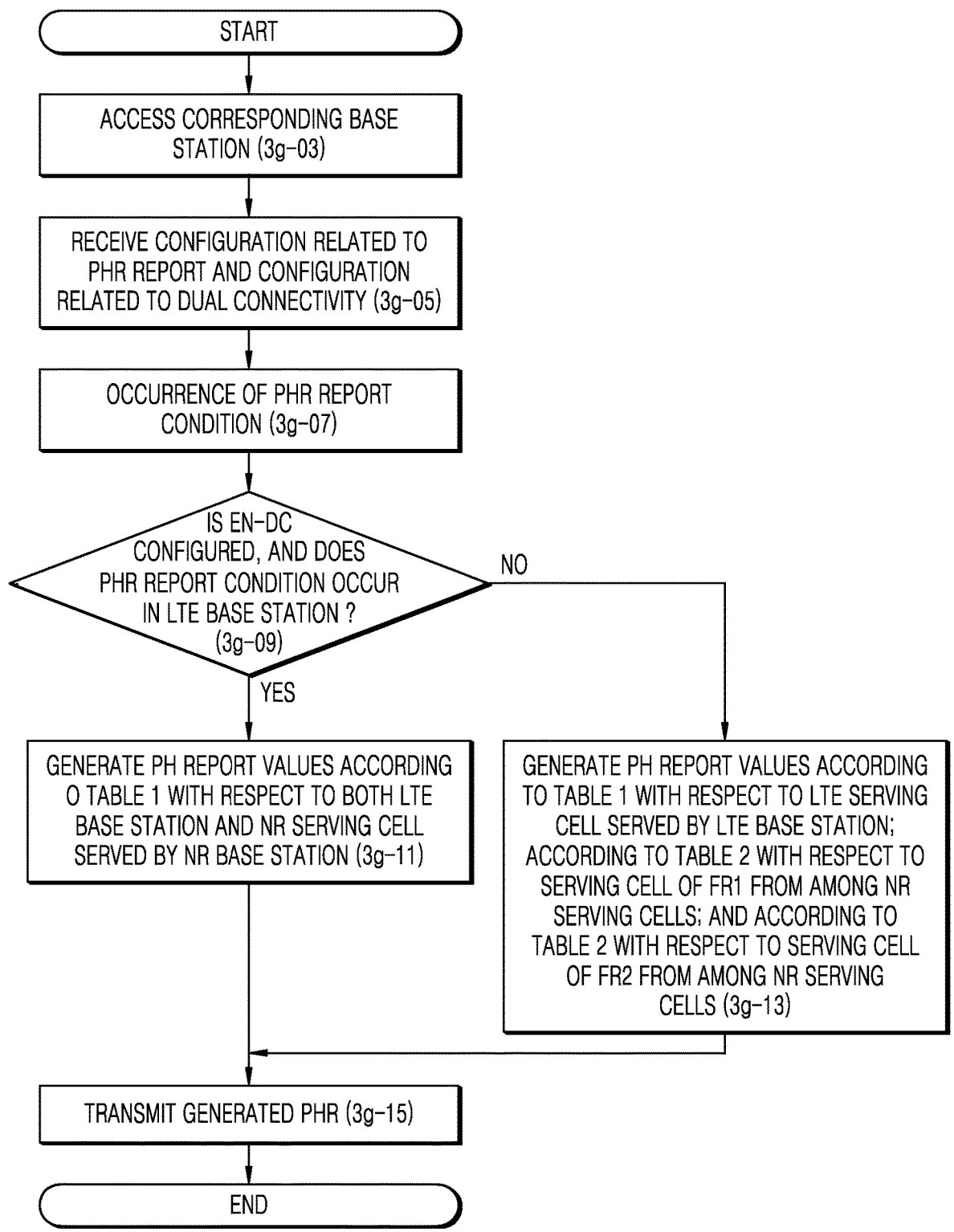
FIG. 3G is a diagram illustrating a flow of operations of a UE when the UE reports a PHR while dual connectivity is established between different RATs, according to an embodiment of the disclosure.

FIG. 3G is a diagram illustrating a flow of operations of a UE when the UE reports a PHR while dual connectivity is established between different RATs, according to an embodiment of the disclosure.

The UE in an idle state scans surroundings of the UE and selects an appropriate LTE base station (or a cell), and attempts access to the LTE base station (3g-03). To do so, the UE transmits an RRCConnectionRequest message of an RRC layer to the LTE base station, receives an RRCConnectionSetup message from the LTE base station, transmits an RRCConnectionSetupComplete message to the LTE base station, and completes an access procedure.

Afterward, the UE receives, from the LTE base station, an RRC layer configuration message for reporting a PHR, and transmits an acknowledgment message therefor (3g-05). The RRC layer configuration message may be an RRCConnectionReconfiguration message, and the acknowledgment message may be an RRCConnectionReconfigurationComplete message. The configuration message may include PHR-related parameters including periodicPHR-Timer, prohibitPHR-Timer, dl-PathlossChange, or the like. PeriodicPHR-Timer is a timer configured to periodically report a PHR value to a base station, prohibitPHR-Timer is a timer configured to prevent frequent PHR reports, and a value of dl-PathlossChange is a threshold value at which a PHR is reported when a change in reception of a downlink channel is equal to or greater than the value. A connection reconfiguration message may include configuration information related to a wireless bearer used in data transmission, or a separate connection reconfiguration message may be transmitted again for configuration. Also, when the UE is configured, by the base station, to measure neighboring NR base stations and then reports results thereof, information may also be included in the message, the information involving an additional configuration to use not only the LTE base station but also an NR base station That is, information for configuration of dual connectivity may also be included in the message.

Afterward, based on a configured parameter, the UE determines whether to trigger a PHR report to each base station, according to the following conditions (3g-07).

When prohibitPHR-Timer is expired, when a change in downlink reception strength is equal to or greater than a value of dl-PathlossChange dB which is configured by a base station.

When periodicPHR-Timer which is configured by a base station for a period report is expired.

When a PHR report is initially configured.

When SCell including an uplink is added.

When a PSCell of a secondary base station is added while a dual connectivity technology is used.

When the PHR triggering conditions occur in each of base stations (3g-07), the UE determines whether EN-DC is configured, and whether a base station where the PHR triggering condition occurred is an LTE base station or an NR base station (3g-09).

When EN-DC is configured and a condition is satisfied in an LTE eNB, or when LTE-LTE DC is configured, the UE generates a PHR message so as to report to the LTE eNB, the PHR message including a value of the Type 1 power headroom with respect to all serving cells that are currently configured and activated in the LTE base station and the NR base station. Also, when actual transmission occurs in the LTE base station or the NR base station when the PHR is reported, a $P_{CMAX,c}$ value with respect to a cell for which the Type 1 power headroom is reported is also included in the generated PHR message. In addition, in FIG. 3G, it is assumed that the LTE base station is an MeNB, and when the UE is configured to be capable of simultaneously transmitting a PUCCH and a PUSCH in a PCell that is a representative cell of the MeNB, the UE also includes a value of the Type 2 power headroom of the PCell in the generated PHR message. Also, in FIG. 3G, because a base station to which the PHR is reported is the LTE base station, regardless of whether a cell is a serving cell corresponding to the LTE base station or a serving cell corresponding to the NR base station, the UE generates a value according to the aforementioned Table 2 (i.e., a Table used in reporting a PHR of an LTE) and reports the value to the base station (3g-11).

When EN-DC is not configured in the UE, DC is configured between NR base stations, or a condition is satisfied in an NR gNB even when EN-DC is configured, the UE generates a PHR message so as to report to the NR gNB, the PHR message including a value of the Type 1 power headroom with respect to all serving cells that are currently configured and activated in the LTE base station and the NR base station. Also, when actual transmission occurs in the LTE base station or the NR base station when a PHR is reported, a $P_{CMAX,c}$ value with respect to a cell for which the Type 1 power headroom is reported is also included in the generated PHR message. In addition, in FIG. 3G, it is assumed that the LTE base station is the MeNB, and the UE reports the PHR to the NR gNB because the condition is satisfied in the current NR gNB, when the UE is configured to be capable of simultaneously transmitting a PUCCH and a PUSCH in a PSCell that is a representative cell of the NR Gnb (i.e., a SgNB), the UE also includes a value of the Type 2 power headroom of the PSCell in the generated PHR message. Also, the UE reports the Type 2 power headroom with respect to the PCell of the LTE base station, and when the UE is configured to report an actual transmission value, the UE generates a report including a $P_{CMAX,c}$ value with respect to the PCell of the LTE base station. In FIG. 3G, a base station that receives a PHR is the NR base station, it is assumed that the NR base station understands all of Tables 3, 5, and 6. Accordingly, when a servicing cell corresponds to the LTE base station, the UE generates a value according to Table 2 (i.e., a Table used in reporting a PHR of an LTE) and reports the value to the base station, and in a case of an NR serving cell, the UE reports remaining transmission power of the UE by reporting to a base station according to Table 4 in a case of FR1 and according to Table 5 in a case of FR2, depending on operation frequency ranges (3g-13). In a case of DC between NR base stations, when a serving cell is not included in a base station to which the UE currently reports (i.e., with respect to a serving cell of a SCG when reporting a PHR to a MCG, or with respect to a serving cell of the MCG when reporting a PHR to the SCG), the UE reports a PHR value to a base station according to Table 4 (i.e., FR1). Alternatively, the UE may separately inform a base station of whether a corresponding value is related to Table 4 of FR1 or Table 5 of FR2 by using a bit from among the R bits 3e-39 that are reserved in the Multiple Entry PHR format, and thus the UE may inform the base station of an exact value.

Afterward, the PHR is reported to the base station (3g-15) to inform the base station of current remaining power of the UE. Accordingly, the base station may determine the current remaining power of the UE and may appropriately perform scheduling on the UE.

Figure 3H:
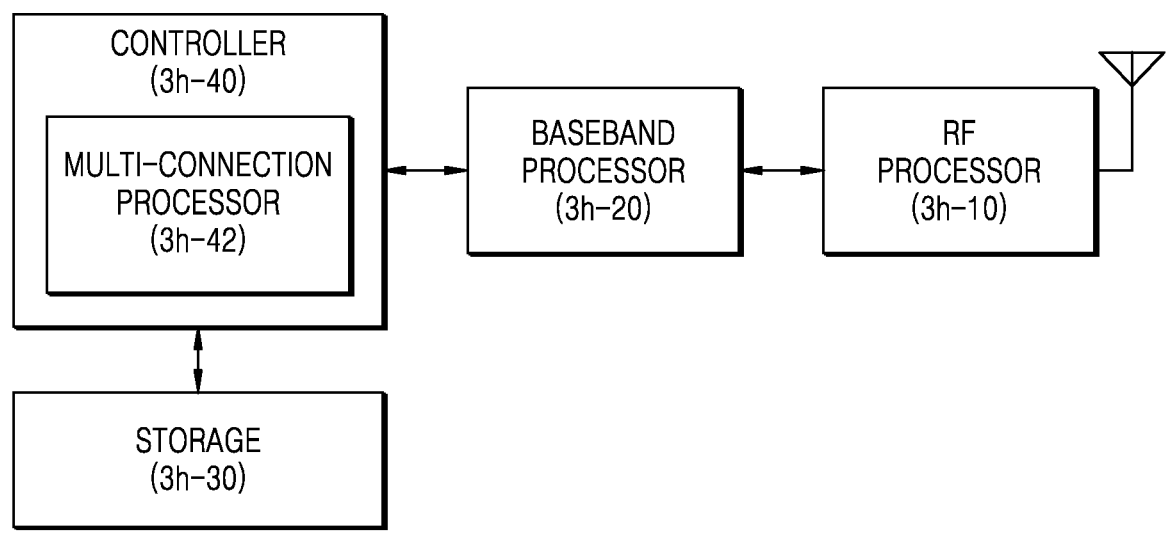
FIG. 3H is a block diagram illustrating a configuration of a UE in a wireless communication system according to an embodiment of the disclosure.

FIG. 3H is a block diagram illustrating a configuration of a UE in a wireless communication system according to an embodiment of the disclosure.

Referring to FIG. 3H, the UE includes a RF processor 3h-10, a baseband processor 3h-20, a storage 3h-30, and a controller 3h-40.

The RF processor 3h-10 performs functions including conversion, amplification, or the like of a band of a signal so as to transceive the signal through a wireless channel. That is, the RF processor 3h-10 up-converts a baseband signal provided from the baseband processor 3h-20 to an RF band signal and receives the RF band signal via an antenna, and down-converts a RF band signal received via the antenna to a baseband signal. For example, the RF processor 3h-10 may include a transmission filter, a reception filter, an amplifier, a mixer, an oscillator, a DAC, an ADC, or the like. Although FIG. 3H illustrates only one antenna, the UE may include a plurality of antennas. Also, the RF processor 3h-10 may include a plurality of RF chains. Furthermore, the RF processor 3h-10 may perform beamforming. For beamforming, the RF processor 3h-10 may adjust phases and magnitudes of respective signals transceived via the plurality of antennas or antenna elements.

The baseband processor 3h-20 performs a function of conversion between the baseband signal and a bitstream according to a physical layer specification of a system. For example, in data transmission, the baseband processor 3h-20 generates complex symbols by encoding and modulating a transmitted bitstream. Also, in data reception, the baseband processor 3h-20 reconstructs a received bitstream by demodulating and decoding a baseband signal provided from the RF processor 3h-10. For example, when data is transmitted according to an OFDM scheme, the baseband processor 3h-20 generates complex symbols by encoding and modulating a transmitted bitstream, maps the complex symbols to subcarriers, and configures OFDM symbols by performing an IFFT operation and inserting a cyclic prefix (CP). Also, in data reception, the baseband processor 3h-20 may divide the baseband signal provided from the RF processor 3h-10 into OFDM symbol units and restore the signals mapped to the subcarriers by performing an FFT operation and then reconstruct the received bitstream by demodulating and decoding the signals.

The baseband processor 3h-20 and the RF processor 3h-10 transmit and receive signals as described above. Accordingly, the baseband processor 3h-20 and the RF processor 3h-10 may be referred to as a transmitter, a receiver, a transceiver, or a communicator. Furthermore, at least one of the baseband processor 3h-20 and the RF processor 3h-10 may include different communication modules to support a plurality of different wireless access technologies. Also, at least one of the baseband processor 3h-20 and the RF processor 3h-10 may include different communication modules to process signals of different frequency bands. Examples of the different wireless access technologies may include a wireless local area network (WLAN) (e.g., Institute of Electrical and Electronics Engineers (IEEE) 802.11), a cellular network (e.g., an LTE network), or the like. Also, examples of the different frequency bands may include a SHF band (e.g., 2.5 GHz, 5 GHz, or the like), and an mmWave (e.g., 60 GHz) band.

The storage 3h-30 may store data such as a default program, an application program, and configuration information for the operations of the UE. In particular, the storage 3h-30 may store information about a WLAN node configured to perform wireless communication by using a WLAN access technology. In addition, the storage 3h-30 provides stored data, in response to a request by the controller 3h-40.

The controller 3h-40 controls overall operations of the UE. For example, the controller 3h-40 transmits and receives signals through the baseband processor 3h-20 and the RF processor 3h-10. Also, the controller 3h-40 records and reads the data stored in the storage 3h-30. To do so, the controller 3h-40 may include at least one processor. For example, the controller 3h-40 may include a communication processor (CP) configured to perform communication control and an AP configured to control an upper layer such as an application program. According to an embodiment of the disclosure, the controller 3h-40 includes a multi-connection processor 3h-42 configured to perform processing to operate in a multi-connection mode. For example, the controller 3h-40 may control the UE of FIG. 3E to perform a procedure of operations of the UE.

According to an embodiment of the disclosure, the controller 3h-40 receives a PHR configuration from a control message received from a base station, and when dual connectivity is configured, the controller 3h-40 determines even a type of a RAT of another base station, not a base station to which the UE reports, according to types of RATs of base stations, determines which PHR information is to be sent, and transmits a message to the base station to transmit the PHR information.

Methods according to embodiments of the disclosure described in claims or specification of the disclosure may be implemented as hardware, software, or a combination of hardware and software.

When implemented as software, a non-transitory computer-readable storage medium storing at least one program (software module) may be provided. The at least one program stored in the non-transitory computer-readable storage medium is configured to be executable by one or more processors in an electronic device. The one or more processors include instructions causing the electronic device to execute the methods according to embodiments of the disclosure described in claims or specification of the disclosure.

The at least one program (the software module, the software) may be stored in a non-volatile including a random-access memory (RAM) and a flash memory, a read-only memory (ROM), an electrically erasable programmable read-only memory (EEPROM), a magnetic disc storage device, a compact disc-ROM (CD-ROM), digital versatile discs (DVDs), other optical storage devices, a magnetic cassette, or the like, or a memory configured of any or all combinations thereof. Also, each of configuration memories may be provided in a multiple number.

The at least one program may be stored in an attachable storage device that can be accessed via a communication network including Internet, Intranet, a local area network (LAN), a wide LAN (WLAN), or a storage area network (SAN), or a combination thereof. The storage device may access, via an external port, an apparatus for performing embodiments of the disclosure. Also, a separate storage device on a communication network may access the apparatus for performing embodiments of the disclosure.

In the aforementioned embodiments of the disclosure, each element included in the disclosure is expressed in a singular form or a plural form according to the embodiments of the disclosure. However, for convenience of description, the expression in the singular form or the plural form is selected to be appropriate for a provided situation, and thus, the disclosure is not limited to the singular form or the plural form. Accordingly, even when an element is expressed in a plural form, the element may be configured in a singular form, and even when an element is expressed in a singular form, the element may be configured in a plural form.

While the disclosure has been shown and described with reference to various embodiments thereof, it will be understood by those skilled in the art that various changes in form and details may be made therein without departing from the spirit and scope of the disclosure as defined by the appended claims and their equivalents. When required, the embodiments of the disclosure may be combined. For example, parts of an embodiment and parts of another embodiment of the disclosure may be combined with one another, in such a manner that a base station and UE may be operated. While the embodiments of the disclosure are provided based on a frequency division duplex (FDD) LTE system, modified embodiments based on the technical concept of the embodiments may be executable in another system such as a time division duplex (TDD) LTE system, a 5G system or an NR system.

What is claimed is:

1. A method performed by a transmitting apparatus in a wireless communication system, the method comprising:
   based on receiving first data including an upper layer header, generating, by a service data adaptation protocol (SDAP) entity, second data;
   by adding an SDAP header to the first data;
   transmitting, by the SDAP entity, the second data to a packet data convergence protocol (PDCP) entity;
   generating, by the PDCP entity, an uplink data compression (UDC) data block by performing data compression on the second data except the SDAP header;
   generating, by the PDCP entity, an UDC header;

adding, by the PDCP entity, the UDC header to the SDAP header;

performing, by the PDCP entity, integrity protection on the UDC header, the SDAP header, and the UDC data block;

performing, by the PDCP entity, ciphering on the integrity protected UDC header and the integrity protected UDC data block except the integrity protected SDAP header;

generating, by the PDCP entity, third data by adding a PDCP header to the integrity protected SDAP header, the ciphered UDC data header, and the ciphered UDC data block; and transmitting, to a lower layer by the PDCP entity, the third data.

2. The method of claim 1, further comprising:

generating, by the PDCP entity, a message authentication code for integrity (MAC-I); and adding, by the PDCP entity, the MAC-I to the integrity protected UDC data block, wherein the performing of the ciphering comprises:
  performing, by the PDCP entity, ciphering on the MAC-I.

3. The method of claim 1, further comprising:

receiving, at least one of SDAP header configuration information, UDC compression configuration information, or integrity protection configuration information through higher layer signaling.

4. A method performed by a receiving apparatus in a wireless communication system, the method comprising:

based on receiving first data, from a lower layer by a packet data convergence protocol (PDCP) entity, removing, by the PDCP entity, a PDCP header from the first data;

performing, by the PDCP entity, deciphering on a portion of the first data except a service data adaptation protocol (SDAP) header, the portion including an uplink data compression (UDC) header and a UDC data block;

performing, by the PDCP entity, integrity verification on the deciphered UDC header, the deciphered UDC data block, and the SDAP header;

performing, by the PDCP entity, decompression on the UDC data block based on the UDC header; and transmitting, to an upper layer by the PDCP entity, the decompressed UDC data and the SDAP header.

5. The method of claim 4, further comprising:

performing, by the PDCP entity, deciphering on a message authentication code for integrity (MAC-I) included in the first data, wherein the performing of the integrity verification comprises:
  calculating, by the PDCP entity, a computed MAC-I (X-MAC), and
  identifying, by the PDCP entity, that the integrity verification is succeeded in case that the X-MAC is equal to the MAC-I.

6. The method of claim 4, further comprising:

receiving, at least one of SDAP header configuration information, UDC compression configuration information, or integrity protection configuration information through higher layer signaling.

7. A transmitting apparatus in a wireless communication system, the transmitting apparatus comprising:

a transceiver; and at least one controller implementing a service data adaptation protocol (SDAP) entity, a packet data convergence protocol (PDCP) entity, and a lower layer, wherein the at least one controller is configured to:

based on receiving first data including an upper layer header, generate, by the SDAP entity, second data;

by adding an SDAP header to the first data, transmit, by the SDAP entity, the second data to the PDCP entity, generate, by the PDCP entity, an uplink data compression (UDC) data block by performing data compression on the second data except the SDAP header, generate, by the PDCP entity, an UDC header, add, by the PDCP entity, the UDC header to the SDAP header, perform, by the PDCP entity, integrity protection on the UDC header, the SDAP header, and the UDC data block, perform, by the PDCP entity, ciphering on the integrity protected UDC header and the integrity protected UDC data block except the integrity protected SDAP header, generate, by the PDCP entity, third data by adding a PDCP header to the integrity protected SDAP header, the ciphered UDC data header, and the ciphered UDC data block, and transmit, to the lower layer by the PDCP entity, the third data.

8. The transmitting apparatus of claim 7, wherein the at least one controller is further configured to:

generate, by the PDCP entity, a message authentication code for integrity (MAC-I), add, by the PDCP entity, the MAC-I to the integrity protected UDC data block, and perform, by the PDCP entity, ciphering on the MAC-I.

9. The transmitting apparatus of claim 7, wherein the at least one controller is further configured to:

receive at least one of SDAP header configuration information, UDC compression configuration information, or integrity protection configuration information through higher layer signaling.

10. A receiving apparatus in a wireless communication system, the receiving apparatus comprising:

a transceiver; and at least one controller implementing a packet data convergence protocol (PDCP) entity, a lower layer, and an upper layer, wherein the at least one controller is configured to:

based on receiving first data, from the lower layer by the PDCP entity, remove, by the PDCP entity, a PDCP header from the first data, perform, by the PDCP entity, deciphering on a portion of the first data except a service data adaptation protocol (SDAP) header, the portion including an uplink data compression (UDC) header and a UDC data block, perform, by the PDCP entity, integrity verification on the deciphered UDC header, the deciphered UDC data block, and the SDAP header, perform, by the PDCP entity, decompression on the UDC data block based on the UDC header, and transmit, to the upper layer by the PDCP entity, the decompressed UDC data and the SDAP header.

11. The receiving apparatus of claim 10, wherein the at least one controller is further configured to:

perform by the PDCP entity, decipher on a message authentication code for integrity (MAC-I) included in the first data, calculate, by the PDCP entity, a computed MAC-I (X-MAC), and identify, by the PDCP entity, that the integrity verification is succeeded in case that the X-MAC is equal to the MAC-I.

12. The receiving apparatus of claim 10, wherein the at least one controller is further configured to:

receive at least one of SDAP header configuration information, UDC compression configuration information, or integrity protection configuration information through higher layer signaling.

\* \* \* \* \*